US012401450B2

(12) United States Patent
Dorrance et al.

(10) Patent No.: US 12,401,450 B2
(45) Date of Patent: Aug. 26, 2025

(54) WIRELESS DEVICE AND METHODS FOR DYNAMIC CHANNEL CODING

(71) Applicant: Intel Corporation, Santa Clara, CA (US)

(72) Inventors: Richard Dorrance, Hillsboro, OR (US); Tolga Acikalin, San Jose, CA (US); Kenneth P. Foust, Beaverton, OR (US); Renzhi Liu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/448,183

(22) Filed: Aug. 11, 2023

(65) Prior Publication Data

US 2024/0113807 A1 Apr. 4, 2024

(30) Foreign Application Priority Data

Sep. 30, 2022 (EP) .................................. 22 199 009

(51) Int. Cl.

| | |
|---|---|
| ***H04L 1/00*** | (2006.01) |
| ***H04W 64/00*** | (2009.01) |
| *H04W 84/18* | (2009.01) |

(52) U.S. Cl.
CPC .......... *H04L 1/0044* (2013.01); *H04L 1/0061* (2013.01); *H04L 1/0076* (2013.01); *H04W 64/006* (2013.01); *H04W 84/18* (2013.01)

(58) Field of Classification Search
CPC ... H04L 1/0044; H04L 1/0061; H04L 1/0076; H04L 1/0009; H04W 64/006; H04W 84/18
See application file for complete search history.

(56) References Cited

U.S. PATENT DOCUMENTS 5,828,677 A * 10/1998 Sayeed ................. H04L 1/1671 714/751
7,574,195 B2 * 8/2009 Krasner ................. G08G 1/205 455/404.1
7,623,035 B2 * 11/2009 August ................ G06Q 20/203 700/274
8,175,181 B1 * 5/2012 Nabar .................. H04L 1/0009 375/267

(Continued)

OTHER PUBLICATIONS

Zhang Liankuan, Xiao Deqin, Tang Yi and Zhang Yang, "Adaptive error control in Wireless Sensor Networks," IET International Conference on Wireless Sensor Network 2010 (IET-WSN 2010), Beijing, 2010, pp. 360-366. (Year: 2010).*

(Continued)

*Primary Examiner* — Albert Decady
*Assistant Examiner* — Enamul M Kabir
(74) *Attorney, Agent, or Firm* — Viering, Jentschura & Partner mbB

(57) ABSTRACT

The present disclosure relates to a device which includes a processor configured to: select, using sensor data, an error correction code from two or more error correction codes, the sensor data representing a physical state of the processor and/or the device; generate channel-coded data by channel-coding input data using the selected error correction code; and provide a representation of the channel-coded data to a transmitter for wireless data transmission.

20 Claims, 34 Drawing Sheets

(56) References Cited

U.S. PATENT DOCUMENTS

| | | | | |
|---|---|---|---|---|
| 8,553,745 | B2 * | 10/2013 | Lee | H04R 25/558 375/138 |
| 10,027,370 | B2 * | 7/2018 | Sato | H04B 1/707 |
| 10,068,464 | B2 * | 9/2018 | Devlin | G08C 23/04 |
| 2002/0176482 | A1 | 11/2002 | Chien | |
| 2003/0210325 | A1 * | 11/2003 | Chang | H04N 7/141 348/14.02 |
| 2004/0037214 | A1 * | 2/2004 | Blasco Claret | H04B 3/542 370/486 |
| 2011/0110218 | A1 * | 5/2011 | Park | H04J 13/0048 370/310 |
| 2015/0180653 | A1 * | 6/2015 | Nix | H04L 9/0841 380/259 |
| 2017/0033893 | A1 * | 2/2017 | Kang | H04L 1/0061 |
| 2019/0181937 | A1 * | 6/2019 | Nammi | H04L 1/16 |
| 2022/0224436 | A1 | 7/2022 | Hehn et al. | |

OTHER PUBLICATIONS

Liu, Renzhi et al., "A 2Gb/s 9.9pJ/b Sub-10GHz Wireless Transceiver for Reconfigurable FDD Wireless Networks and Short-Range Multicast Applications", 2022 IEEE Radio Frequency Integrated Circuits Symposium (RFIC), 2022, pp. 263-266.

Alzahrani, Fahad et al., "On-chip TEC-QED ECC for ultra-large, single-chip memory systems", 1994, pp. 132-137, IEEE.

Ligata, Amir et al., "Bit Error Rate Analysis for an OFDM System with Channel Estimation in a Nonlinear and Frequency-Selective Fading Channel", EURASIP Journal on Wireless Communications and Networking, 2011, 12 pages, vol. 2011.

Callender, Steven et al., "A Fully Integrated 160Gb/s D-Band Transmitter with 1.1 pJ/b Efficiency in 22nm FinFET Technology", mm-WAVE and Sub-THz ICs For Communication and Sensing, 2022, 3 pages, ISSCC 2022, Session 4.

Whitcombe, Amy et al., "A 6.0mW 3.8GS/s 7b VTC/TDC-Assisted Interleaved SAR ADC with 13GHz ERBW", 2022 IEEE Symposium on VLSI Technology and Circuits (VLSI Technology and Circuits), Jun. 2022, pp. 170-171, IEEE, Honolulu, HI, USA.

Sharma, Debendra Das, "PCI Express® 6.0 Specification at 64.0 GT/s with PAM-4 signaling: a low latency, high bandwidth, high reliability and cost-effective interconnect", IEEE Symposium on High-Performance Interconnects (HOTI) , 2020, 8 pages, IEEE.

Choi, Moon-Chul et al., "A 2.5-32 GB/s Gen 5-PCIe Receiver With Multi-Rate CDR Engine and Hybrid DFE", IEEE Transactions on Circuits and Systems II: Express Briefs, Jun. 2022, pp. 2677-2681, IEEE, vol. 69, Issue 6.

European Search Report issued for the corresponding Patent Application No. 22199009.6, dated Jun. 13, 2023, 15 pages (for informational purposes only).

* cited by examiner

FIG. 12

SNR in dB

| 4QAM | 3 | 4 | 5 | 6 | 7 | 8 | 9 | 10 | 11 | 12 | 13 |
|---|---|---|---|---|---|---|---|---|---|---|---|
| BER | 7.33E-03 | 3.72E-03 | 1.39E-03 | 4.07E-04 | 1.01E-04 | 2.21E-05 | 3.76E-06 | 4.86E-07 | 4.74E-08 | N/A | N/A |
| 1 | 6.73 | 15.29 | 31.07 | 55.33 | 80.16 | 94.44 | 99.05 | 99.39 | 100.00 | 0.00 | 0.00 |
| 2 | 50.14 | 61.71 | 59.61 | 42.18 | 19.43 | 5.56 | 0.95 | 0.61 | 0.00 | 0.00 | 0.00 |
| 3 | 8.89 | 5.90 | 2.69 | 0.81 | 0.12 | 0.00 | 0.00 | 0.00 | 0.00 | 0.00 | 0.00 |
| 4 | 29.70 | 16.35 | 6.57 | 1.68 | 0.29 | 0.00 | 0.00 | 0.00 | 0.00 | 0.00 | 0.00 |
| >4 | 4.54 | 0.74 | 0.07 | 0.00 | 0.00 | 0.00 | 0.00 | 0.00 | 0.00 | 0.00 | 0.00 |

| 16QAM | 6 | 7 | 8 | 9 | 10 | 11 | 12 | 13 | 14 | 15 | 16 |
|---|---|---|---|---|---|---|---|---|---|---|---|
| BER | 8.57E-03 | 5.29E-03 | 2.57E-03 | 9.86E-04 | 3.09E-04 | 8.52E-05 | 2.00E-05 | 3.98E-06 | 4.89E-07 | 5.33E-08 | N/A |
| 1 | 4.88 | 10.28 | 19.93 | 35.49 | 57.10 | 78.36 | 91.98 | 98.06 | 100.00 | 100.00 | 0.00 |
| 2 | 43.24 | 56.26 | 61.82 | 56.42 | 40.29 | 21.15 | 7.93 | 1.94 | 0.00 | 0.00 | 0.00 |
| 3 | 9.55 | 7.77 | 4.92 | 2.46 | 0.83 | 0.16 | 0.04 | 0.00 | 0.00 | 0.00 | 0.00 |
| 4 | 34.11 | 23.35 | 12.84 | 5.57 | 1.77 | 0.33 | 0.04 | 0.00 | 0.00 | 0.00 | 0.00 |
| >4 | 8.22 | 2.35 | 0.48 | 0.06 | 0.01 | 0.00 | 0.00 | 0.00 | 0.00 | 0.00 | 0.00 |

| 64QAM | 10 | 11 | 12 | 13 | 14 | 15 | 16 | 17 | 18 | 19 | 20 |
|---|---|---|---|---|---|---|---|---|---|---|---|
| BER | 8.19E-03 | 5.30E-03 | 2.82E-03 | 1.23E-03 | 4.48E-04 | 1.41E-04 | 3.93E-05 | 9.23E-06 | 1.61E-06 | 2.19E-07 | 2.37E-08 |
| 1 | 5.65 | 10.79 | 19.34 | 32.58 | 50.79 | 70.75 | 86.54 | 95.51 | 98.71 | 100.00 | 100.00 |
| 2 | 44.21 | 55.11 | 60.32 | 57.24 | 45.10 | 28.07 | 13.21 | 4.49 | 1.29 | 0.00 | 0.00 |
| 3 | 9.12 | 7.58 | 5.19 | 2.85 | 1.20 | 0.40 | 0.07 | 0.00 | 0.00 | 0.00 | 0.00 |
| 4 | 33.45 | 23.96 | 14.47 | 7.20 | 2.89 | 0.78 | 0.19 | 0.00 | 0.00 | 0.00 | 0.00 |
| >4 | 7.56 | 2.55 | 0.67 | 0.13 | 0.01 | 0.00 | 0.00 | 0.00 | 0.00 | 0.00 | 0.00 |

| 256QAM | 15 | 16 | 17 | 18 | 19 | 20 | 21 | 22 | 23 | 24 | 25 |
|---|---|---|---|---|---|---|---|---|---|---|---|
| BER | 6.70E-03 | 3.75E-03 | 1.89E-03 | 8.05E-04 | 2.92E-04 | 9.37E-05 | 2.59E-05 | 5.95E-06 | 1.11E-06 | 1.66E-07 | 5.93E-09 |
| 1 | 8.18 | 14.12 | 23.41 | 36.87 | 54.59 | 72.96 | 87.40 | 95.17 | 97.59 | 100.00 | 100.00 |
| 2 | 51.93 | 59.22 | 60.95 | 55.30 | 42.22 | 26.14 | 12.41 | 4.78 | 2.41 | 0.00 | 0.00 |
| 3 | 9.56 | 7.39 | 4.83 | 2.65 | 1.12 | 0.28 | 0.06 | 0.00 | 0.00 | 0.00 | 0.00 |
| 4 | 26.47 | 17.97 | 10.48 | 5.11 | 2.06 | 0.61 | 0.14 | 0.05 | 0.00 | 0.00 | 0.00 |
| >4 | 3.86 | 1.31 | 0.33 | 0.07 | 0.01 | 0.00 | 0.00 | 0.00 | 0.00 | 0.00 | 0.00 |

WIRELESS DEVICE AND METHODS FOR DYNAMIC CHANNEL CODING

CROSS-REFERENCE TO RELATED APPLICATIONS

This application claims priority to European patent application 22 199 009.6, filed on Sep. 30, 2022, the entire contents of which are incorporated herein by reference.

TECHNICAL FIELD

The present disclosure relates to a device for use in wireless data transmission and methods thereof.

BACKGROUND

In general, various technologies and standards have been developed for wireless communication, which is at the basis of a variety of services and applications in everyday life, such as the consumption of entertainment content via streaming services, the implementation of automated driving functionalities via exchange of information with a road infrastructure, or the design of Internet of Things environments in an industrial or in a home setting, as examples. An important aspect of the operation of a wireless network is the optimization of power consumption for operating the network. Another important aspect of various (input/output, I/O) wireless applications is latency, such as in wireless chip-to-chip communication, wireless on-chip communication, wireless sensor networks (e.g., IO-Link Wireless), etc. For such latency-critical wireless applications, a bit error rate (BER) of less than $10^{-10}$ may be desired or required at corresponding data rates. This may limit an energy-efficiency of latency-critical applications. For example, even though channel coding can decrease the BER in general, channel coding using current wireless error correction codes is usually unsuitable for latency-critical applications, such as Wireless I/O, since the current wireless error correction codes are exclusively designed for coding gain (hence, to reduce BER) and, therefore, increase the latency by introducing significant decoding penalties and using rebroadcast mechanisms. However, it may be desirable to achieve a BER of less than $10^{-10}$ at low latency while at the same time increasing the energy-efficiency.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of the invention are described with reference to the following drawings, in which:

FIG. 12 shows a percentage breakdown of errors per codeword respectively simulated at various signal-to-noise ratios for each of a 4, 16, 64, and 256 quadrature amplitude modulation;

DESCRIPTION

Figure 1A:
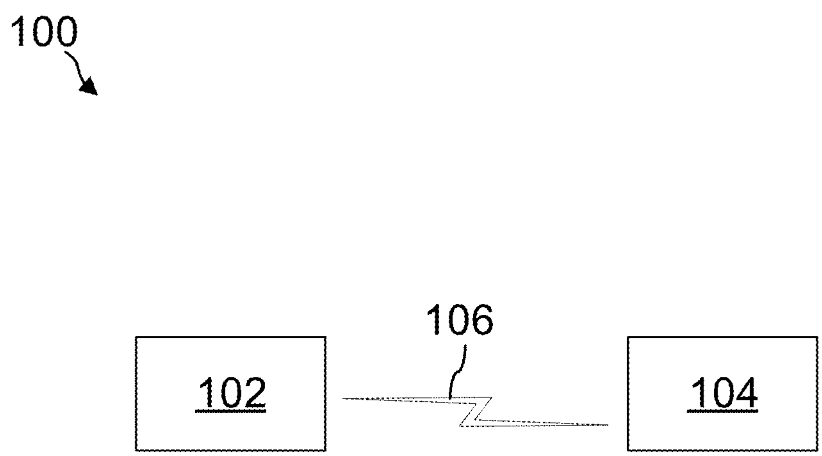
FIG. 1A to FIG. 1C each shows a wireless communication network in a schematic representation according to various aspects of the disclosure.

The following detailed description refers to the accompanying drawings that show, by way of illustration, specific details, and aspects in which the invention may be practiced. These aspects are described in sufficient detail to enable those skilled in the art to practice the invention. Other aspects may be utilized and structural, logical, and electrical changes may be made without departing from the scope of the invention. The various aspects are not necessarily mutually exclusive, as some aspects may be combined with one or more other aspects to form new aspects. Various aspects are described in connection with methods and various aspects are described in connection with devices (e.g., a device for use in a wireless network, a network access node, etc.). However, it may be understood that aspects described in connection with methods may similarly apply to the devices, and vice versa.

The use of current wireless error correction codes is unsuitable for channel coding in latency-critical environments since these current wireless error correction codes are exclusively designed for coding gain to reduce the bit error rate (BER), but ignore latency. This results in that these wireless error correction codes introduce significant decoding penalties and further use rebroadcast mechanisms, both of which increases the latency. However, it is exceedingly challenging to achieve bit error rates (BER) of less than $10^{-10}$ in wireless environments without channel coding. The current wireless error correction codes also ignore power-efficiency which makes them also unsuitable in terms of reducing the required power.

The present disclosure relates to a forward error correction (FEC) scheme (using channel coding) using a linear code which allows to achieve a low latency (e.g., a latency of less than 1 ms, e.g., a latency of less than 100 ns) while at the same time increasing the energy-efficiency. Thus, for example, latency-critical application, such as in wireless chip-to-chip communication, wireless on-chip communication, wireless sensor networks (e.g., IO-Link Wireless), etc., can use the dynamic selection of a forward error correction scheme advantageously.

The use of a linear code for forward error correction according to the present disclosure allows to reduce phase noise and/or linearity requirements of an analog frontend (AFE) circuit used in wireless data transmission which results in a significant reduction of implementation power and area. For example, the present disclosure allows a relaxation of the bit error rate (BER) of uncoded data to about $10^{-6}$ and even to about $10^{-3}$ which allows to reduce the requirements on the AFE circuit and, therefore reduces implementation power and area. This allows to simplify the AFE circuit and, therefore, makes it more process-portable (e.g., to another processing technique). Achieving a BER of less than about $10^{-6}$ places extremely high linearity and phase noise requirements on the AFE circuit; this may not be required using the linear code for forward error correction according to the present disclosure.

As detailed herein, using a linear code for forward error correction (FEC) allows to reduce, for example, the energy consumption wherefore this approach can be used in static wireless environments. For example, two chips within a multi-chip-package may communicate wirelessly with each other using FEC with a predefined linear code.

Further, the present disclosure allows to dynamically change between different error correction schemes depending on (expected) channel conditions of a wireless link over which data are transmitted. Each error correction scheme of these different error correction schemes may indicate a respective (e.g., different) error correction code (in some aspects also referred to as channel code). Thus, the present disclosure may allow to dynamically switch between different error correction codes. In some aspects, each of these error correction codes may be a respective linear code. This dynamic and adaptive error correction scheme (e.g., error correction code) selection allows to reduce the requirements on the adaptive channel equalizer (within the digital baseband, DBB). For example, in various wireless networks devices have to operate in static and dynamic environments which may lead to an overdesign of the adaptive channel equalizer (short: equalizer). The dynamic selection of an error correction scheme according to the present disclosure allows to, for example, reduce the number of taps and/or bit-widths in the adaptive channel equalizer (or even eliminate it). Since the adaptive channel equalizer may account for about 50% to about 70% of the area and/or power of the digital baseband of a wireless receiver, reducing the requirements on the adaptive channel equalizer can decrease the implementation power and area of the wireless communication device significantly. The dynamic and adaptive error correction scheme selection according to the present disclosure also enables higher data rates using (e.g., (in bandwidth constrained environments) higher-order modulations (e.g., quadrature amplitude modulations (QAM), such as 16QAM, 64QAM, 256QAM, as examples) while still scaling energy-efficiency. The phrase "higher-order modulations", as used herein, may refer to modulation schemes using two or more bits per symbol.

Hence, the present disclosure solves the fundamental tradeoff between BER, data rate, and power that ultimately limits the energy efficiency of wireless links as compared to wireline links. A comparison of two wireless use cases employing the dynamic and adaptive error correction code selection according to the present disclosure to a wireline use case (in particular Peripheral-Component-Interconnect-Express, PCIe, wireline connections using 4-Pulse-Amplitude-Modulation, 4PAM) is provided in Table 1.

The present disclosure relates to a device configured to dynamically select an error correction scheme depending on expected channel conditions (e.g., an expected signal-to-noise ratio, SNR) of a wireless link between the device and a further device or between elements of the device. These expected channel conditions may be represented by sensor data which are acquired by one or more sensors of the device or the further device.

Figure 1B:
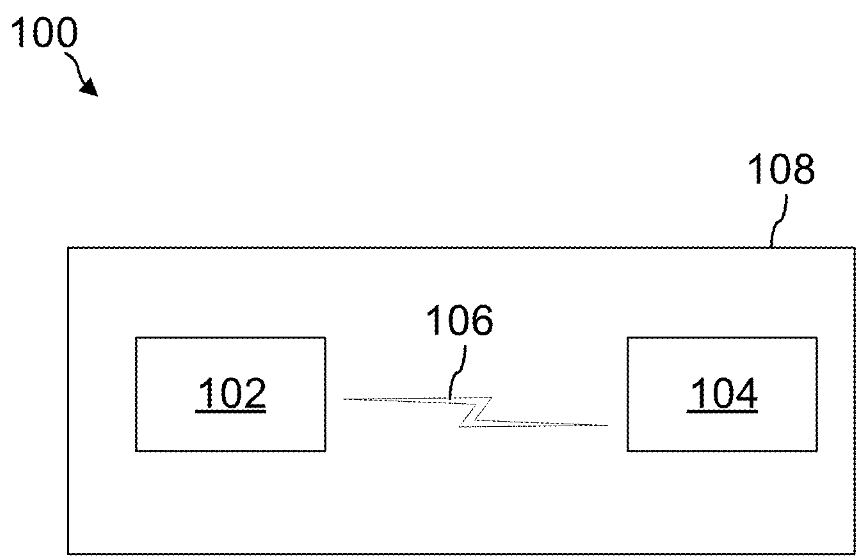
Figure 1C:
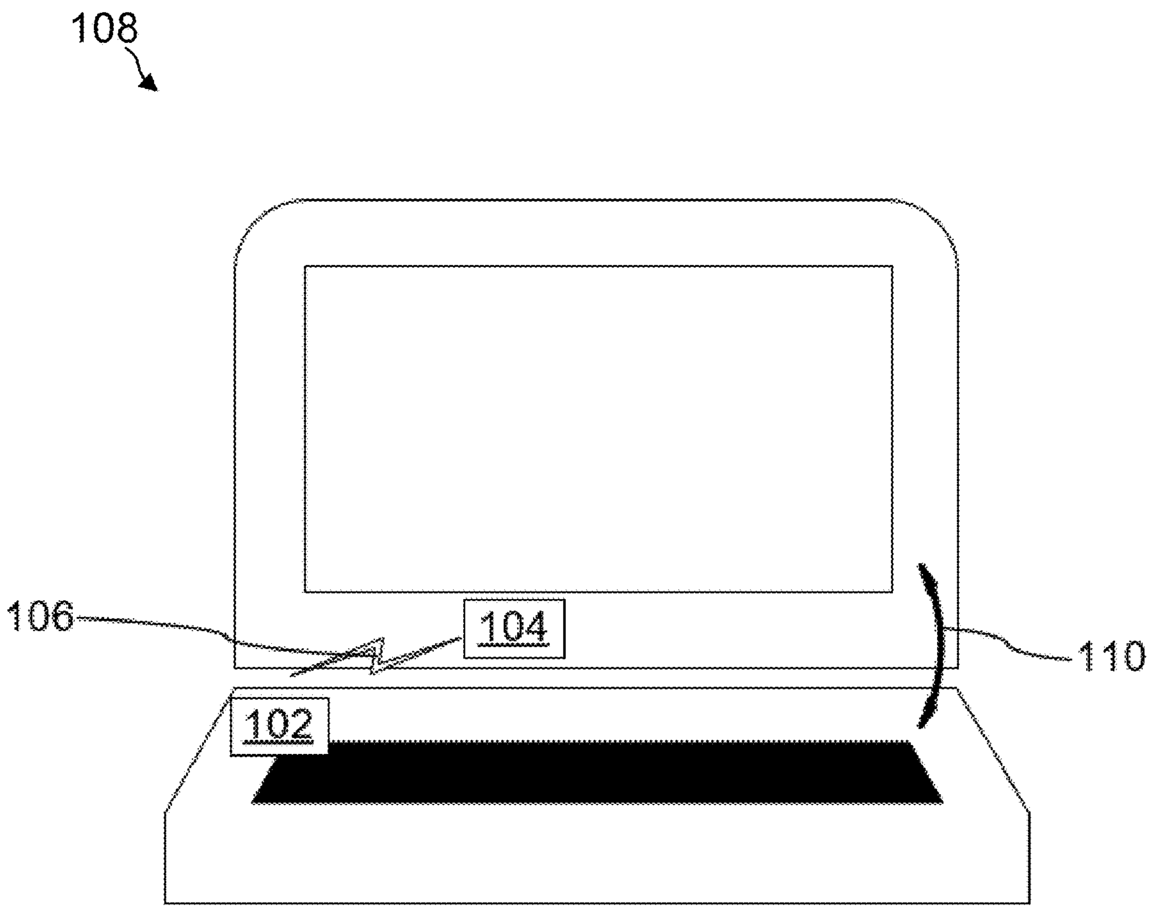

FIG. 1A and FIG. 1B show a wireless communication network 100 in a schematic representation according to the present disclosure. In the wireless communication network 100 (in some aspects referred to as wireless network) various devices may communicate with each other. For example, a first device 102 may communicate with a second device 104 over a wireless communication link 106, e.g. over a physical interface (e.g., an air interface). The wireless communication link 106 may be associated with any suitable radio frequency range depending on the application. For example, in the case of a chip-chip communication (also referred to as inter-chip communication) and/or an on-chip communication (also referred to as intra-chip communication), the radio frequency range may be in ultra-wideband (UWB) frequency range (e.g., in a radio frequency range from about 3.1 GHz to about 10.6 GHz) or in the D-band (e.g., in a radio frequency range from about 110 GHz to about 170 GHz). Various aspects described herein refer to the wireless communication between the first device 102 and the second device 104. It is understood that the first device 102 and/or the second device 104 may also communicate wirelessly with one or more further devices. According to some aspects, this communication with the one or more further devices may be similar to the communication scheme described herein. According to other aspects, the communication with the one or more further devices may be differently. According to various aspects, the first device 102 may be configured to channel-code data and to transmit the channel-coded data to the second device 104, and vice versa. The first device 102 may be configured to dynamically select an error correction code which is to be used for channel coding and the second device 104 may be configured to also dynamically select the error correction code to correct (bit) errors in data received from the first device 102. Correspondingly the second device 104 may be configured to dynamically select an error correction code which is to be used for channel coding and the first device 102 may be configured to also dynamically select the error correction code to correct (bit) errors in data received from the second device 104. As described herein, this dynamic error correction code selection may be provided for the wireless communication in latency-critical applications. Examples of such latency-critical applications may be a communication between chips of a same device (i.e., a chip-to-chip communication), a communication between components of a same chip (i.e., an on-chip communication), a communication between safety-related components of a system (e.g., components (e.g., sensors) of an autonomous vehicle, as example), and/or a communication in a sensor network (e.g., sensors of an JO-Link Wireless network), etc. Hence, the first device 102 and the second 104 may be part of a system 108 (see, for example, FIG. 1B). This system 108 may be any suitable (e.g., latency-critical) system: According to an example, the system 108 may be a chip and the first device 102 and the second device 104 may each be a respective component of the chip (in this case, the wireless communication between the first device 102 and the second device 104 may be an on-chip communication). According to a further example, the system 108 may be an autonomous vehicle and the first device 102 and the second device 104 may each be a respective device (e.g., a sensor, a processing device, a memory device, etc.) of the autonomous vehicle. According to an even further example, the system 108 may be a multi-chip package including the first device 102 associated with a first chip and the second device 104 associated with a second chip (in this case, the wireless communication between the first device 102 and the second device 104 may be a chip-to-chip communication). According to an even further example, the system 108 may be a device including the first device 102 and the second device 104; in this case, the first device 102 may be any component (e.g., a sensor, a processing device, a memory, etc.) of the device and the second device 104 may be any component (e.g., a sensor, a processing device, a memory, etc.) of the device. For example, as shown in FIG. 1C, the system 108 may be a laptop or a convertible-like device (e.g., a Convertible) including the first device 102 and the second device 104. The convertible-like device may be any device having a first portion and a second portion (different from the first portion) configured such that a distance between the first portion and the second portion and/or an orientation of the first portion relative to the second portion can be changed (e.g., a user may change the distance and/or orientation). As an example, a convertible-like device may be configured to such that it can change from a laptop-configuration to a tablet-configuration, and vice versa. The first portion and/or the second portion may be or may include, for example, a lid, a display, etc. As illustratively shown in the example of FIG. 1C, in the case that the first device 102 is arranged in the first portion and the second device 104 is arranged in the second portion (or vice versa), a distance between the first device 102 and the second device 104 and/or an orientation of the first device 102 relative to the second device 104 may be changed. This may affect the wireless communication link 106 and, thus, the data transfer between the first device 102 and the second device 104. This may also be referred to as a wireless hinge 110 (e.g., representing a wireless hinge angle). Hence, in certain applications, conditions of the wireless communication link 106 (in some aspects referred to as radio-frequency environment) may not be static but may change dynamically. The dynamic error correction code selection according to the present disclosure allows a dynamic adaption to such changes of the radio-frequency environment (see, for example, FIG. 2 and corresponding description). This dynamic adaption requires neither a re-training of a channel equalizer (in some aspects referred to as adaptive channel equalizer or short equalizer) nor a reliance on rebroadcast mechanisms. Rebroadcast mechanisms add non-deterministic latency which makes them unsuitable for latency-critical applications.

Since wireline communication links only operate in static environments, wireline applications either use no error correction codes or one predefined error correction code. Due to the static nature of the wireline communication links, there is no reason to adapt the error correction code.

However, even though various aspects are described with reference to latency-critical applications, it is understood that the dynamic and adaptive error correction scheme selection may also be used in other applications in which latency is less important. In these applications, for example the energy-efficiency of wireless communication devices may be improved when using the dynamic error correction code selection (e.g., by decreasing the implementation power and area of the wireless communication device as described herein).

Depending on the application, the wireless communication between the first device 102 and the second device 104 may be any kind of short-range communication (e.g., according to any suitable short-range communication standard) associated with a corresponding frequency range. As an example, in the case of on-chip communication and/or chip-to-chip-communication, the first device 102 and the second 104 may communicate with each other using ultra-wideband, UWB, technology. In the following, the wireless communication between the first device 102 and the second device 104 is described independent of a specific wireless short-range communication standard and/or a specific frequency range since the dynamic and adaptive selection of the error correction scheme can be used for any kind of wireless communication.

Figure 1D:
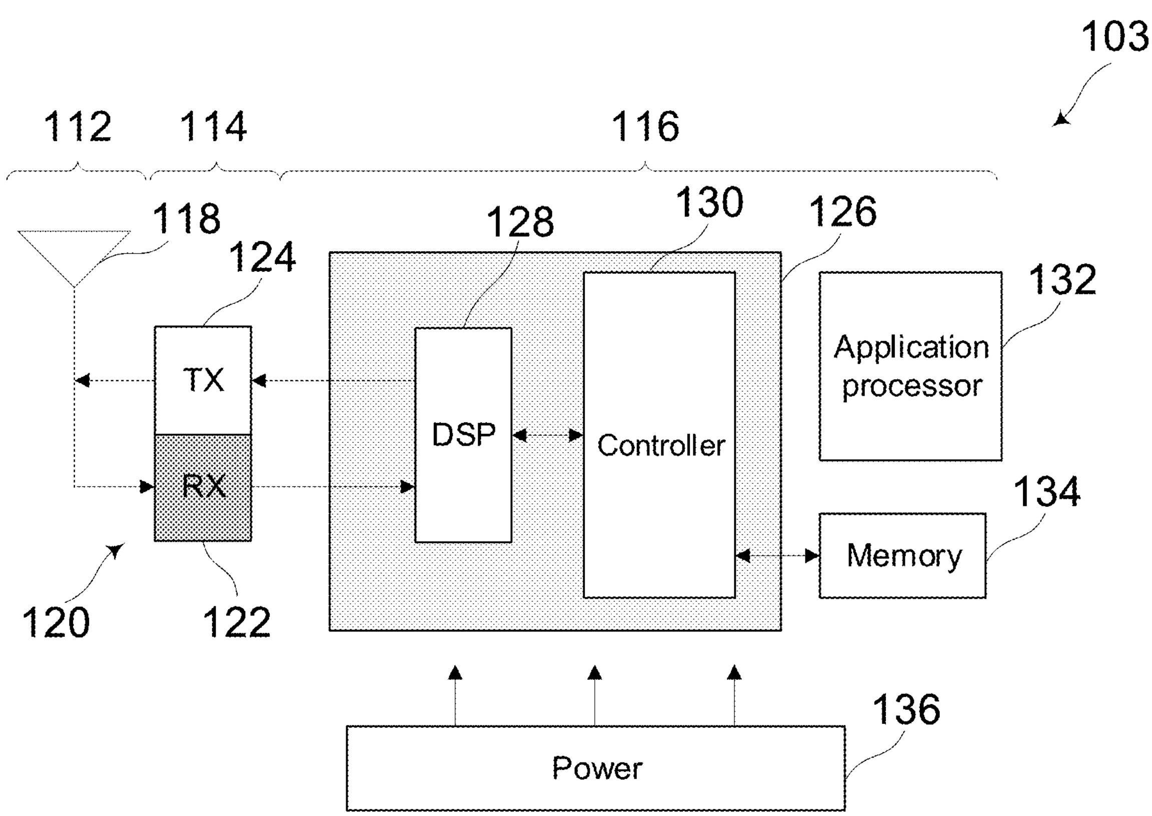
FIG. 1D shows a wireless communication device in a schematic representation according to various aspects of the disclosure.

FIG. 1D shows an exemplary configuration of a wireless communication device 103 in a schematic representation. According to various aspects, the first device 102 and/or the second device 104 may be configured in accordance with this wireless communication device 103. However, it is noted that this serves as an example and that the first device 102 and/or the second device 104 may be configured differently as long as the first device 102 and the second device 104 can wirelessly communicate with each other.

In general, the wireless communication device 103 may include an antenna system 112 (also referred to herein as antenna circuitry), a transceiver system 114 (also referred to herein as transceiver circuitry), and a processing system 116 (also referred to herein as signal processing circuitry). In the following a description of exemplary components for the various sections 112, 114, 116 of the wireless communication device 103 will be provided. It is understood that the configuration illustrated in FIG. 1D is exemplary, and a wireless communication device 103 may include additional, less, or alternative components with respect to those shown. As examples, the wireless communication device 103 may include one or more additional hardware and/or software components depending on its configuration and its intended use, such as processors/microprocessors, controllers/microcontrollers, other specialty or generic hardware/processors/circuits, peripheral device(s), power supply, or other related components.

The wireless communication device 103 may be configured to transmit and receive radio frequency signals via the antenna system 112, which may include one or more (e.g., directional or omnidirectional) antennas 118, e.g. a single antenna or an antenna array that includes multiple antennas. The one or more antennas 118 may include, for example, dipole antennas, monopole antennas, patch antennas, loop antennas, microstrip antennas, or other types of antennas suitable for transmission of radio frequency signals. As an exemplary configuration, an antenna 118 may have multiple apertures, each of which may be considered as an antenna. In an exemplary configuration, the antenna system 112 may additionally include analog antenna combination and/or beamforming circuitry.

Figure 5:
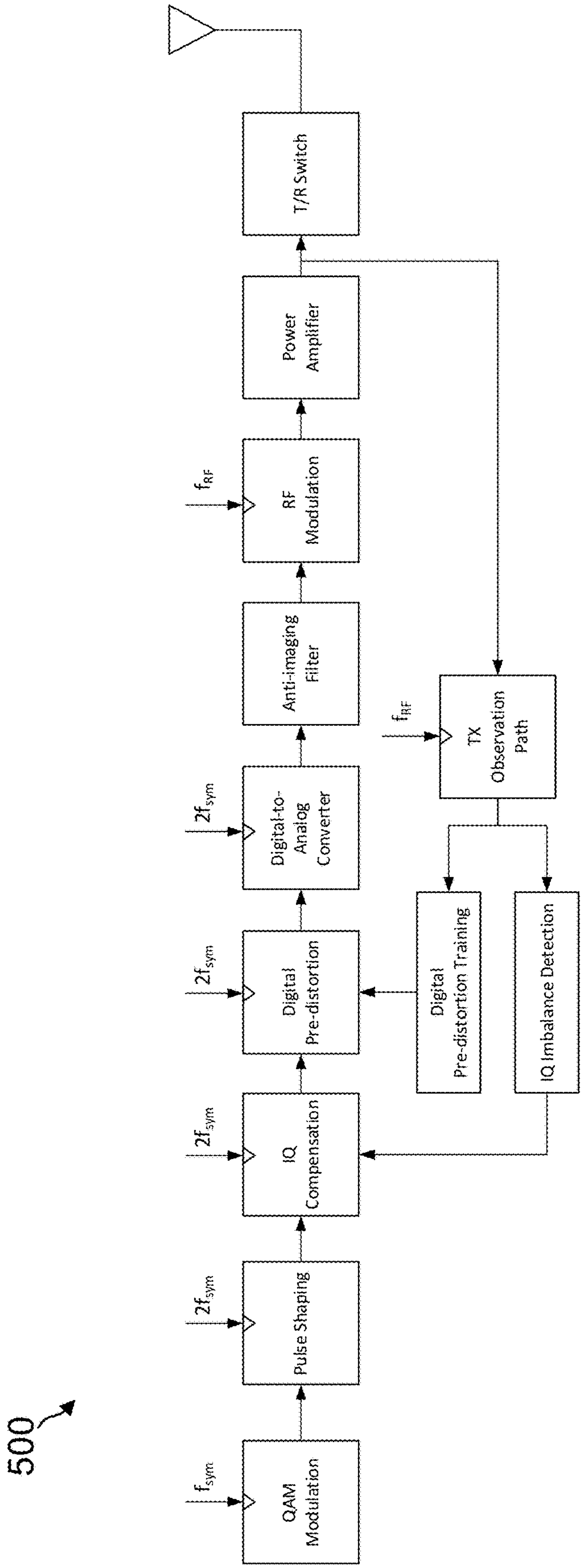
FIG. 5 shows an exemplary processing diagram of a transmitter according to various aspects of the disclosure.
Figure 8:
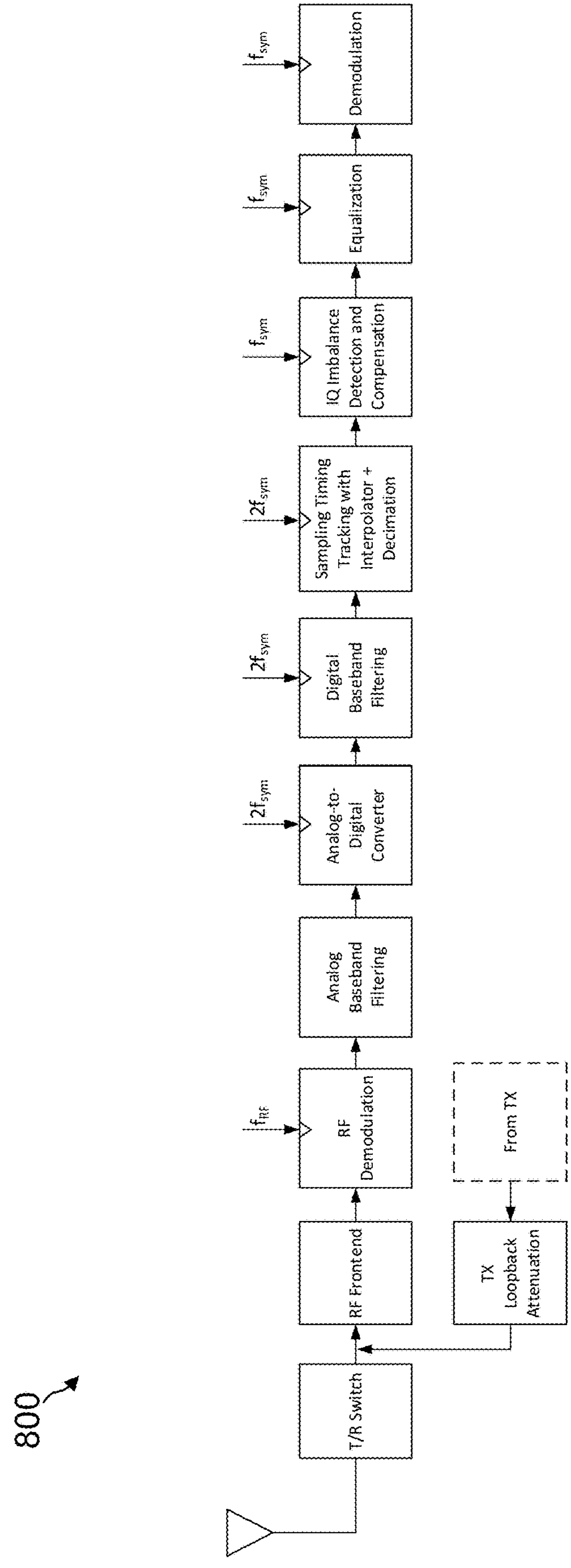
FIG. 8 shows an exemplary processing diagram of a receiver according to various aspects of the disclosure.

The transceiver system 114 may include a transmitter and a receiver. According to various aspects, the transceiver system 114 may include a radio frequency (RF) transceiver 120, having a receive (RX) path 122 (e.g., representing the receiver) and a transmit (TX) path 124 (e.g., representing the transmitter). The RF transceiver 120 may include analog and digital reception components including amplifiers (e.g., Low Noise Amplifiers (LNAs)), Power Amplifiers (PAs), filters, RF demodulators (e.g., RF IQ demodulators)), and analog-to-digital converters (ADCs), which RF transceiver 120 may utilize to convert radio frequency signals to digital baseband samples. In the receive (RX) path 122, the RF transceiver 120 may be configured to receive analog radio frequency signals from the antenna system 112 and perform analog and digital RF front-end processing on the analog radio frequency signals to produce digital baseband samples (e.g., In-Phase/Quadrature (IQ) samples). In the transmit (TX) path 124, the RF transceiver 120 may be configured to receive digital baseband samples from the processing system 116 (e.g., from a baseband modem 126 of the processing system 116) and perform analog and digital RF front-end processing on the digital baseband samples to produce analog radio frequency signals to provide to the antenna system 112 for wireless transmission. The RF transceiver 120 may thus also include analog and digital transmission components, which RF transceiver 120 may utilize to mix the digital baseband samples received from the processing system 116 and produce the analog radio frequency signals for wireless transmission by the antenna system 112. An exemplary processing scheme of the transmit (TX) path 124 (in some aspects referred to as transmitter) is shown in FIG. 5 and described with reference thereto. An exemplary processing scheme of the receive (RX) path 122 (in some aspects referred to as receiver) is shown in FIG. 8 and described with reference thereto.

Figure 4:
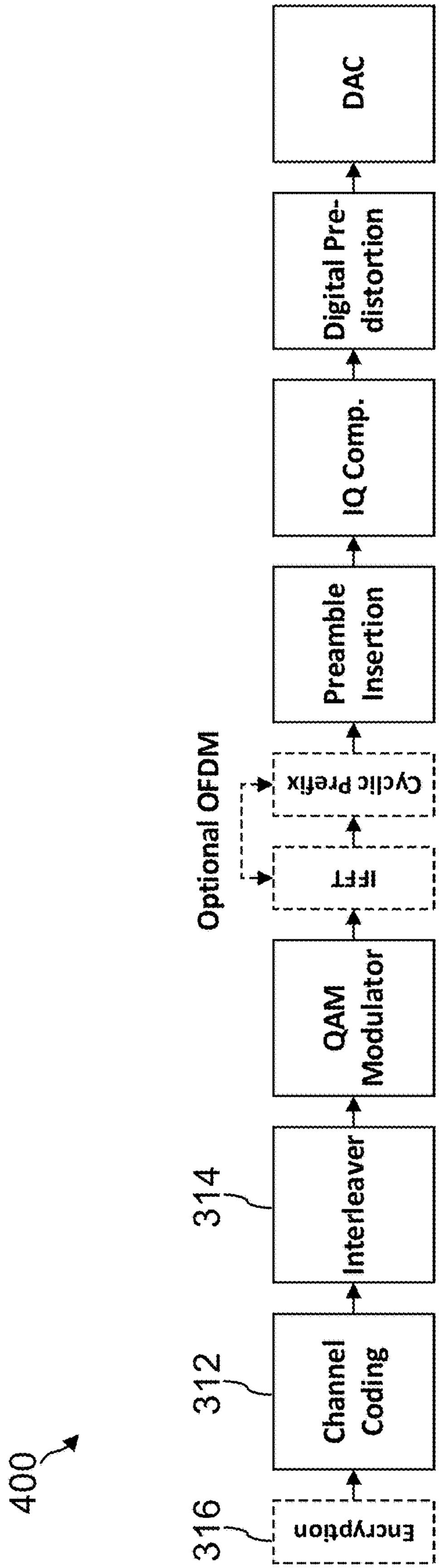
FIG. 4 shows a digital baseband processing for data transmission according to various aspects of the disclosure.
Figure 7:
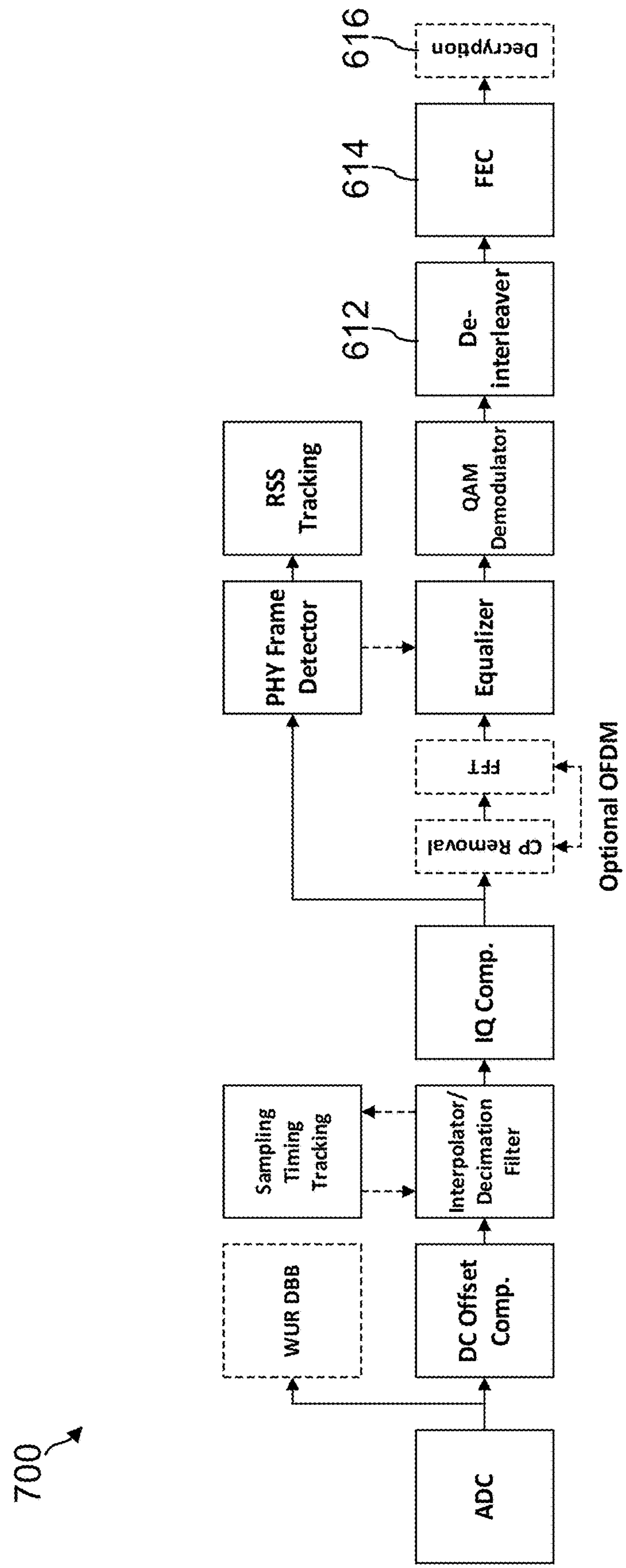
FIG. 7 shows a digital baseband processing for data reception according to various aspects of the disclosure.

The processing system 116 may be configured for transmission and reception processing. The processing system 116 may include, for example, a baseband modem 126 (e.g., including a digital signal processor 128 and a protocol controller 130), an application processor 132, a memory 134, and a power supply 136. The baseband modem 126 may be configured to direct the communication functionality of wireless communication device 103 according to the communication protocols associated with each (radio) access network, and may be configured to execute control over antenna system 112 and RF transceiver 120 to transmit and receive radio signals according to the formatting and scheduling parameters defined by each communication protocol. The baseband modem 126 may include a digital signal processor (DSP) 128. The digital signal processor 128 may be configured to perform physical layer (PHY, Layer 1) transmission and reception processing to, in the transmit path 124, prepare outgoing transmit data that the protocol controller 130 provides for transmission via RF transceiver 120, and, in the receive path 122, prepare incoming received data that the RF transceiver 120 provides for processing by the protocol controller 130. Digital signal processor 128 may be configured to, for data transmission, dynamically select an error correction scheme from two or more error correction schemes (e.g., an error correction code from two or more error correction codes) and to channel-code input data using an error correction code represented by the selected error correction scheme. The digital signal processor 128 may be configured to, for data reception, dynamically select an error correction scheme from the two or more error correction schemes and to apply the selected error correction scheme on received data. Each error correction scheme of the two or more error correction schemes may represent a respective error correction code. According to various aspects, at least one (e.g., each) of the error correction codes represented by the two or more error correction schemes may be a linear (block) code (see, for example, FIG. 9A to FIG. 11D and corresponding description). Further, the digital signal processor 128 may be configured to carry out encoding/decoding, interleaving, channel modulation/demodulation, physical channel mapping, radio measurement and search, frequency and time synchronization, antenna diversity processing, power control and weighting, rate matching/de-matching, interference cancellation, and any other physical layer processing functions. An exemplary digital baseband processing for data transmission is shown in FIG. 4 and described with reference thereto. An exemplary digital baseband processing for data reception is shown in FIG. 7 and described with reference thereto.

The wireless communication device 103 may be configured to operate according to one or more radio communication technologies, and the digital signal processor 128 may be responsible for lower-layer processing functions (e.g., PHY, Layer 1) of the radio communication technologies, while the protocol controller 130 may be responsible for upper-layer protocol stack functions (e.g., Data Link Layer/Layer 2 and/or Network Layer/Layer 3). Protocol controller 130 may thus be responsible for controlling the radio communication components of wireless communication device 103 (e.g., antenna system 112, RF transceiver 120, and digital signal processor 128) in accordance with the communication protocols of each supported radio communication technology, and accordingly may represent the Access Stratum and Non-Access Stratum (NAS) (also encompassing Layer 2 and Layer 3) of each supported radio communication technology. The dynamic adaption of the error correction code according to the present disclosure may be employed for data-plane communication and/or control-plane communication (see also Table 1 and corresponding description). The processing system 116 may further include an application processor 132 (e.g., a CPU) and a memory 134. The application processor 132 may be configured to handle the layers above the protocol stack, including the transport and application layers. The application processor 132 may interface with baseband modem 126 and act as a source (in the transmit path) and a sink (in the receive path) for data, such as user data, sensor data, etc. The memory 124 may include one or more memory components, such as permanent and/or non-permanent memory components.

In the following, the dynamic selection of an error correction scheme is described in detail.

Figure 2:
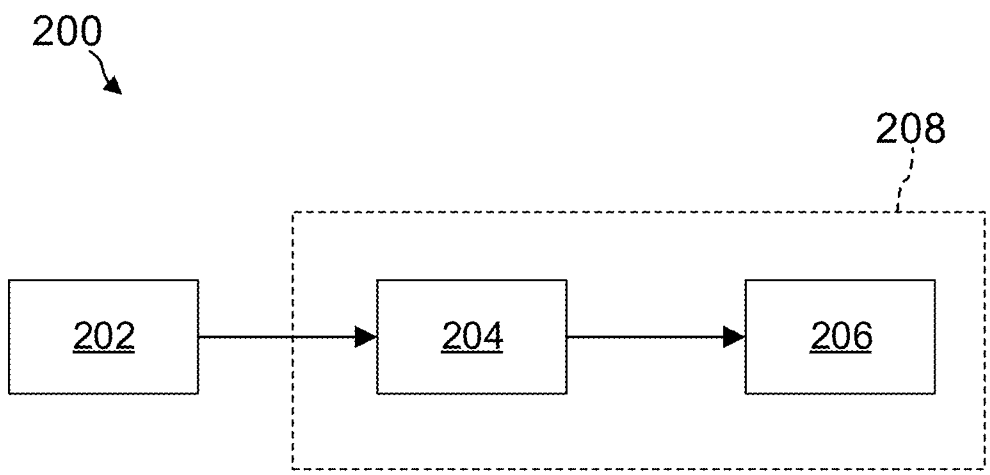
FIG. 2 shows a processing scheme for selecting an error correction code according to various aspects of the disclosure.

FIG. 2 shows a processing scheme 200 for selecting an error correction code from two or more error correction codes. According to various aspects, one or more processors 208 may be configured to receive sensor data 202 (indirectly or directly from one or more sensors). For example, one or more sensors may be configured to generate respective data and to provide the respectively generated data (directly or indirectly) to the one or more processors 208. The sensor data 202 may include all of these provided data. Each of the one or more sensors may be configured to detect information representing the wireless communication link 106 between the first device 102 and the second device 104. This information may be any kind of information which allow to conclude a condition of the wireless communication link 106 and/or a change of the condition of the wireless communication link 106. According to various aspects, the sensor data 202 represent a physical state of the first device 102 and/or the second device 104 (e.g., of the system 108). The physical state may be an orientation, a position, a configuration (e.g., a computer-form), etc. of the first device 102 and/or the second device 104.

For example, at least one sensor of the one or more sensor may be configured to detect information representing an orientation of the first device 102 and/or the second device 104, information representing a change of the orientation of the first device 102 and/or the second device 104, information representing a position of the first device 102 and/or the second device 104, and/or information representing a change of the position of the first device 102 and/or the second device 104. In the case that the first device 102 and the second device 104 are part of a laptop and/or a convertible-like device, as shown in FIG. 1C, the at least one sensor may be, for example, a sensor capable to detect information representing the wireless hinge 110 (e.g., to detect an angle and/or a changing angle). For example, the at least one sensor may be a magnetic sensor, a hall sensor, an accelerometer, a gyro sensor (or gyroscope), an acoustic sensor, a tilt sensor, a capacitive sensor, etc. According to various aspects, the system 108 may be further configured to wirelessly communicate via another wireless network, such as a short-range wireless network (e.g., a wireless local area network, WLAN, network (e.g., according to any IEEE 802.11 standard), a Bluetooth network, a near-field communication, NFC, network, an ultra-wideband, UWB, network, etc.) and/or a medium-range and/or long-range wireless network (e.g., a cellular network (in some aspects referred to as mobile phone network). The network conditions of this other wireless network may also represent the dynamic environment of the system 108 (e.g., the laptop or convertible-like device). For example, changing an orientation and/or position of the system 108 may directly affect a wireless communication link of the system 108 to another system or device. At least one sensor of the one or more sensors may be a camera sensor configured to detect images of a surrounding of the system 108. These images may also represent a position and/or orientation of the device.

The one or more processors 208 may be configured to implement a model 204. The model 204 may be configured to provide (e.g., to output) a forward error correction scheme 206 (short selected error correction scheme 206) from two or more forward error correction schemes responsive to inputting the sensor data 202. Each forward error correction scheme of the two or more forward error correction schemes may represent a respective error correction code. At least some of the error correction codes represented by the two or more forward error correction schemes may be different from one another. Thus, the one or more processor s208 may use the model 204 to select an error correction code from two or more error correction codes. Hence, the model 204 may be configured to determine the error correction code which is to be selected based on the sensor data 202. Illustratively, the model 204 may be configured to map the sensor data 202 to the error correction scheme 206 which is to be selected from the two or more error correction schemes. Optionally, the error correction scheme 206 may further represent, whether to interleave data which are channel-coded using the selected error correction code (or not). As an example, a first error correction scheme of the two or more error correction schemes may include a first error correction code (e.g., a first linear code) and a second error correction scheme of the two or more error correction schemes may include a second error correction code (e.g., a second linear code) different from the first error correction code. As another example, both, a first error correction scheme and a second error correction scheme of the two or more error correction schemes may include a same error correction code but the first error correction scheme may include to not use interleaving whereas the second error correction code may include to channel-code data using this same error correction code and to interleave the channel-coded data.

The model 204 may be any kind of model which allows to provide a forward error correction scheme (e.g., including an error correction code) from two or more forward error correction schemes responsive to inputting the sensor data or responsive to inputting a representation of the sensor data after pre-processing. For example, the model 204 may be a trained machine-learning model, such as a reinforcement learning model (e.g., employing Q-learning, temporal difference (TD), deep adversarial networks, etc.), a classification model (e.g., a linear classifier (e.g., logistic regression or naive Bayes classifier), a support vector machine, a decision tree, a boosted tree, a random forest, a neural network, or a nearest neighbor model), a (finite) state machine, etc. A neural network may be any kind of neural network, such as a convolutional neural network, an autoencoder network, a variational autoencoder network, a sparse autoencoder network, a recurrent neural network, a deconvolutional network, a generative adversarial network, a forward-thinking neural network, a sum-product neural network, among others.

Optionally, the model 204 may include two or more sub-models. As an example, the model 204 may include a first sub-model and a second sub-model. The first sub-model may be configured to provide (e.g., to output and/or to classify), responsive to inputting the sensor data 202 into the first sub-model, expected channel conditions (e.g., an expected signal-to-noise ratio) of the wireless communication link 106. The second sub-model may be configured to provide, responsive to inputting the expected channel conditions (e.g., the expected signal-to-noise ratio) of the wireless communication link 106 into the second sub-model, the error correction scheme 206 which is to be selected from the two or more forward error correction schemes. In this example, the first sub-model may be a trained machine-learning model and the second sub-model may be either a trained machine-learning model or may include one or more predefined threshold values associated with the expected channel conditions (e.g., one or more predefined signal-to-noise ratio, SNR, threshold values). For example, in the latter case, the second sub-model may be configured to select one of the two or more error correction schemes depending on a value of the SNR.

A processor may train the machine-learning model initially (e.g., offline) using a set of labelled sensor data. According to an example, each labelled sensor datum of the set of labelled sensor data may be associated with a respective error correction scheme which is to be selected from the two or more error correction schemes and the model 204 is trained to output this associated error correction scheme responsive to inputting a respective labelled sensor datum (as sensor data 202). According to another example, the first device 102 and/or the second device 104 and/or the system 108 may be brought into a plurality of physical states one after another (e.g., by changing the wireless hinge angle 110) and, iteratively for (e.g., in) each physical state of the plurality of physical states, sensor data may be acquired and the (e.g., expected) channel conditions may be determined (e.g., measured and/or simulated), and the first sub-model may be trained to output the channel conditions responsive to inputting the sensor data. The channel conditions may be, for example, represented by a signal-to-noise ratio, SNR. As an example, the model 204 may be a classification model and the model 204 may be configured to output a respective probability for each error correction scheme of the two or more error correction schemes and the error correction scheme having the highest probability may be the error correction scheme 206 which is to be selected. In this example, the processor may train the model 204 to increase the probability of the associated error correction scheme responsive to inputting a respective labelled sensor datum (as sensor data 202).

The memory 134 or another memory coupled to the digital signal processor 128 may store the model 204.

In the case of data transmission, the one or more processors 208 may be configured to select the error correction scheme 206 using the model 204 and to use the error correction code represented by the selected error correction scheme 206 for channel-coding data (e.g., provided by the application processor 132). In the case of data reception, the one or more processors 208 may be configured to select the error correction scheme 206 using the model 204 and to apply the error correction code represented by the selected error correction scheme 206 on received (channel-coded) data. In the case that the received (channel-coded) data include bit errors, the digital signal processor 128 may correct and/or detect at least some of these bit errors using the error correction code represented by the selected error correction scheme 206. In some aspects, the error correction code represented by the selected forward error correction scheme 206 is denoted as selected error correction code.

According to various aspects, the processor may further train the model 204 during use (also called online training). In the case of data reception, the one or more processors 208 (e.g., the digital signal processor 128) may be configured to determine a bit error rate, BER, of the received data and/or a number of bit errors (e.g., per codeword). The one or more processors 208 may be configured to determine, based on the determined BER and/or the determined number of bits, whether another error correction scheme should have been selected from the two or more error correction schemes (e.g., including another error correction code for channel-coding the data) by the transmitting device (e.g., in the case that the determined BER and/or the number of bits is greater than a respectively predefined threshold value). In the case that the one or more processors 208 determine that another error correction scheme should have been selected, the one or more processors 208 may be configured to further train the model 204 to output the other error correction scheme responsive to inputting the corresponding sensor data 202. The online training of the model 204 may also be a learning at fleet level, such as federated learning or another collaborative learning approach.

Using the model 204 allows to adapt the forward error correction scheme (and thus the error correction code which is to be used for channel coding) depending on the conditions of the wireless communication link 106, thereby allowing to adapt to dynamic radio frequency environments.

Figure 3A:
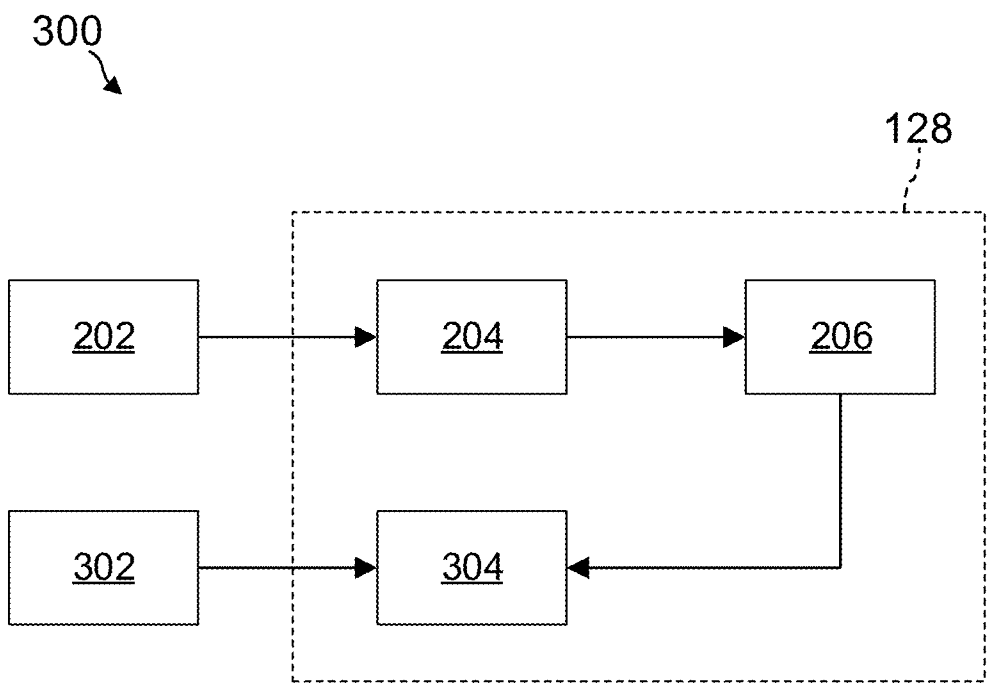
FIG. 3A to FIG. 3E each shows a processing scheme for generating data for wireless transmission according to various aspects of the disclosure.
Figure 3B:
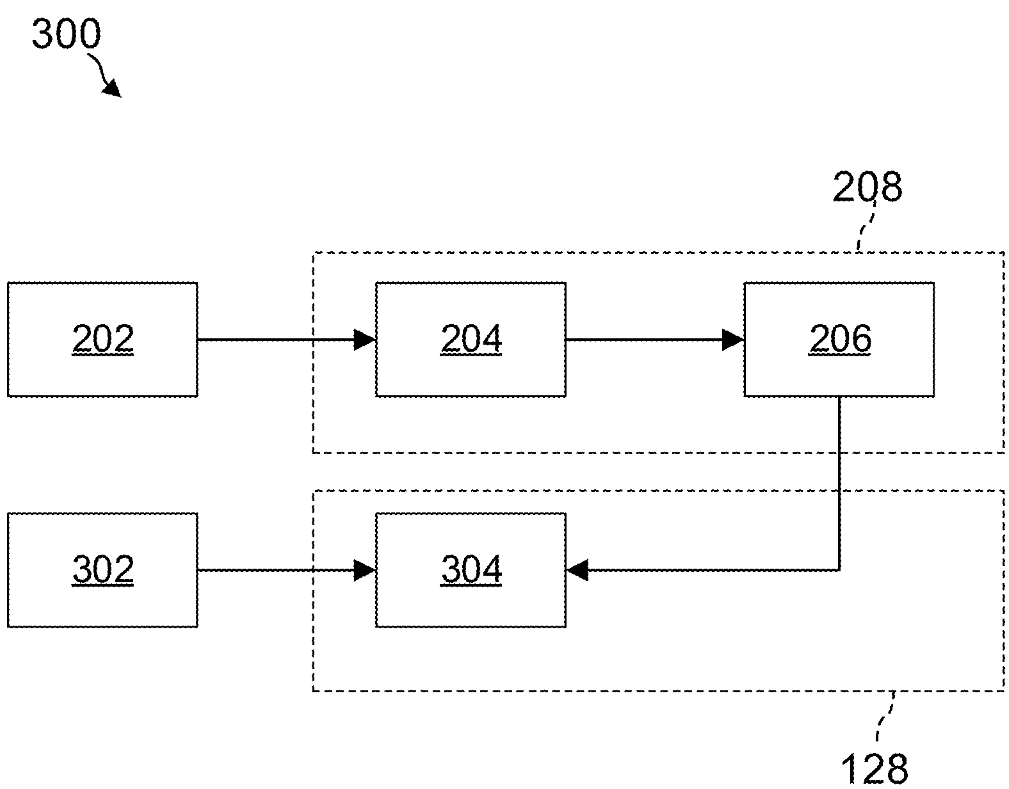
Figure 6A:
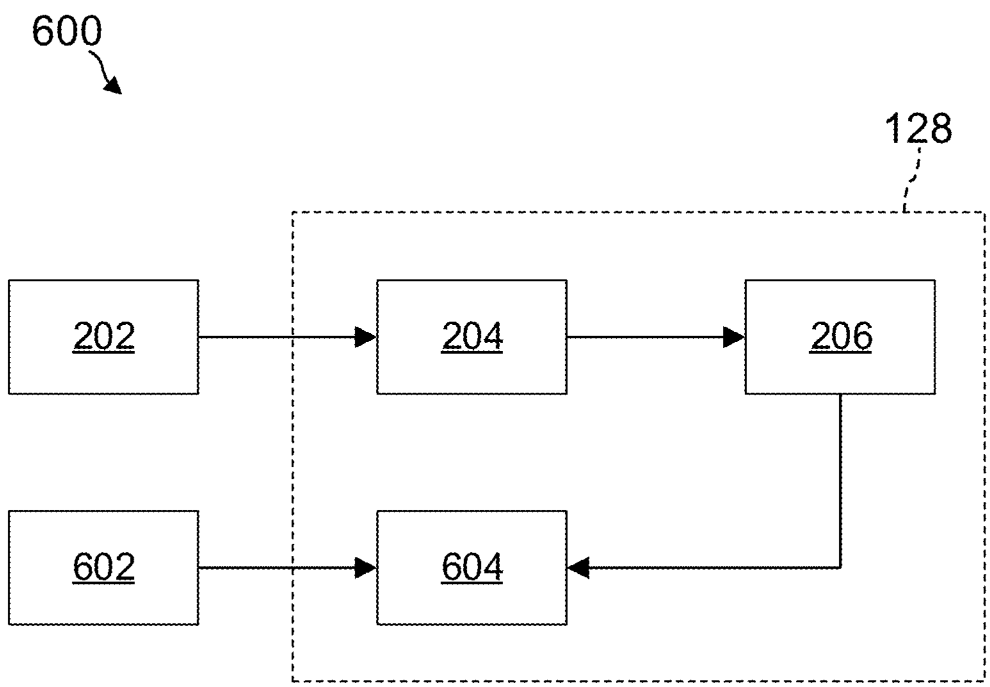
FIG. 6A to FIG. 6E each shows a processing scheme for processing wirelessly received data according to various aspects of the disclosure.
Figure 6B:
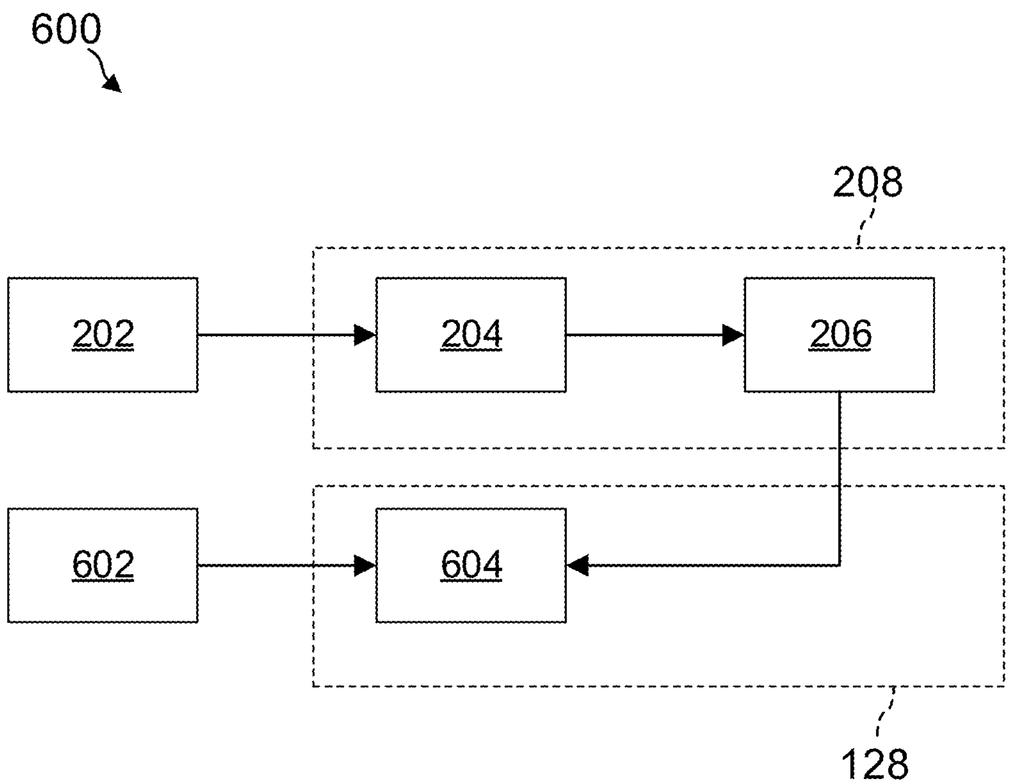

According to some aspects, the one or more processors 208 may include or may be the digital signal processor 128. In this case, the digital signal processor 128 may be configured to implement the model 204 to determine the error correction scheme 206 which is to be selected (see, for example, FIG. 3A in the case of data transmission and FIG. 6A and in the case of data reception). According to other aspects, the one or more processors 208 may be different from the digital signal processor 128 and may be configured to provide the error correction scheme which is to be selected to the digital signal processor 128 (see, for example, FIG. 3B in the case of data transmission and FIG. 6B and in the case of data reception). In both cases, the digital signal processor 128 may use the selected error correction scheme 206 in transmission for channel-coding transmit data (in some aspects described regarding data transmission as input data) and/or in reception for correcting potentially occurring (bit) errors. In the following, using the selected error correction scheme 206 in data transmission is described with reference to FIG. 3A to FIG. 5 and using the selected error correction scheme 206 in data reception is described with reference to FIG. 6A to FIG. 8. According to various aspects, the first device 102 may be configured to transmit data coded in accordance with the selected forward error correction scheme 206 (e.g., channel-coded data which are channel-coded using the error correction code represented by the selected error correction scheme 206) to the second device 104 and the second device 104 may be configured to apply the selected error correction scheme 206 on the received coded data, or vice versa. Since both, the first device 102 and the second device 104, may be configured to implement the model 204 and may both receive the sensor data 202, the second device 104 knows the error correction scheme 206 the first device 102 used for coding data, and vice versa. Hence, no information regarding the selected error correction scheme 206 have to be transmitted (even in the case that the error correction scheme which is selected from the two or more error correction schemes is changed dynamically).

FIG. 3A to FIG. 3E show a processing scheme 300 for generating data for wireless transmission according to various aspects. The digital signal processor 128 may be configured to receive (transmit) data 302 which are to be transmitted (e.g., from the application processor 132). The digital signal processor 128 may be configured to apply the selected error correction scheme 206 on the transmit data 302. Thus, the digital signal processor 128 may be configured to generate transmit output data 304 by applying the selected error correction scheme 206 on the transmit data 302. The transmit output data 304 may be a representation of the transmit data 302.

Figure 3C:
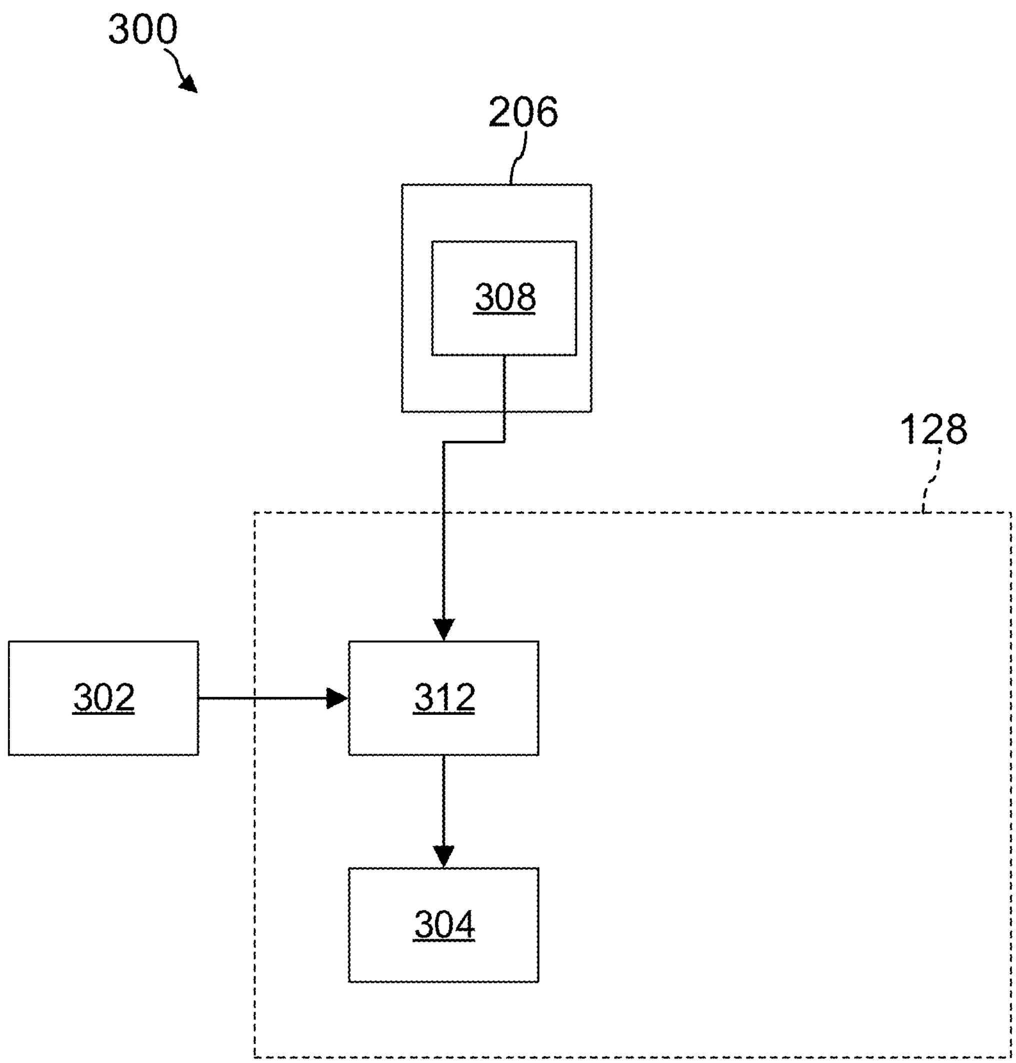

With reference to FIG. 3C, the selected (forward) error correction scheme may represent (e.g., may include) an error correction code 308 (in some aspects referred to as selected error correction code). The digital signal processor 128 may be configured to generate channel-coded data 312 by channel-coding the transmit data 302 (or a representation of the transmit data 302) using the selected error correction code 308. The digital signal processor 128 may be configured to generate the transmit output data 304 based on (e.g., using) the channel-coded data 312.

Figure 3D:
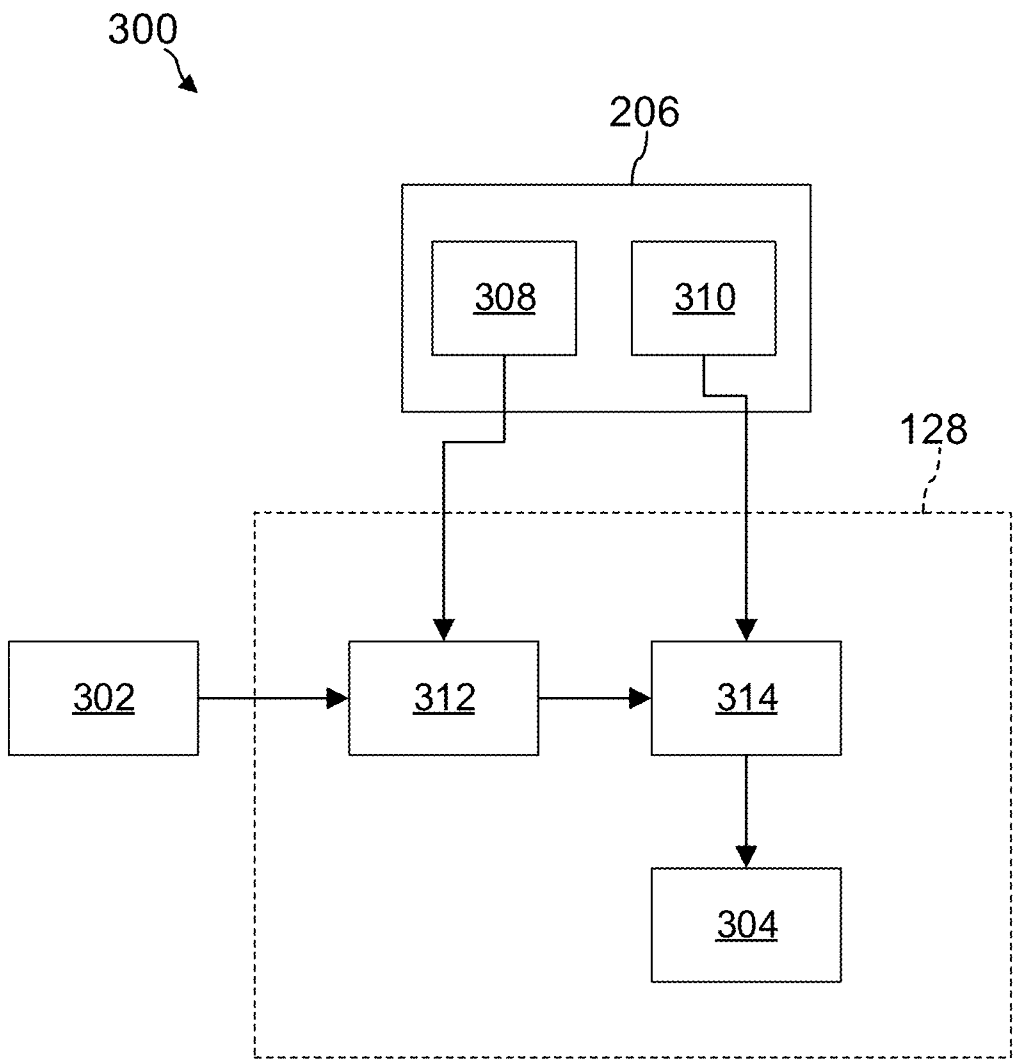
Figure 3E:
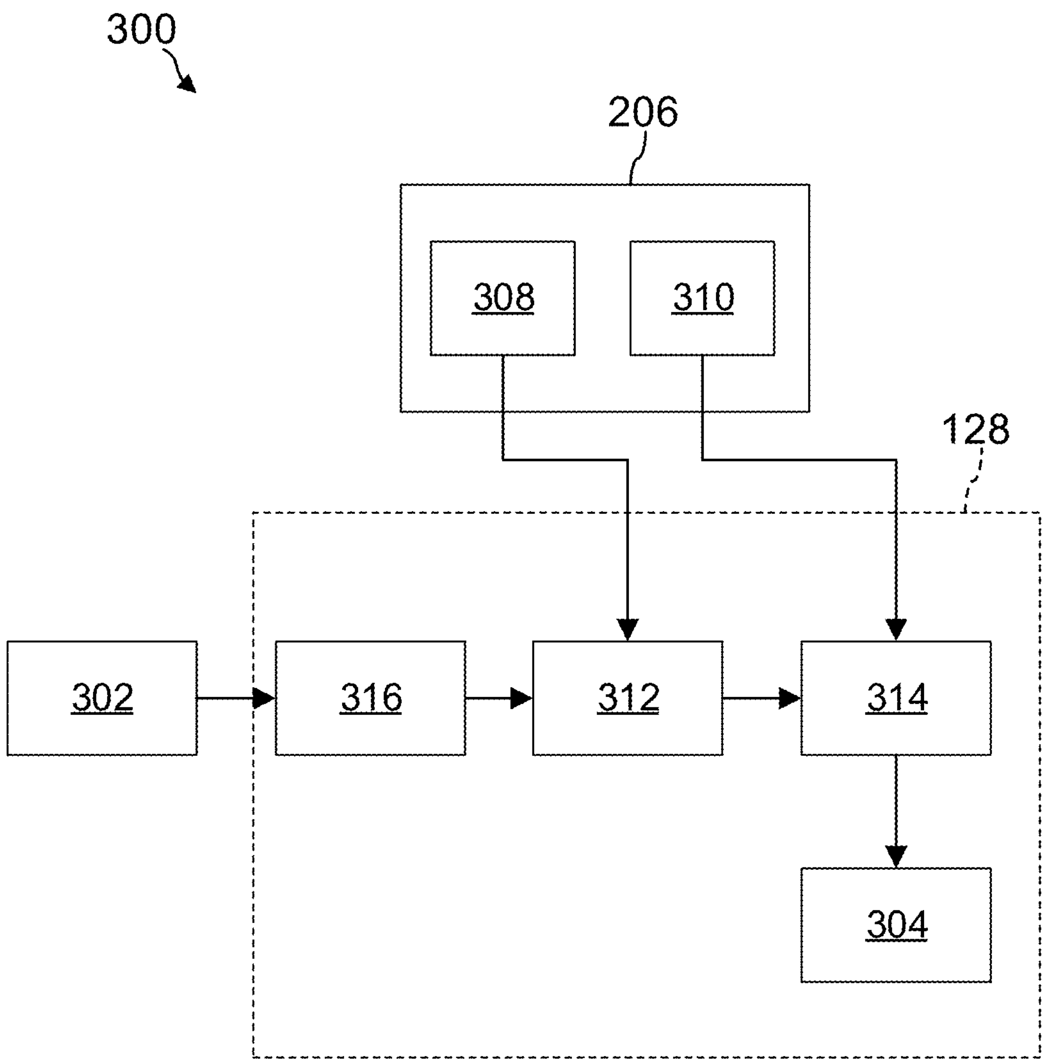

With reference to FIG. 3D, the selected (forward) error correction scheme may represent (e.g., may include) the error correction code 308 and information 310 whether to interleave the channel-coded data 312 or not. In this example, in the case that the information 310 indicate to interleave the channel-coded data 312, the digital signal processor 128 may be configured to generate interleaved data 314 by applying an interleaving algorithm on the channel-coded data 312 and generate the transmit output data 304 based on (e.g., using) the interleaved data 314.

It is understood that the digital signal processor 128 may be configured to carry out further processing operations on the transmit data 302 prior to channel coding and/or further processing operations after channel coding and optionally interleaving. According to the example shown in FIG. 3E, the digital signal processor 128 may be configured to generate encrypted data 316 by encrypting the transmit data 302 (or a representation of the transmit data 302) and to generate the channel-coded data 312 by channel coding the encrypted data 316 using the selected error correction code 308. According to various aspects, the digital signal processor 128 may be configured to modulate the channel-coded data 312 or the interleaved data 314 (in the case that the interleaved data are generated). For modulation, the digital signal processor 128 may, for example, use quadrature amplitude modulation, QAM, such as 16QAM, 64QAM, 256QAM, etc. FIG. 4 shows an exemplary digital baseband processing 400 for data transmission. It is understood that this serves as an example and that the digital baseband processing may include more or less or different operations. In this example, the digital signal processor 128 may optionally encrypt the transmit data 302 to generate the encrypted data 316. The digital signal processor 128 may channel-code the encrypted data 316 using the selected error correction code 308 to generated the channel-coded data 312. The digital signal processor 128 may, in the case that the information 310 indicate to apply interleaving, interleave the channel-coded data 312 to generate the interleaved data 314. The digital baseband processing 400 may include to generate modulated data by modulating the channel-coded data 312 or the interleaved data 314 (e.g., using QAM modulation). Optionally, the digital baseband processing 400 may include to carry out orthogonal frequency division multiplexing (OFDM). In the case of OFDM, the digital baseband processing 400 may include to apply an inverse fast Fourier transformation (IFFT) on the modulated data. Optionally, the digital baseband processing 400 may include to use a cyclic prefix on the IFFT-transformed modulated data. Then, the digital baseband processing 400 may include to insert a preamble (or header). Optionally, the digital baseband processing 400 may include to apply an in-phase and quadrature (IQ) compensation. Optionally, the digital baseband processing 400 may further include to use a digital predistortion (DPD) (e.g., to offset the effects of nonlinearities in a power amplifier). It is understood that the digital baseband processing in transmission and in reception may, in addition to applying the selected error correction scheme 206 as described herein (e.g., applying the selected error correction code 308 and, optionally further interleaving), include any processing operation known in the art. Even though some of the above processing operations are described as being carried out by the digital signal processor 128, it is understood that some of the processing operations may be carried out as digital RF front-end processing in the transmit (TX) path 124. Thus, the transmit output data 304 may be any data within the digital baseband processing which are generated by the digital signal processor 128 and provided to the transmitter (e.g., to the transmit (TX) path 124). The digital baseband processing may result in data which are digital-to-analog converted (using a digital-to-analog converter, DAC) and provided to the analog RF front-end processing of the transmit (TX) path 124. An exemplary digital and analog processing 500 of the transmit (TX) path 124 is shown in FIG. 5. The digital processing may include (e.g., using a symbol rate frequency, $f_{sym}$) the QAM modulation, a pulse shaping, the IQ compensation, and the digital pre-distortion (prior to digital-to-analog conversion via the DAC). The analog processing may include (e.g., using an RF frequency, $f_{RF}$) an anti-imaging filtering, an RF modulation, and a power amplification. Optionally, the transmit (TX) path 124 may be observed after the power amplification and the information obtained from this observation may be sued to train the digital pre-distortion and/or to detect an IQ imbalance to adapt the IQ compensation.

FIG. 6A to FIG. 6E show a processing scheme 600 for processing wirelessly received data according to various aspects. The digital signal processor 128 may be configured to receive (receive) data 602 from the (wireless) receiver (e.g., in the receive (RX) path 122). In some aspects, the receive data 602 are described as input data in the context of data reception. The digital signal processor 128 may be configured to apply the selected error correction scheme 206 on the receive data 602. Thus, the digital signal processor 128 may be configured to generate receive output data 604 by applying the selected error correction scheme 206 on the receive data 602. The receive output data 604 may be a representation of the receive data 602.

Figure 6C:
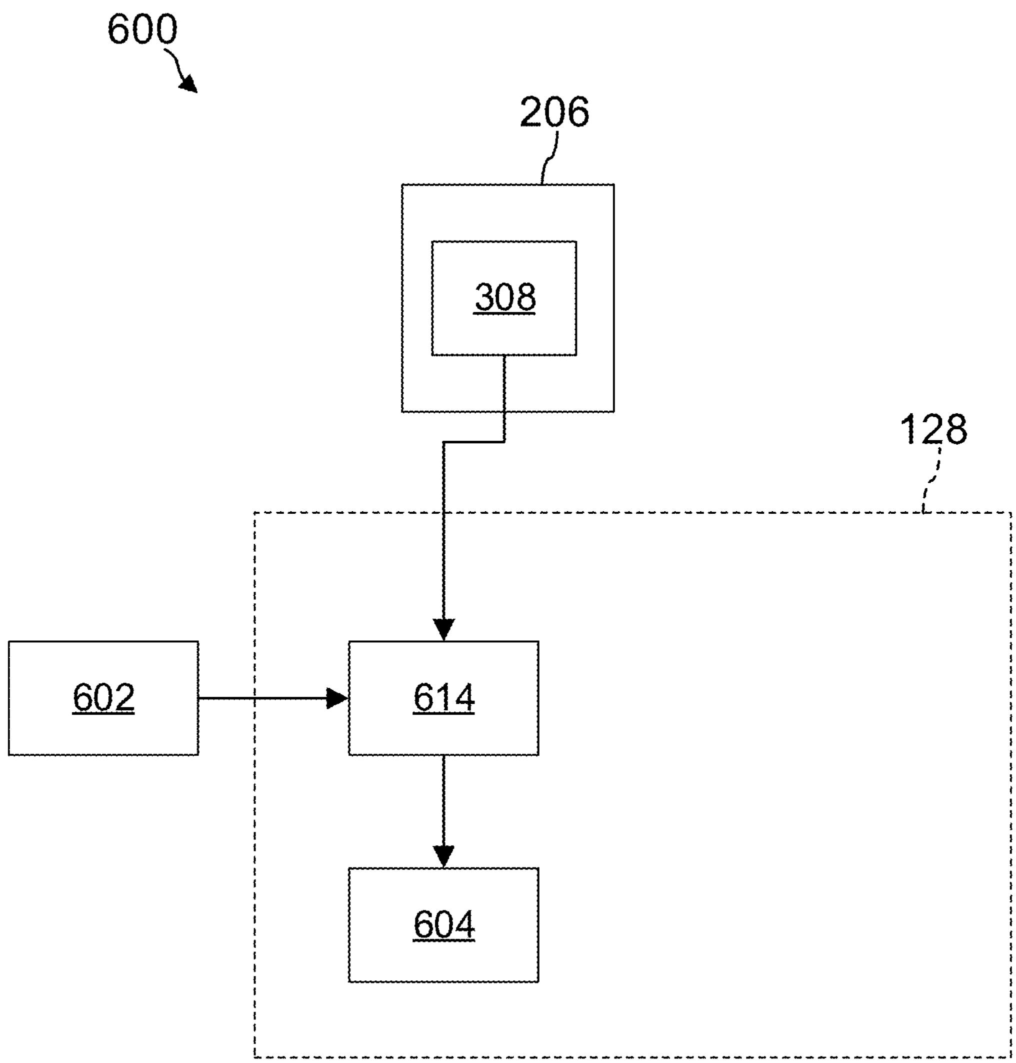

With reference to FIG. 6C, the digital signal processor 128 may be configured to apply the selected error correction code 308 on the receive data 602 (or a representation of the receive data 602). Applying the selected error correction code 308 on the receive data 602 may correct (and optionally further detect) potential bit errors in the receive data 602. Thus, the digital signal processor 128 may be configured to generate error-corrected data 614 by applying the selected error correction code 308 on the receive data 602. It is understood that in the case that the receive data 602 include no bit errors, the error-corrected data 614 may correspond to the receive data 602.

Figure 6D:
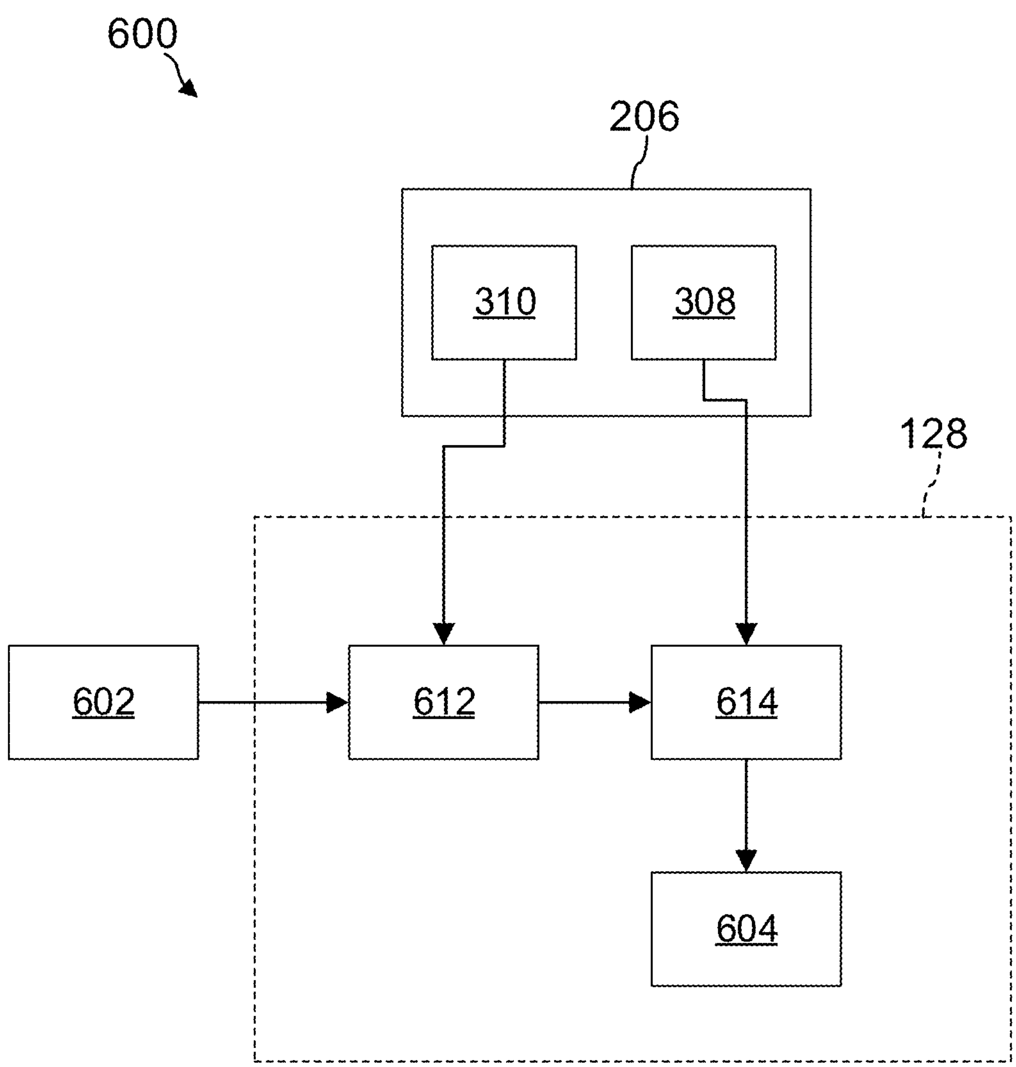
Figure 6E:
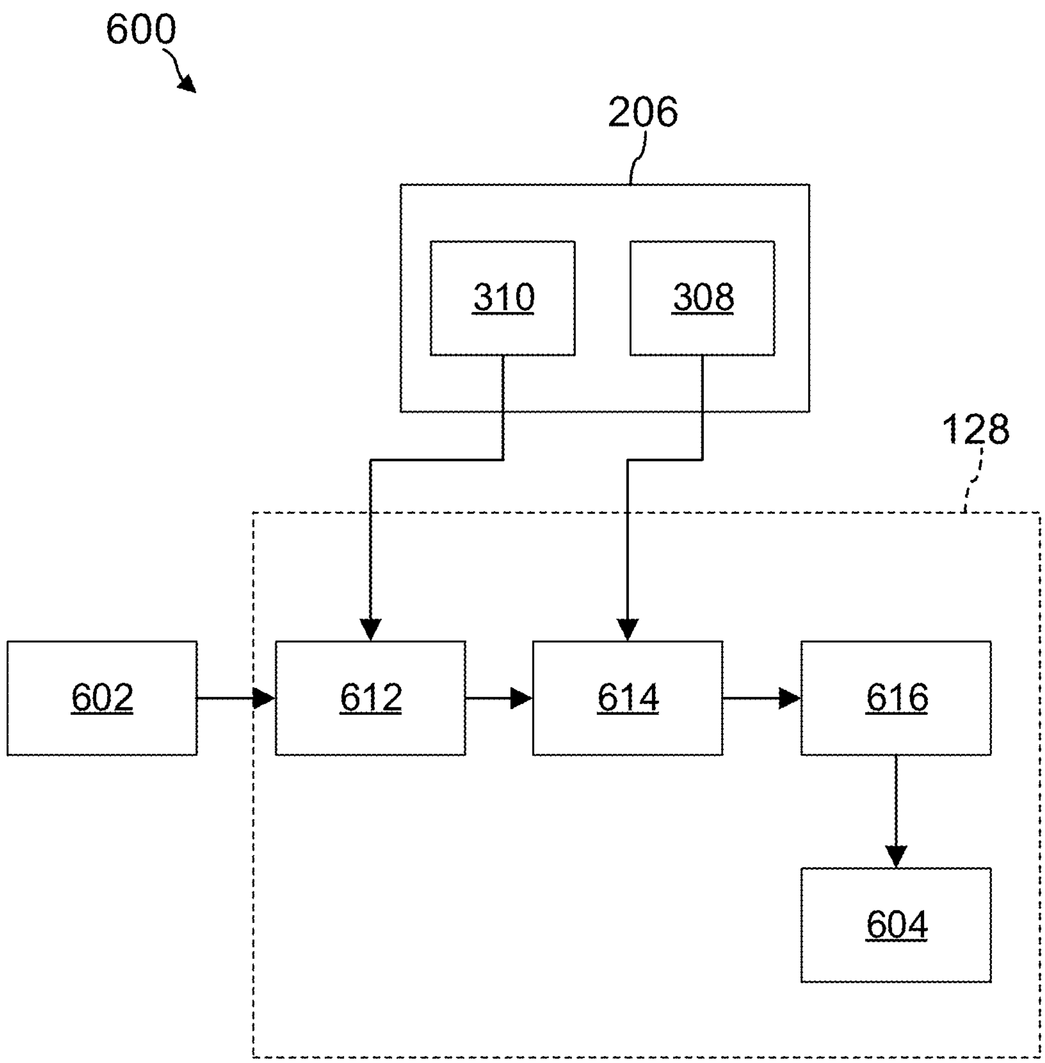

As described herein, in transmission, the selected (forward) error correction scheme may represent (e.g., may include) the error correction code 308 and information 310 whether to interleave the channel-coded data 312 or not. Thus, the information 310 may indicate whether the receive data 602 are interleaved or not. With reference to FIG. 6D, in the case that the information 310 indicate that the receive data 602 are interleaved, the digital signal processor 128 may be configured to deinterleave the receive data 602 prior to applying the selected error correction code 308. Thus, the digital signal processor 128 may be configured to generate deinterleaved data 612 by deinterleaving the receive data 602 (in the case that the receive data 602 are interleaved) and to apply the selected error correction code 308 on the deinterleaved data 612.

It is understood that the digital signal processor 128 may be configured to carry out further processing operations on the receive data 602 prior to deinterleaving and/or further processing operations after applying the selected error correction code 308. According to the example shown in FIG. 6E, the digital signal processor 128 may be configured to generate decrypted data 616 by decrypting the error-corrected data 614. According to various aspects, in the case that the receive data 602 are modulated, the digital signal processor 128 may be configured to demodulate the receive data 602 prior to deinterleaving and/or applying the selected error correction code 308. FIG. 7 shows an exemplary digital baseband processing 700 for data reception. It is understood that this serves as an example and that the digital baseband processing may include more or less or different processing operations. In this example, the digital baseband processing 700 may (after analog-to-digital conversion using an analog-to-digital converter, ADC) include to apply a direct current (DC) offset compensation. Optionally, the digital baseband processing 700 may include a digital baseband (DBB) wake-up radio (WUR) which continuously observes the radio channel and allows to reduce an energy consumption. The digital baseband processing 700 may include an interpolator/decimation filter (e.g., to increase or decrease the sampling rate). The interpolator/decimation filter may be coupled to a sampling timing tracking. The digital baseband processing 700 may include an in-phase and quadrature (IQ) compensation. In the case that OFDM with a cyclic prefix (CP) is used for transmitting the data, the digital baseband processing 700 may include a CP removal. In the case of OFDM, the digital baseband processing 700 may further include a fast Fourier transformation (FFT). The digital baseband processing 700 may include an adaptive equalizer to (automatically) adapt to time-varying properties of the communication channel. To adapt to the time-varying properties, the digital baseband processing 700 may include a physical layer protocol (PHY) frame detector. Optionally, the digital baseband processing 700 may include to track the received signal strength (RSS). In the case that the received data 602 are modulated, the digital baseband processing 700 may include a demodulator to generate demodulated data. The digital signal processor 128 may determine, whether the information 310 indicate that the receive data 602 are interleaved or not, and may, in the case that it is determined that the receive data 602 are interleave, generate the deinterleaved data 612 by deinterleaving the demodulated data. The digital signal processor 128 may apply the selected error correction code 308 on the deinterleaved data 612 for (forward) error correction (e.g., to correct potential bit errors). In the case that the receive data 602 are encrypted, the digital signal processor 128 may generate the decrypted data 616 by decrypting the error-corrected data 614. It is understood that the digital baseband processing in transmission and in reception may, in addition to applying the selected error correction scheme 206 as described herein (e.g., applying the selected error correction code 308 and, optionally further interleaving), include any processing operation known in the art and that the transmission and reception may be designed in accordance with each other. Even though the above processing operations are described as being carried out by the digital signal processor 128, it is understood that some of the processing operations may be carried out as digital RF front-end processing in the receive (RX) path 122. Thus, the receive data 602 may be any data within the digital baseband processing which are provided from the receiver to the digital signal processor 128. An exemplary digital and analog processing 800 of the receive (RX) path 122 is shown in FIG. 8. The analog processing may include an RF frontend processing, an RF demodulation (e.g., using the RF frequency, $f_{RF}$), and an analog baseband filtering (prior to analog-to-digital conversion via the ADC). Optionally, the analog processing may include a loopback attenuation from the transmit (TX) path 124. The digital processing may include (e.g., using a symbol rate frequency, $f_{sym}$) a digital baseband filtering, a sampling timing tracking with the interpolator and decimation, an IQ imbalance detection and compensation, the equalization using the adaptive equalizer, and the demodulation (in the case that the receive data 602 are modulated). It is understood that this analog and digital processing 800 serves as an example and that any other configuration known in the art may be used.

As described above, various processing configurations may be used for data transmission and data reception as long as a (forward) error correction scheme is (dynamically) selected from two or more (forward) error correction schemes (e.g., as long as an error correction code is selected from two or more error correction codes) and as long as, in the case of data transmission, data are channel-coded using the error correction code represented by the selected error correction scheme, and, in the case of data reception, the selected error correction scheme is applied on wirelessly received data. As described herein, the digital signal processor 128 may select an error correction scheme dynamically from the two or more error correction schemes which allows to adapt to dynamically changing (wireless) RF environments. The one or more processors 208 may be configured to receive (current) sensor data 202 in predefined (e.g., discrete) time steps and/or responsive to one or more predefined events (i.e., event-based). The one or more processors 208 may be configured, each time they receive respective sensor data 202, to determine a respective error correction scheme from the two or more error correction schemes by inputting the respectively received sensor data 202 into the model 204. For example, in the case that the physical state of the respective device or the system 108 did not change, the model 204 may output the same error correction scheme and, in the case that the physical state changed (e.g., from a first physical state to a second physical state different from the first physical state), the model 204 may output a different error correction scheme. The one or more events may include any event which may be related to a change of the condition of the wireless communication link 106. For example, the system 108 may be a laptop or convertible-like device (see, for example, FIG. 1C and corresponding description) and the one or more predefined events may include at least one (e.g., exactly one, two, three, etc.) event of the following list of events: a shutdown of the laptop or convertible-like device, an activation of a shared display, connecting the laptop or convertible-like device to a docking station, connecting the laptop or convertible-like device to a power supply (e.g., plugging a power cable of the laptop or convertible-like device into a power socket), connecting the laptop or convertible-like device to a wired network, and/or pushing at least one of one or more predefined buttons. Hence, the one or more events may include hardware-related events (such as connecting the laptop or convertible-like device to a power supply, the laptop or convertible-like device to a wired network, pushing at least one of one or more predefined buttons, etc.) or operating system (OS) based events (such as a shutdown of the laptop or convertible-like device, an activation of a shared display, connecting the laptop or convertible-like device to a docking station, etc.).

As described herein, each error correction scheme of the two or more error correction schemes may represent (e.g., may include) a respective error correction code. This respective error correction code may be different from at least one (e.g., all) other error correction code associated with another error correction scheme. According to various aspects, at least one (e.g., each) of the error correction codes represented by the two or more error correction schemes may be a linear code (e.g., a linear block code). As described herein, current wireless error correction codes are exclusively designed for coding gain and are therefore not suitable for latency-critical applications. Since linear codes lead to only moderate coding gains, they are currently not used for wireless applications, but only for wireline applications (which are static and therefore do not require an adaption to dynamic scenarios), such as double data rate (DDR) memories. However, it is found that using FEC with linear codes allows to reduce the power consumption as well as to meet certain latency-criteria (e.g., latencies of less than about 1 ms). Further, it is found that in dynamic RF environments, the dynamic and adaptive selection of the error correction scheme using linear codes allows to satisfy latency-criteria in latency-critical applications, to reduce the bit error rate, BER, (and/or packet error rate, PER) to decrease an energy consumption, and also allows for higher-order modulation schemes to push the data rate in bandwidth constrained environments. The respective error correction code associated with an error correction scheme of the two or more error correction schemes may be any suitable linear code, such as a Hamming code, a Bose-Chaudhuri-Hocquenghem (BCH) code, a Golay code, a Hsiao code, etc. The two or more error correction schemes may include at least a first error correction scheme and a second error correction scheme. The first error correction scheme may represent a first error correction code and the second error correction scheme may represent a second error correction code. According to various aspects, the first error correction code may be capable to correct a first number of bit errors in a data sequence and the second error correction code may be capable to correct a second number of bit errors in the data sequence. The second number may be greater than the first number. As an example, the first error correction code may be a Single-Error-Correction—Double-Error-Detection, SEC-DED, code and the second correction code may be a Triple-Error-Correction—Quadruple-Error-Detection, TEC-QED, code. As a further example, the first error correction code may be a Single-Error-Correction—Double-Error-Detection, SEC-DED, code and the second correction code may be a Double-Error-Correction—Triple-Error-Detection, DEC-TED, code. As an even further example, the first error correction code may be a Double-Error-Correction—Triple-Error-Detection, DEC-TED, code and the second correction code may be a Triple-Error-Correction—Quadruple-Error-Detection, TEC-QED, code. It is understood that these are only examples and that any other combination may be used as long as the second number is greater than the first number. According to various aspects, the model 204 may be configured (e.g., trained) such that the first error correction scheme is used in the case that the (e.g., expected) signal-to-noise ratio (SNR) is equal to or greater than a predefined SNR threshold value and that the second error correction scheme is used in the case that the (e.g., expected) signal-to-noise ratio (SNR) is less than the predefined SNR threshold value. According to various aspects, the model 204 may be configured (e.g., trained) such that the second error correction scheme is used in the case that an expected bit error rate (BER) is equal to or greater than a predefined BER threshold value and that the first error correction scheme is used in the case that the expected BER is less than the predefined threshold value. It is understood that more than one predefined threshold value may be used (e.g., in the case that the two or more error correction schemes are more than two error correction schemes). Hence, in the case of a "low" SNR (less than the predefined SNR threshold value) or a "high" expected BER (equal to or greater than the predefined BER threshold value), the second error correction scheme may be selected which is capable to correct a higher number of bit error than the first error correction scheme. A percentage breakdown of bit errors per codeword respectively simulated at various signal-to-noise ratios for each of a 4QAM, a 16QAM, a 64QAM, and a 256QAM is shown in FIG. 12. This simulation illustrates that the number of bit errors increases with decreasing SNR. For example, in the high SNR region, 1-bit errors are dominating which are detectable and correctable using a SEC-DED code. In the mid-to-low SNR region, 2-bit errors are dominating which are detectable but not correctable using a SEC-DED code. However, these 2-bit errors are detectable and correctable using a code which is capable to correct a higher number of bit error than the SEC-DED code, such as a DEC-TED code (or a TEC-QED code). In the low SNR region, 3-bit errors are dominating which are undetectable using a SEC-DED code and even cause corruption. However, these 3-bit errors are detectable and correctable using a code which is capable to correct an even higher number of bit error than the DEC-TED code, such as a TEC-QED code.

Figure 9A:
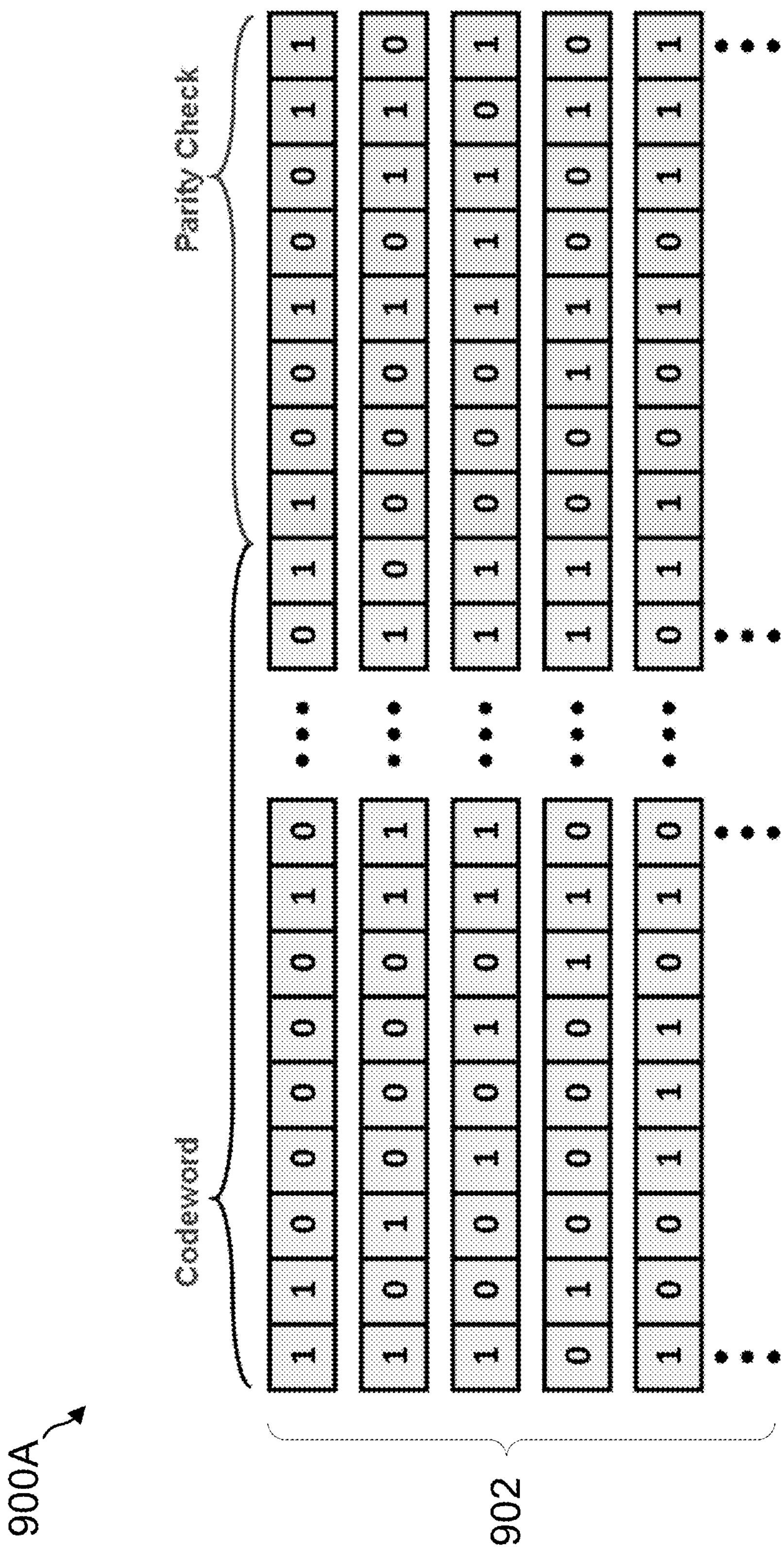
FIG. 9A and FIG. 9B each shows a respective data block which is channel coded using a linear block error correction code according to various aspects of the disclosure.
Figure 9B:
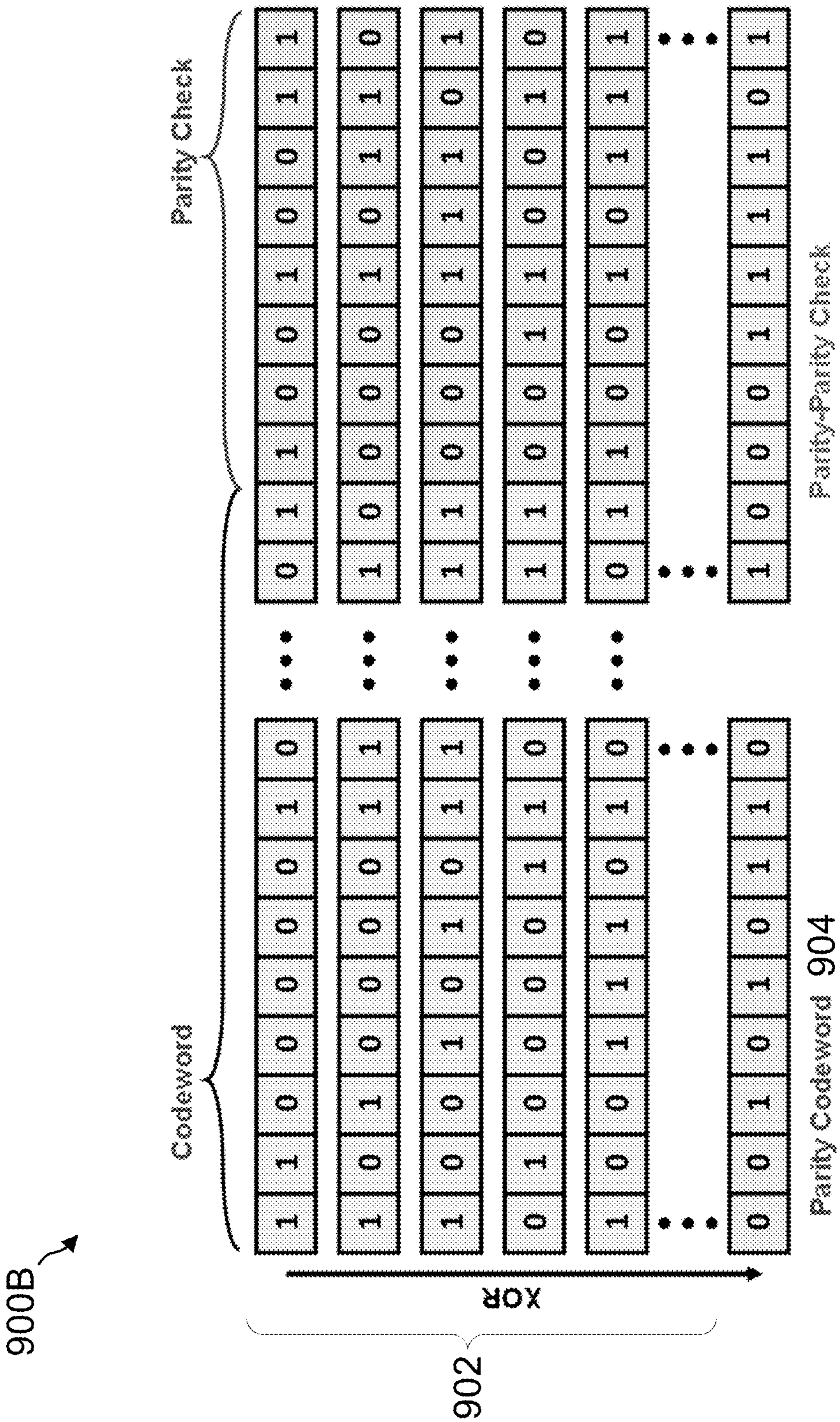
Figure 10A:
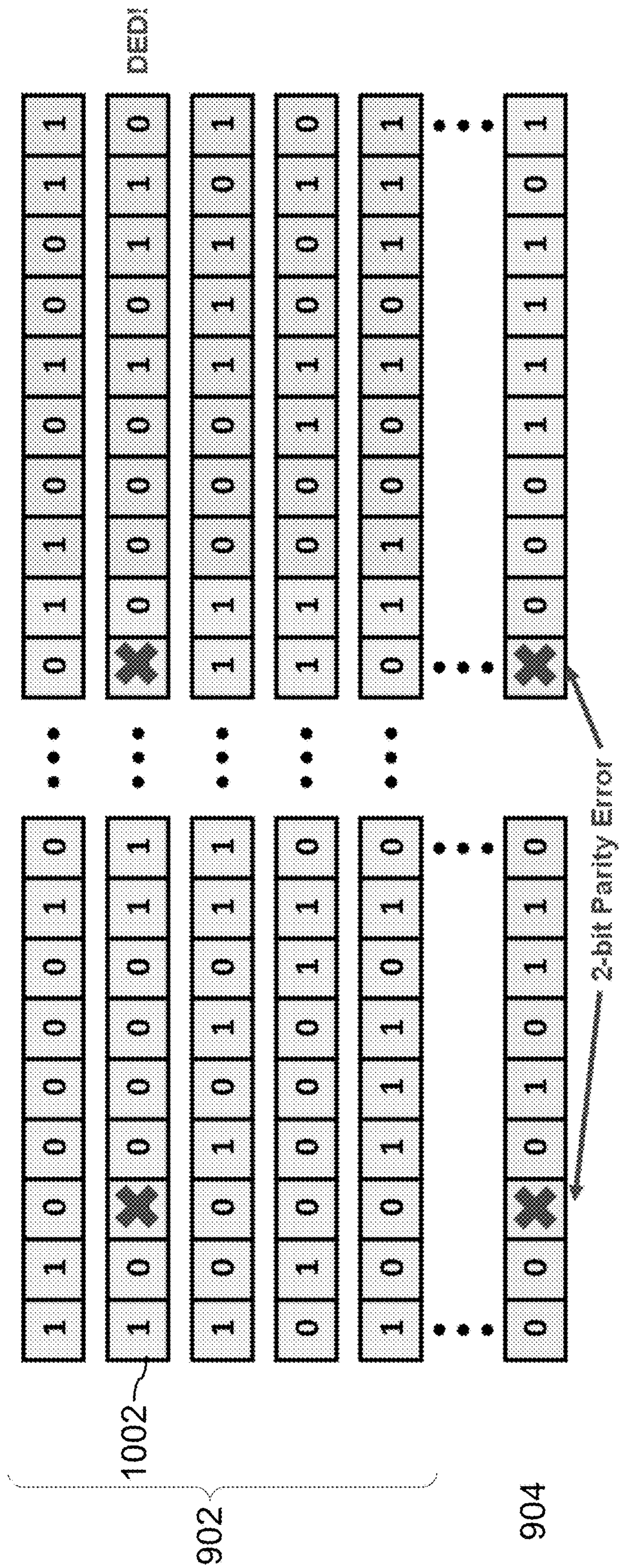
FIG. 10A to FIG. 10D each shows a respective example of bit error correction according to various aspects of the disclosure.
Figure 10B:
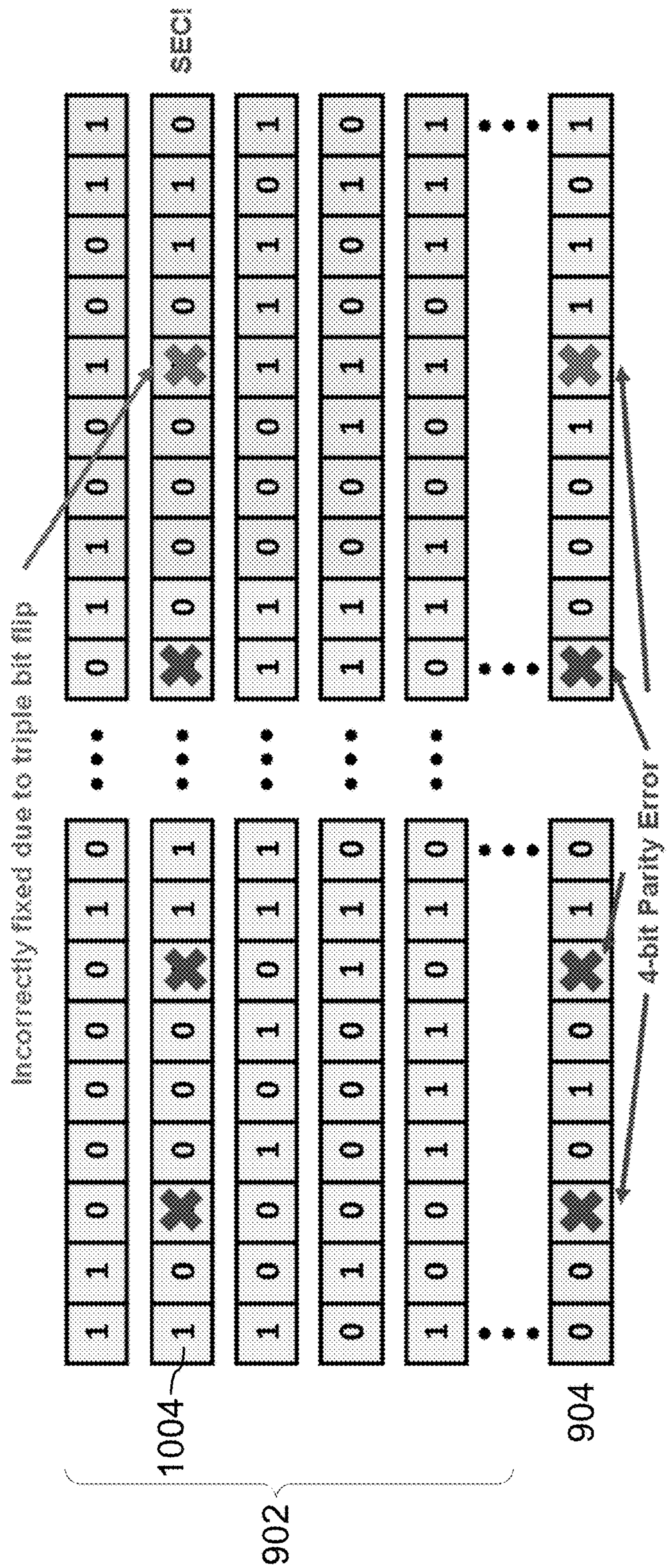
Figure 10C:
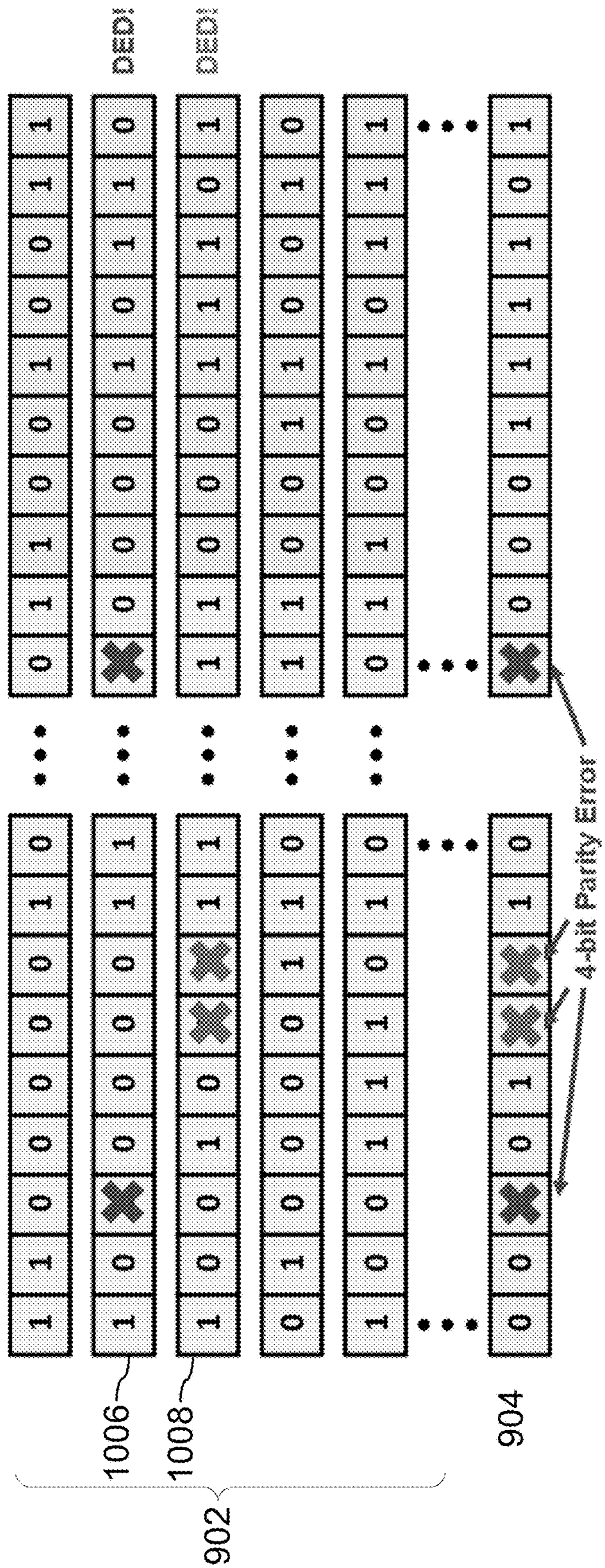
Figure 10D:
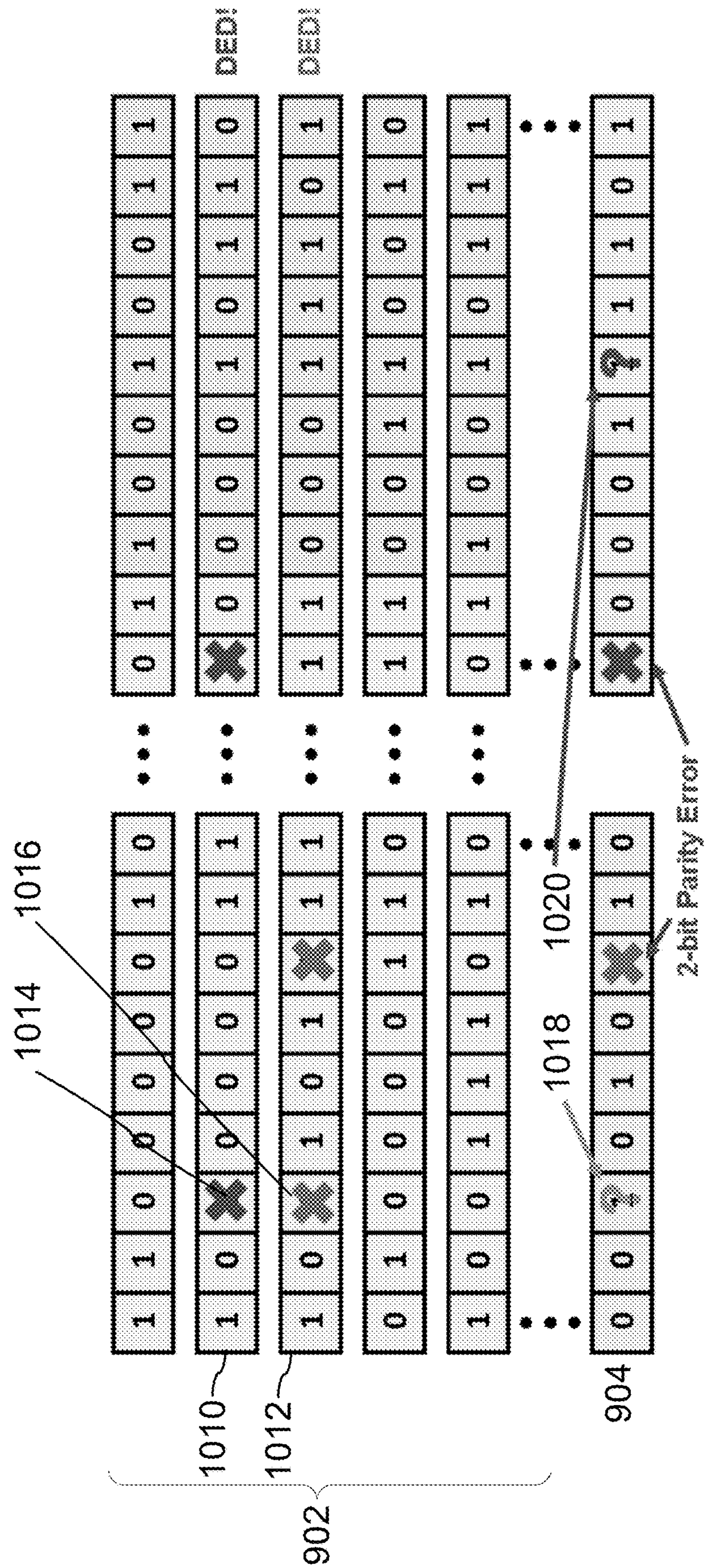
Figure 11A:
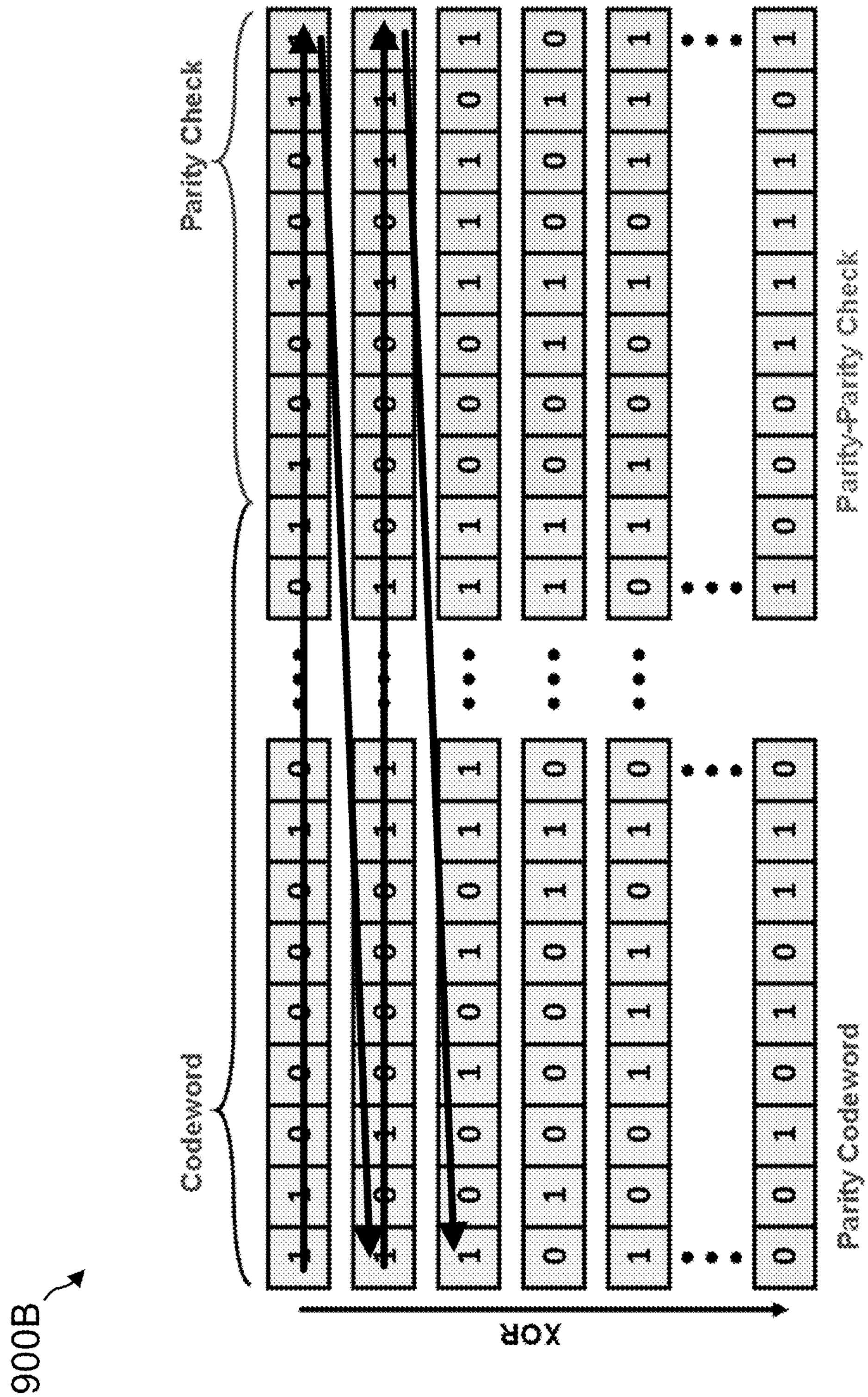
FIG. 11A shows a transmission sequence without interleaving and FIG. 11B shows a transmission sequence with interleaving according to various aspects of the disclosure.
Figure 11B:
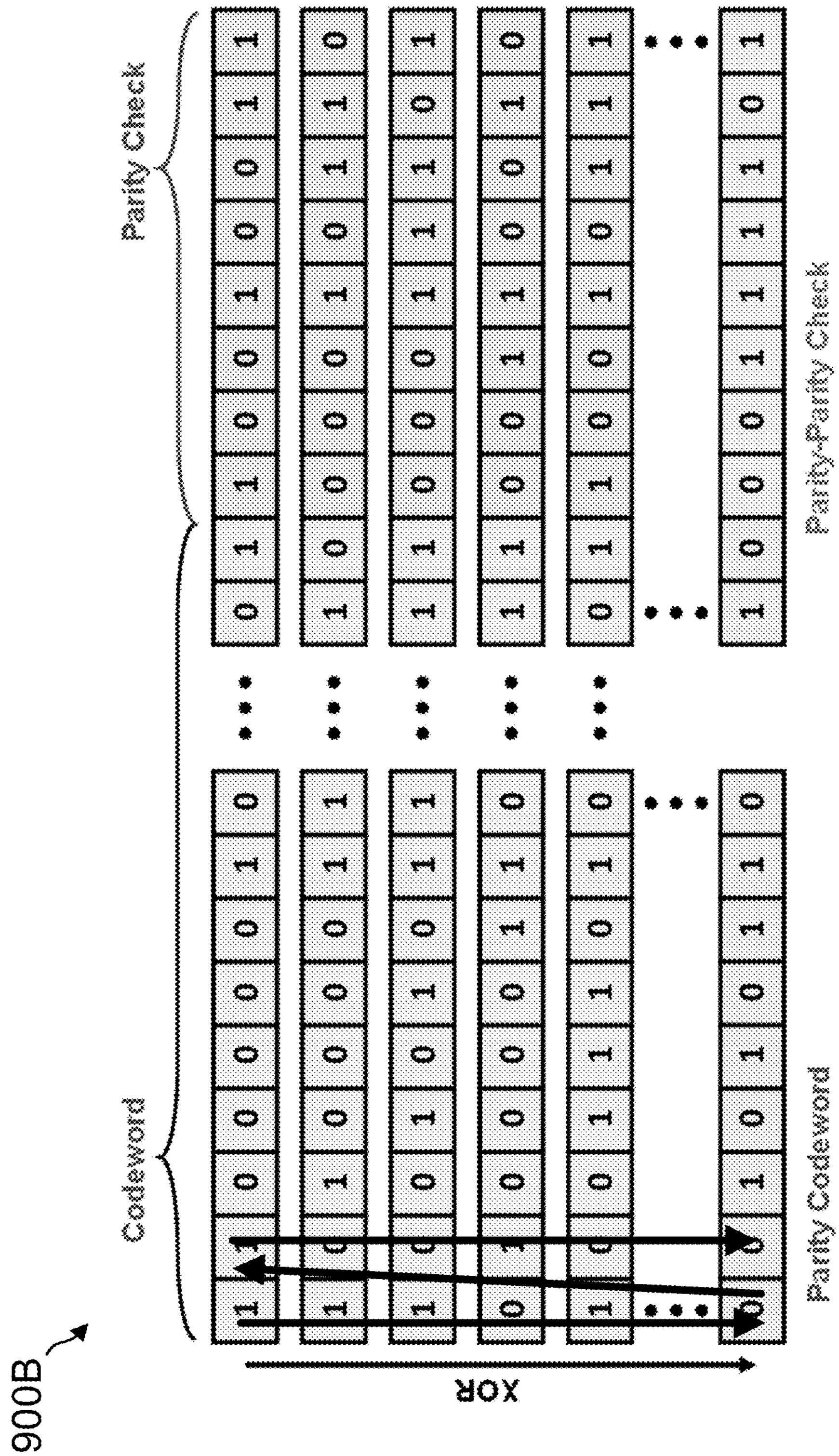

A first data block 900A which is channel-coded using an exemplary first error correction code is shown in FIG. 9A and a second data block 900B which is channel-coded using an exemplary second error correction code is shown in FIG. 9B. However, it is noted that these are only examples and that any other suitable linear (e.g., two-dimensional block) code may be used. The transmit data 302 may include a plurality of codewords 902. The first error correction scheme may indicate to apply a two-dimensional linear block code as first error correction code on the plurality of codewords 902 to add a parity check block to the plurality of codewords 902 (see FIG. 9A). The second error correction scheme may indicate to add a parity codeword 904 to the plurality of codewords 902 and to apply a two-dimensional linear block code as second error correction code on the plurality of codewords 902 as well as the parity codeword 902 (see FIG. 9B). By this, the digital signal processor 128 may add a parity word (as parity-parity check) to the parity check block. The parity codeword 902 may be an orthogonal parity of the plurality of codewords 902. Thus, the first bit of the parity codeword may indicate a parity of the first bits of all codewords of the plurality of codewords 902 (e.g., the bits 1, 1, 1, 0, 1 shown in the second data block 900B), etc. In this example, the first error correction scheme may be a SEC—DED code and the addition of the parity codeword 904 makes the second error correction scheme a TEC-QED code (which is even capable of correcting some quadruple errors). This kind of second error correction scheme may add only minimal processing latency as compared to the first error correction scheme (since only one codeword is added). The addition of the parity codeword along an orthogonal bit or symbol direction of the plurality of (N-dimensional) codewords can transform the error correction code into a more powerful N+1-dimensional error correction scheme. The generalization to use a simple parity bit along an orthogonal bit or symbol direction of the plurality of codewords 902 for transmission can scale to an arbitrarily sized block of codewords with minimal loss in error correction performance or additional latency overhead. An exemplary correction of bit errors (in reception) using this second error correction scheme is shown in FIG. 10A to FIG. 10D. With reference to FIG. 10A, a 2-bit error affected codeword 1002 may trigger a double-error-detection (DED) flag during forward error correction (FEC). During a parity check stage, the digital signal processor 128 may discover a 2 bit-errors in the parity codeword 902 and can use them to fix the affected codeword 1002. With reference to FIG. 10B, a 3-bit error affected codeword 1004 may trigger only a single-error-correction (SEC) flag during forward error correction (FEC). In the case of using a SEC-DED code (e.g., the above described first error correction code without the parity codeword 902), this 3-bit error would cause a 4-bit data corruption due to an incorrect fix by the SEC-DED code. However, using the exemplary second error correction scheme (which includes the parity codeword 904) allows to correct the 3-bit error: The parity check stage flags 4 parity errors and the digital signal processor 128 can use these parity bits to fix the corrupted codeword 1004. FIG. 10C shows an example of how the digital signal processor 128 can correct a 4-bit error across two codewords 1006, 1008: these two erroneous codewords 1006, 1008 will have unique syndromes since otherwise their bit errors will perfectly match and cancel each other out during the parity check. Due to this reason, there are only six possible combinations for how to assign the 4 parity-bit-errors to the two erroneous codewords. Since each combination of these six possible combinations has a unique pair of syndromes, the digital signal processor 128 can deduce the correction factors by matching the unique pairs of syndromes to the syndromes generated by the FEC. FIG. 10D shows an example of how a 4-bit error across two codewords 1010, 1012 can be corrected when there is a collision on the parity bits masking information: In this example a first codeword 1010 may have a bit-error of the third bit 1014 and a second codeword 1012 may have a bit-error of the third bit 1016. The FEC may determine a first DED flag of the first codeword 1010 and a second DED flag of the second codeword 1012. In the case that the parity check stage flags only two parity errors, the digital signal processor 128 can deduce this scenario of a collision on the parity bits masking information. Given the location of the errors in the parity bits there are only two possible locations that the masked bits could be, in the third bit position 1018 of the parity codeword 904 or a bit 1020 in the parity-parity check portion. Each of these two positions 1018, 1020 corresponds to respective syndromes (different from the syndromes of the other position) which can generate these parity errors and result in masked parity errors. By comparing these syndromes to the syndromes generated by the FEC, the digital signal processor 128 can determine the correction factors.

Figure 13:
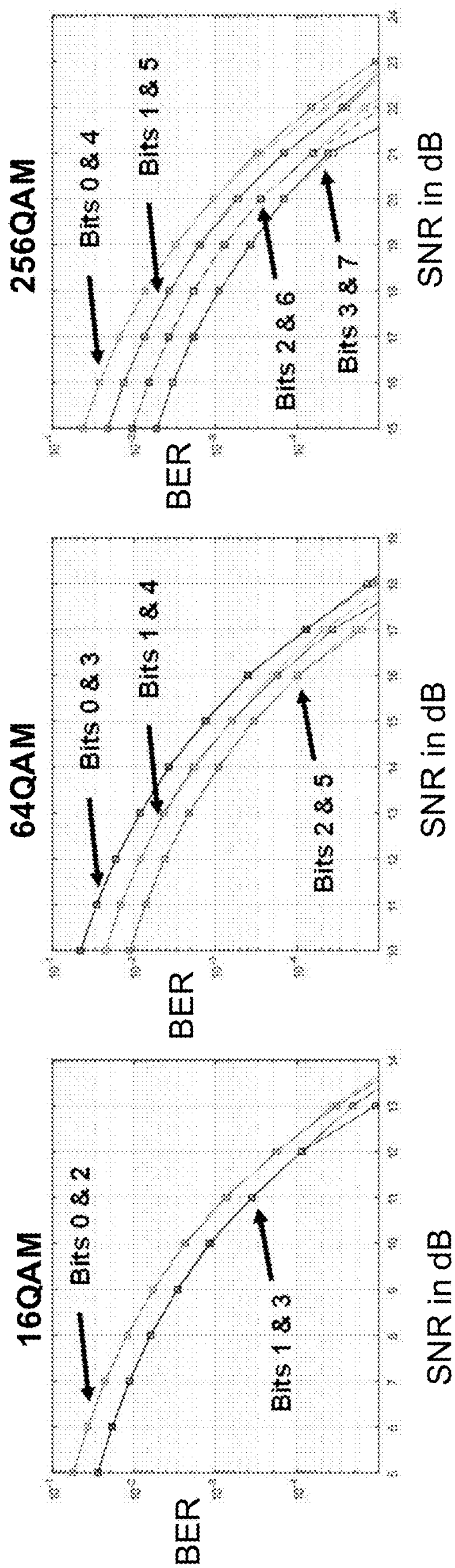
FIG. 13 shows the bit error rate as a function of the signal-to-noise ratio for different bits in higher-order quadrature amplitude modulation schemes.

As described herein, the selected error correction scheme may include information 310 whether to interleave the channel-coded data 312 or not. As exemplarily shown by the arrows within the second data block 900B in FIG. 11A, the transmit output data 304 may be a line-wise representation of the bits of the second data block 900B in the case that the information 310 indicate to not interleave the channel-coded data 312. As exemplarily shown by the arrows within the second data block 900B in FIG. 11B, the transmit output data 304 may be a row-wise representation of the bits of the second data block 900B in the case that the information 310 indicate to interleave the channel-coded data 312. As shown in FIG. 13 for higher-modulation schemes (in particular, 16QAM, 64QAM, and 256QAM), individual bits have unequal levels of protection (also referred to as noise immunity). This may lead to bursty errors (in some aspects referred to as burst errors) that may overwhelm the error correcting capability of the error correction code. These bursty errors may lead to a number of bit errors greater than four (see, for example, >4-bit errors in FIG. 12). As shown in FIG. 12, these bursty errors may occur in the low SNR regime. Using interleaving as described herein, may mitigate these bursty errors since the errors may be spread across multiple codewords which allows to correct these errors. Therefore, regarding the above examples in which the second error correction scheme is used in the case of a "low" SNR (less than the predefined SNR threshold value) or a "high" expected BER (equal to or greater than the predefined BER threshold value) and in which the first error correction code is used in the "high" SNR (equal to or greater than the predefined SNR threshold value) or a "low" expected BER (less than the predefined BER threshold value), the first error correction scheme (e.g., the information 310) may indicate to not interleave the channel-coded data 312 (e.g., since the bursty errors are less relevant in the "high" SNR regime) and the second error correction scheme (e.g., the information 310) may indicate to interleave the channel-coded data 312 (e.g., since the bursty errors are relevant in the "low" SNR regime) (see also FIG. 12). Further, using interleaving as described herein, allows to mitigate the bursty errors without adding additional latency penalty (which makes it suitable for latency-critical applications).

Figure 14:
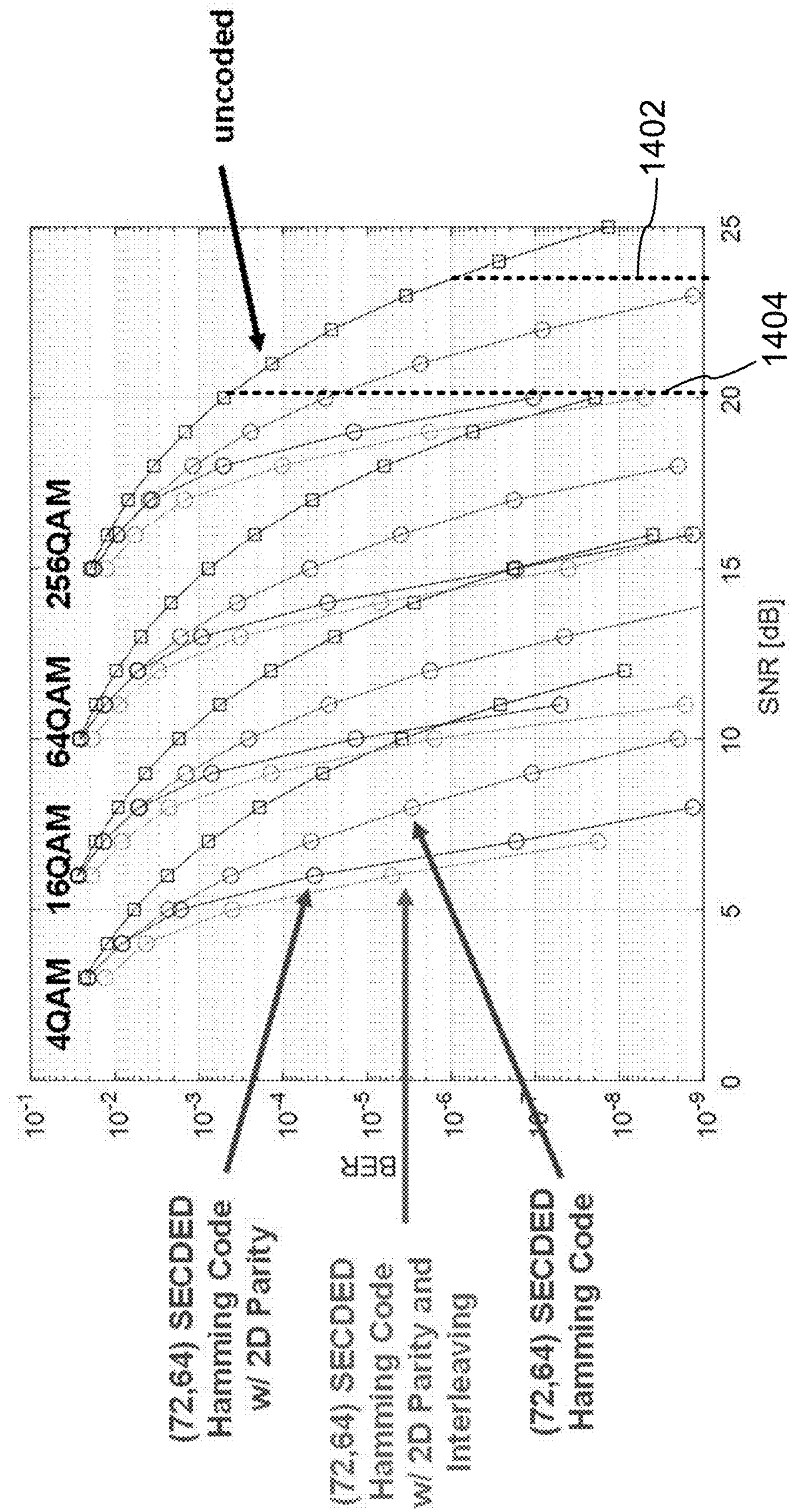
FIG. 14 shows the bit error rate as a function of the signal-to-noise ratio for uncoded data and three different coding schemes according to various aspects of the disclosure.

As described herein, the two or more error correction schemes may represent different linear codes as error correction codes. Using linear codes for channel coding data in wireless transmission allows a relaxation of the bit error rate (BER) of uncoded data to about $10^{-6}$ and even to about $10^{-3}$ which allows to reduce the requirements on the AFE circuit and, therefore reduces implementation power and area. Further, using linear codes for channel coding data in wireless transmission also enables higher data rates using (e.g., (in bandwidth constrained environments) higher-order modulations (e.g., quadrature amplitude modulations (QAM), such as 16QAM, 64QAM, 256QAM, as examples) while still scaling energy-efficiency. An example which shows this effect is shown in FIG. 14. Here, the bit error rate (BER) is shown as a function of the signal-to-noise ratio (SNR) for uncoded data and for three different error correction schemes. For example, the two or more error correction schemes may include at least one (e.g., exactly one, two, or each) of these different error correction schemes. The BER vs. SNR graphs of the uncoded data and the three different error correction schemes are respectively shown for a 4QAM, a 16QAM, a 64QAM, and a 256QAM. The rightest graph respectively represents the uncoded data. The second rightest graph respectively represents a first error correction scheme, the third rightest graph respectively represents a second error correction scheme, and the leftist graph respectively represents a third error correction scheme. In this example, the first error correction scheme includes a (72, 64) SEC-DED Hamming code as error correction code 308 and information 310 to not interleave channel-coded data, the second error correction indicates to determine the parity codeword 904 and the (72, 64) SEC-DED Hamming code as error correction code 308 as well as information 310 to not interleave channel-coded data, and the third error correction scheme indicates to determine the parity codeword 904 and the (72, 64) SEC-DED Hamming code as error correction code 308 as well as information 310 to interleave channel-coded data. As illustratively shown for each modulation scheme (4QAM, 16QAM, 64QAM, and 256QAM), in order to achieve a desired bit error rate (BER) of less than $10^{-10}$ using the first error correction scheme relaxes the BER of the uncoded data to about $10^{-6}$ (as indicated by line 1402), using the second error correction scheme relaxes the BER of the uncoded data even further, and using the third error correction scheme relaxes the BER of the uncoded data to about $10^{-3}$ (as indicated by line 1404). The third error correction scheme may lead to an about 6 dB relaxed SNR requirement on the AFE circuit and/or the ADC (since the SNR of the uncoded data at $10^{-3}$ and the SNR of the uncoded data $10^{-10}$ have a difference of about 6 dB). Dynamically changing (e.g., switching) between two or more error correction schemes which employ linear codes allows to reduce the BER, to reduce implementation power and area (e.g., due to the reduced requirements on the AFE circuit), and/or to increase the data rates (e.g., by using higher-order modulation schemes, such as 64QAM or 256QAM).

The dynamic and adaptive error correction scheme selection offloads much of the processing to digital. Due to the reduced complexity and power requirement in the AFE, the design of wireless communication device 103 is also much more process portable and scalable to deep submicron technologies. Further, the about 6 dB relaxed SNR requirement for the AFE circuit and/or the ADC may lead to greatly relaxed AFE noise figure and linearity specifications as well as ADC resolutions. This may reduce a required power of the AFE circuit and the ADC by about two to four times. For example, using the same frequency synthesizer architecture, the 6 dB relaxation of the SNR requirement leads to a power reduction of about 4 times. Further, the 6 dB relaxation of the SNR requirement also allows to use different circuit topologies or synthesizer architectures which can be more process technology scaling friendly. As an example, the reliance on a high-Q (quality factor) inductor for achieving excellent phase noise is alleviated, as a result, transistor-based ring-oscillator or a relatively low-Q inductor-based oscillator may be sufficient. Also, an all-digital phase-locked loop (PLL) can be suitable for this relaxed phase noise performance, as compared to analog PLL, which again saves both circuit area and scales better with the process. The 6 dB-relaxed SNR requirement also leads to a reduced dynamic range requirement for the ADC. As a result, the ADC power consumption can also be reduced by about two times. This 6 dB relaxation on the SNR can also be allocated to the AFE circuit performance, channel performance, or a mixture of both. If all 6 dB relaxation allocated to AFE circuit performance, then the AFE circuit would have the same receiver sensitivity target while the AFE circuit noise figure can be relaxed by 6 dB. This can lead to about four times power reduction in AFE circuit. If the AFE circuit power is kept the same, then the channel loss can be relaxed by 6 dB, which can either enable longer communication distance or antenna designs with smaller gain and footprints. Further, the AFE circuit also has a relaxed linearity requirement which does further help the noise/power optimization for the AFE circuit as there always exist a trade-off among linearity, noise, and power performance in the AFE circuit. A relaxation of the coverage required for the channel delay spread may lead to a two to three times reduction in the number of taps and/or bit-widths for the adaptive channel equalizer. This may result in a six to twelve times reduction in the power and area of the digital baseband. Further, as described herein, the dynamic and adaptive error correction scheme selection allows for higher-order modulation schemes in bandwidth limited environments. This may break the power-performance tradeoff and enable greater energy efficiencies. The number of taps, T, and their bit-widths within a digital channel equalizer are strongly correlated to the delay spread of the multipath communications channel and the bit-widths of the ADC. The number of taps, T, multiplied by the sampling rate, may have to be larger than the channel delay spread to be able to remove Inter Symbol Interference (ISI). Similarly, the processing chain through the equalizer may have to be a minimum of 2 to 4 bits wider than the ADC plus $\log_2(T)$ additional bits to ensure that quantization error within the equalizer does not introduce a premature error floor. By relaxing the uncoded BER target from $10^{-10}$ to $10^{-3}$ it may not be required to cover the entire delay spread of the channel, but only the central, dominate moment. This may result in a two to three times reduction in the number of required taps. These relaxed ADC dynamic range requirements directly reduce the number of bits required by the equalizer taps by about 20% to about 50%. Furthermore, the equalizer may directly take advantage of process scaling to reduce its power and area by about 20% to about 30% with each process node generation. Depending upon process scaling and the channel characteristics, this relaxed BER constraint leads to a six to twelve times reduction in area and power of the adaptive channel equalizer in the digital baseband.

A comparison of two wireless use cases employing the dynamic and adaptive error correction code selection according to the present disclosure to a wireline use case is provided in Table 1. The wirelines use case is a Peripheral-Component-Interconnect-Express, PCIe, wireline connection Version 6.0 using 4-Pulse-Amplitude-Modulation (4PAM). Table 1 shows various parameters of this wireline PCIe 6.0 use case for 1 (×1), 4 (×4), and 16 (×16) lanes. The PCIe 6.0 use case employs forward error correction (FEC) to compensate for deteriorating BER with the addition of multi-level signaling according to PAM4 and also employs a Cyclic Redundancy Check (CRC). The two wireless use case refer to control-plane communication and a data-plane communication. For the control-plane communication, a first wireless I/O transceiver architecture is used, and for the data-plane communication, a second wireless I/O transceiver architecture is used.

Figure 15A:
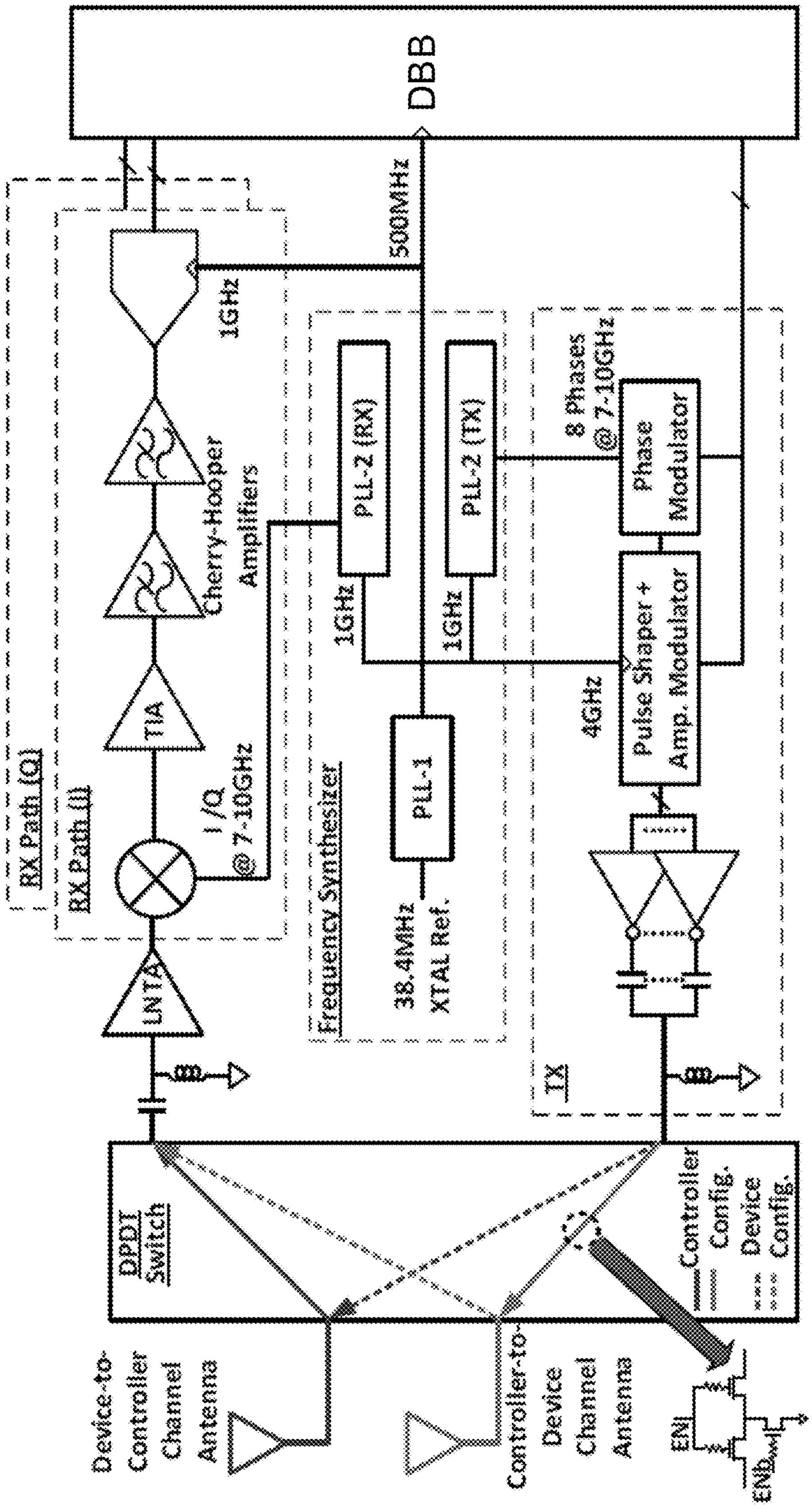
FIG. 15A exemplarily shows a first wireless I/O transceiver architecture which may be used for control-plane communication and FIG. 15B exemplarily shows transmitter architecture of a second wireless I/O transceiver architecture which may be used for data-plane communication according to various aspects of the disclosure.

The first wireless I/O transceiver architecture is schematically shown in FIG. 15A. The first wireless I/O transceiver architecture may target control-plane applications with data links of less than 20 Gb/s in the UWB band (e.g., in the range from about 6.5 GHz to about 10 GHz). Due to the sub-10 GHz frequency bands, this first wireless I/O transceiver architecture allows for a reduced power consumption, reduced cost, and/or a process portable technology.

The first wireless I/O transceiver architecture may be suitable for short-range multicast applications in a reconfigurable frequency-division duplexing (FDD) network. In this example, the first wireless I/O transceiver architecture may use a 500 MHz channel bandwidth. The first wireless I/O transceiver architecture may allow a dynamic reconfiguration of a network node as either controller or device depending on the RF switch (e.g., a double pole double throw, DPDT switch) configuration that connects transmitter (TX) and receiver (RX) with two single-channel antennas (e.g. 8 GHz and/or 9 GHz channel antennas). The low-power frequency synthesizer may be implemented by cascading a low-noise, inductance-capacitance voltage-controlled-oscillator based (LC-VCO-based), type-II phase-locked loop (PLL) with two wide-bandwidth, type-I multi-phase ring-VCO PLLs for TX and RX, respectively. The transceiver (TX) path may implement an all-digital polar architecture using the multi-phase output from the 2nd-stage PLL and a switched-capacitor power amplifier (SCPA) for respective phase and amplitude (Amp.) modulations. The digital baseband, DBB may include the digital signal processor 128 and the digital signal processor 128 may be configured to employ channel coding using a linear code in accordance with the present disclosure (e.g., by dynamically selecting an error correction scheme).

Figure 15B:
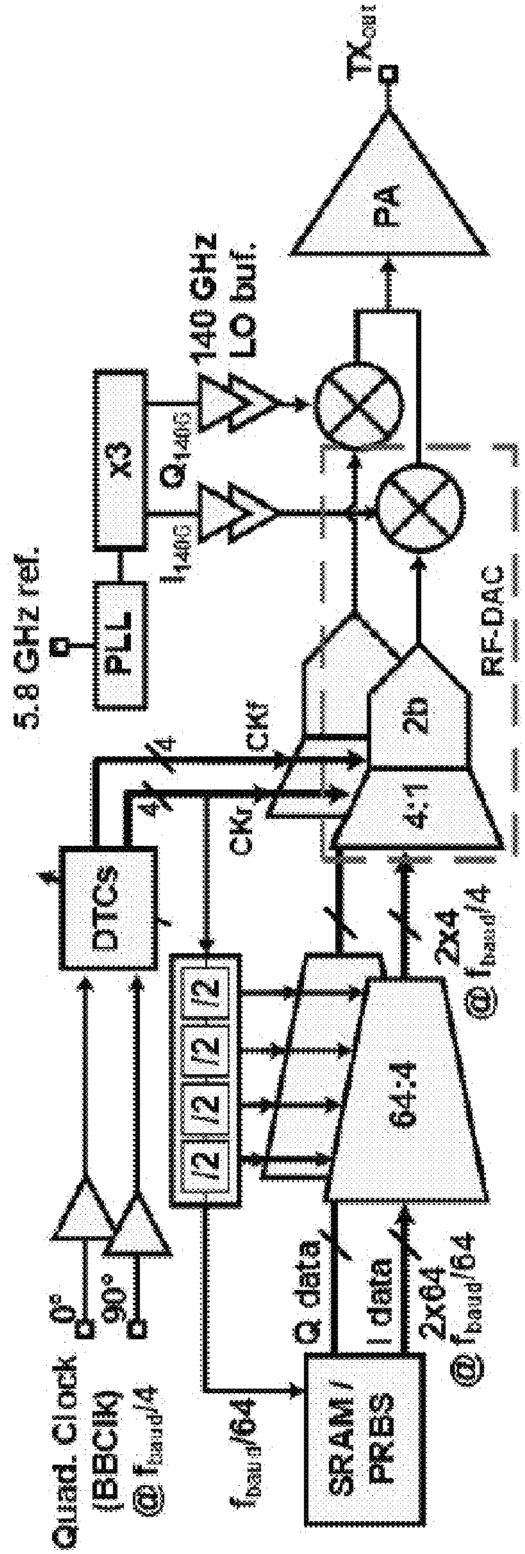

FIG. 15B schematically shows a top-level architecture of a transmitter (TX) associated with the second wireless I/O transceiver architecture. The second wireless I/O transceiver architecture may target data-plane applications with data links greater than 100 Gb/s in the D-band. A direct-conversion IQ digital transmitter (RF-DAC) may enable an energy-efficient and wideband TX design at sub-THz frequencies, since the DAC functionality embedded in the upconversion mixers may minimize the number of bandwidth-limiting circuit nodes in the signal path. This may optimize the fractional bandwidth used around the desired carrier frequency. In this example, a memory (e.g., a static random access memory, SRAM) may store data which are to be transmitted and may provide the data as a four quarter-rate data pseudo-random bit streams (PRBS) at baud frequency ($f_{baud}$) divided by four to a 4:1 multiplexer (mux) embedded in the RF-DAC. The quarter-rate design may eliminate the need for power-hungry resampling of the serializer output by using multi-phase clocks derived from the quadrature input clocks (BBClk). BBClk may be generated externally to allow flexibility in setting baud rate, but it may also be derived from the integrated PLL in other implementations. Eight integrated digital-to-time converters (DTCs) may compensate for mismatch in the clock signals shared by all six 4:1 multiplexers. Each DTC may achieve 20 ps delay-range using coarse interpolator-based and fine varactor-based delay elements with about 500 fs and about 100 fs resolution, respectively. Each current source in the RF-DAC may sequentially generate steered one unit interval (UI) wide (with 1 UI=$1/f_{baud}$) current pulses from two $f_{baud}/4$ clocks spaced by 1-UI using a cascade of dynamic logic gates. The first logic stage may produce a 1-UI pulse (PLS) triggered by the falling and rising edges of clocks CKr and CKf, respectively. Besides this transmitter (TX), the second wireless I/O transceiver architecture may include the digital signal processor 128 in the digital baseband and the digital signal processor 128 may be configured to employ channel coding using a linear code in accordance with the present disclosure (e.g., by dynamically selecting an error correction scheme).

Table 1 shows various parameters of the first wireless I/O transceiver architecture and the second wireless I/O transceiver architecture respectively for employing a first (forward) error correction scheme using a (72, 64) Hamming code without interleaving and a second (forward) error correction scheme using the (72, 64) Hamming code with parity (i.e., using the parity codeword) and interleaving, as described herein. It is understood that these are examples to illustrate the advantages and effects of the present disclosure of employing channel coding using linear codes and that any other linear code may be used. According to various aspects, the first wireless I/O transceiver architecture and/or the second wireless I/O transceiver architecture may be configured such that the digital signal processor 128 selects one of the first (forward) error correction scheme and the second (forward) error correction scheme dynamically in accordance with the present disclosure. As described herein, wireline links in general, and thus also the PCIe 6.0 use case, only operate in static environments and therefore do not require any dynamic adaption. The PCIe 6.0 use case works in conjunction with a rebroadcast mechanism, which leads to non-deterministic latency. For latency critical links, PCIe 6.0 is forced to drop to a lower data rate (with a minimum loss of half the data rate).

In general, Table 1 shows that the dynamic selection of the error correction scheme enables Wireless I/O applications with energy efficiencies, data rate, and bounded latencies that are competitive with or even better than state-of-the-art wireline links, such as PCIe 6.0 (in both, control-plan and user-plane communication). The latencies are given in nanoseconds (ns) as well as in cycles (CC). The total latency is given as the sum of the packet latency and the latency induced by the FEC. As shown, the two wireless use cases allow total latencies which are comparable to the wireline PCIe 6.0 use case and which are less than 1 millisecond (ms). Even the Ultra-reliable Low-Latency Communication (URLLC) specification within 5G allows for latencies up to 1 ms. Due to channel losses, there are significant challenges to doubling the bandwidth beyond the 32.0 GT/s in PCIe 5.0 to the desired 64.0 GT/s in PCIe 6.0. To overcome this, PAM-4 signaling was introduced in PCIe 6.0, resulting is a significant drop in BER from previous generation's target of $10^{-12}$. To overcome this, FEC, coupled with a strong CRC code, and a rebroadcast mechanism (to deal with bursty errors) were adopted. The PCIe 6.0 FEC provides 1 symbol (1-bit) of error correction capability per block/FLIT (flow control unit) and results in a retry probability of about $10^{-6}$, for a link-level failure rate of less than $10^{-20}$ (although with non-deterministic latency as described herein). FEC takes less than 2 ns and each retry takes about 100 ns, with a peak energy efficiency about 2 pJ/bit. Power measurements of the first wireless I/O transceiver architecture without using channel coding revealed about 9.9 pJ/bit for the AFE circuit and about 30 pJ/bit for the DBB to achieve a BER of less than about $10^{-10}$ for Quadrature Phase-Shift Keying (QPSK) at 1 Gb/s. In the case of employing the channel-coding as described herein, the relaxed BER requirement of about $10^{-3}$ may reduce the combined power of the AFE circuit and the DBB to about 7.0 pJ/bit for a 16 Gb/s link using 256QAM and to about 7.9 pJ/bit for a $10^{-10}$ BER 14.2 GB/s data link when using the (72, 64) Hamming code with parity and interleaving. Power measurements of the second wireless 1/transceiver architecture without using channel coding revealed about 4.3 pJ/bit for the AFE circuit and about 11.2 pJ/bit for the DBB to achieve a BER of less than about $10^{-10}$ for Quadrature Phase-Shift Keying (QPSK) at 187 Gb/s. In the case of employing the channel-coding as described herein, the relaxed BER requirement of about $10^{-3}$ may reduce the combined power of the AFE circuit and the DBB to about 1.4 pJ/bit for a 384.0 Gb/s link using 256QAM and to about 1.6 pJ/bit for a $10^{-10}$ BER 341.3 GB/s data link when using the (72, 64) Hamming code with parity and interleaving. This illustratively shows that using linear codes for channel coding in wireless I/O applications allows to achieve a comparatively low latency (e.g., of less than 1 ms) and to reduce the power consumption of the wireless communication device in both, control-plane use cases as well as data-plane use-cases.

TABLE 1

| | PCIe 6.0 × 1 | PCIe 6.0 × 4 | PCIe 6.0 × 16 | first wireless I/O transceiver architecture | | second wireless I/O transceiver architecture | |
|---|---|---|---|---|---|---|---|
| Gbaud/s | | 32.0 | | 2.0 | 2.0 | 48.0 | 48.0 |
| Encoding | | 4PAM | | 256QAM | 256QAM | 256QAM | 256QAM |
| FEC | | 3-way interlaced FEC and CRC | | (72, 64) Hamming code without interleaving | (72, 64) Hamming code with parity and interleaving | (72, 64) Hamming code without interleaving | (72, 64) Hamming code with parity and interleaving |
| Channel BER | | $10^{-6}$ | | $10^{-6}$ | $10^{-3}$ | $10^{-6}$ | $10^{-3}$ |
| Link BER | | $10^{-8}$ | | $10^{-10}$ | $10^{-10}$ | $10^{-10}$ | $10^{-10}$ |
| Throughput | 60.5 Gb/s | 242 Gb/s | 968 Gb/s | 14.2 Gb/s | 14.2 Gb/s | 341.3 Gb/s | 341.3 Gb/s |
| Packet | 32 ns | 8 ns | 2 ns | 4.5 ns | 144 ns | 0.2 ns | 6 ns |
| latency | 1024 CC | 256 CC | 64 CC | 9 CC | 288 CC | 9 CC | 288 CC |
| FEC | 2 ns | 2 ns | 2 ns | 2 ns | 2 ns | 2 ns | 2 ns |

TABLE 1-continued

| | PCIe 6.0 × 1 | PCIe 6.0 × 4 | PCIe 6.0 × 16 | first wireless I/O transceiver architecture | | second wireless I/O transceiver architecture | |
|---|---|---|---|---|---|---|---|
| latency | 64 CC | 64 CC | 64 CC | 4 CC | 4 CC | 96 CC | 96 CC |
| Total | 34 ns | 10 ns | 4 ns | 6.5 ns | 146 ns | 2.2 ns | 8 ns |
| latency | 1088 CC | 320 CC | 128 CC | 13 CC | 292 CC | 105 CC | 384 CC |

It is understood that the first wireless I/O transceiver architecture and the second wireless I/O transceiver architecture serve as examples to illustrate the advantages of using linear codes for channel coding in wireless applications (e.g., wireless I/O applications) and that a wireless application may use any other wireless transceiver architecture employing channel-coding using a linear code and/or employing the dynamic selection of the error correction scheme according to the present disclosure.

Figure 16:
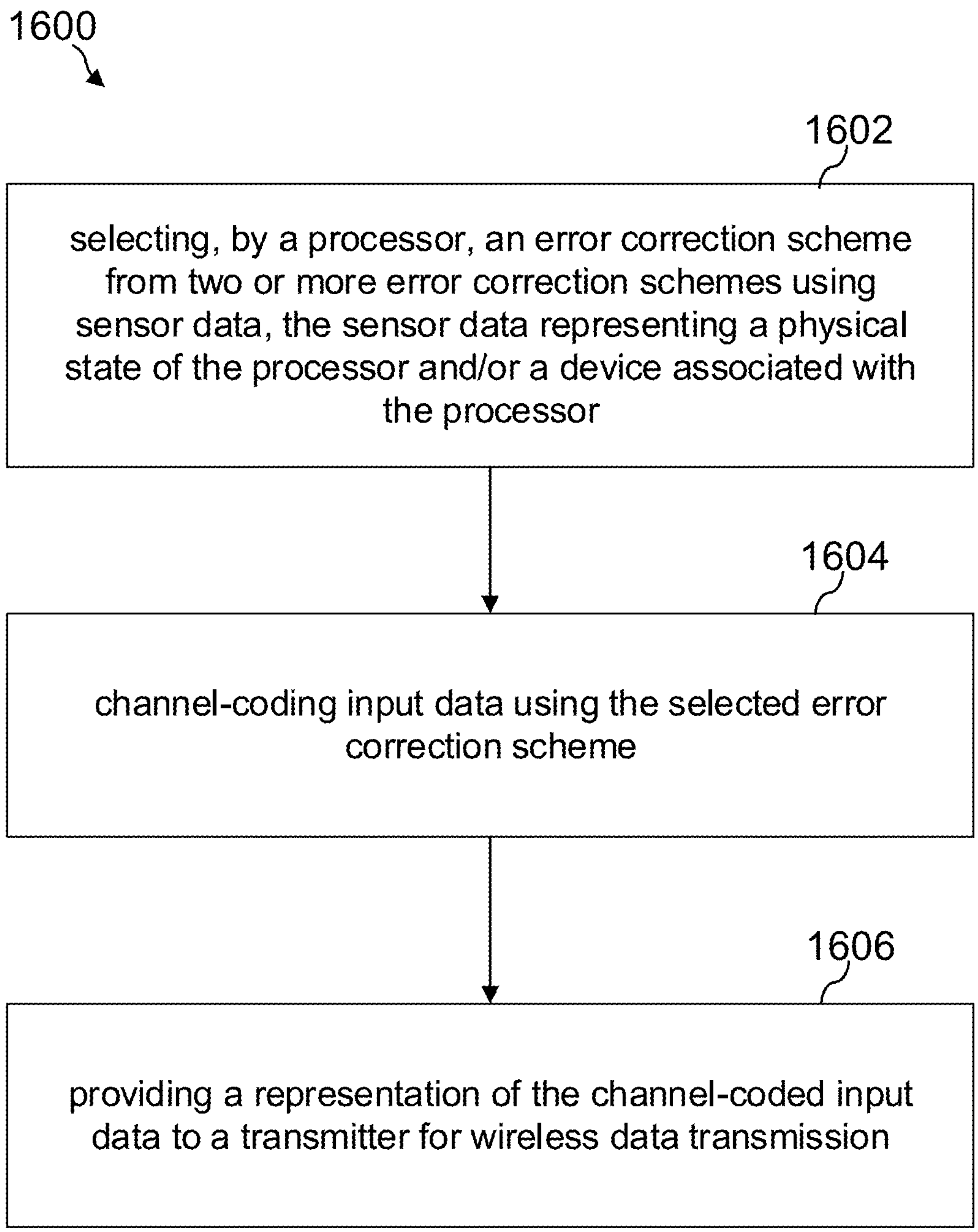
FIG. 16 shows a flow diagram of a method for generating data for wireless transmission according to various aspects of the disclosure.

FIG. 16 shows a flow diagram of a method 1600 for generating data for wireless transmission according to various aspects. The method 1600 may include selecting (e.g., by a processor), using sensor data, an error correction scheme from two or more error correction schemes, the sensor data representing a physical state of a processor and/or a device associated with the processor (in 1602). The method 1600 may include channel-coding input data using the selected error correction scheme (in 1604). The method 1600 may include providing a representation of the channel-coded input data to a transmitter for wireless data transmission (in 1606). The selection of the error correction scheme and/or the channel-coding of the input data using the selected error correction scheme may be carried as described herein (e.g., with reference to FIG. 2 to FIG. 5 and FIG. 9A to FIG. 12).

Figure 17:
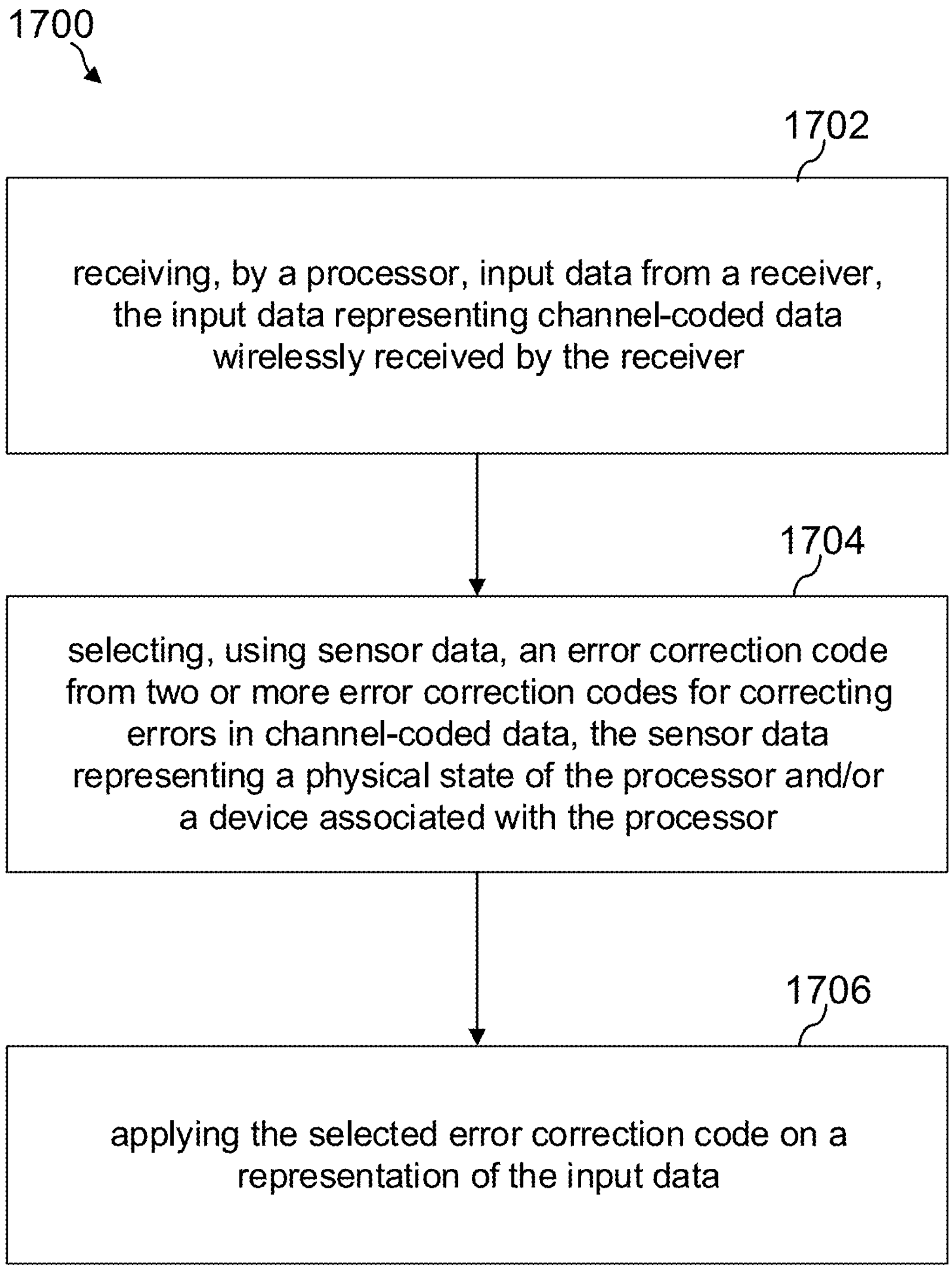
FIG. 17 shows a flow diagram of a method for processing wirelessly received data according to various aspects of the disclosure.

FIG. 17 shows a flow diagram of a method 1700 for processing wirelessly received data according to various aspects. The method 1700 may include receiving (e.g., by a processor) input data from a receiver, the input data representing channel-coded data wirelessly received by the receiver (in 1702). The method 1700 may include selecting, using sensor data, an error correction code from two or more error correction codes for correcting errors in channel-coded data (in 1704). The sensor data may represent a physical state of a (e.g., the) processor and/or a device associated with the receiver. The method 1700 may include applying the selected error correction code on a representation of the input data (in 1706). The selection of the error correction scheme and/or the application of the selected error correction scheme may be carried as described herein (e.g., with reference to FIG. 2 and FIG. 6A to FIG. 12).

In the following, various examples are provided that refer to the first device 102, the second device 104, the wireless communication device 103, the one or more processors 208, the digital signal processor 128, method 1600, and method 1700.

Example 1 is a device, the device including: a processor configured to: select, using sensor data, an error correction code from two or more error correction codes, the sensor data representing a physical state of the processor and/or the device; generate channel-coded data by channel-coding input data using the selected error correction code; and provide a representation of the channel-coded data to a (wireless) transmitter for wireless data transmission.

In Example 2, the device of Example 1 can optionally further include: the transmitter configured to wirelessly transmit a signal representing the representation of the channel-coded data (e.g., to a further processor and/or a further device via a wireless communication link).

In Example 3, the subject matter of Example 2 can optionally include that the device includes a chip, the chip including the processor, the transmitter, a further processor, and a receiver coupled to the further processor; wherein the transmitter is configured to wirelessly transmit the signal to the receiver (e.g., On-Chip communication, intra-chip communication).

In Example 4, the subject matter of Example 2 can optionally include that the device (e.g., a multi-chip-package or a laptop) includes a first chip and a second chip, wherein the first chip includes the processor and the transmitter, and wherein the second chip includes a receiver and a further processor coupled to the receiver; wherein the transmitter of the first chip is configured to wirelessly transmit the signal to the receiver of the second chip (e.g., Chip-to-Chip communication, inter-chip communication).

In Example 5, the subject matter of any one of Examples 1 to 4 can optionally include that the processor is configured to: generate modulated data by modulating (e.g., using quadrature amplitude modulation, QAM, such as 16QAM, 64QAM, 256QAM, etc.) the channel-coded data and provide a representation of the modulated data as the representation of the channel-coded data to the transmitter for wireless transmission.

In Example 6, the subject matter of any one of Examples 1 to 5 can optionally include that the processor is configured to: determine, using the sensor data, whether to interleave the channel-coded data or not.

In Example 7, the subject matter of Example 6 can optionally include that the processor is configured to: in the case that it is determined that the channel-coded data are to be interleaved, generate interleaved data by applying an interleaving algorithm on the channel-coded data and provide a representation of the interleaved data as the representation of the channel-coded data to the transmitter.

In Example 8, the subject matter of Example 7 can optionally include that the processor is configured to: generate modulated data by modulating (e.g., using quadrature amplitude modulation, QAM, such as 16QAM, 64QAM, 256QAM, etc.) the interleaved data and provide a representation of the modulated data as the representation of the interleaved data to the transmitter for wireless transmission.

In Example 9, the subject matter of any one of Examples 1 to 8 can optionally include that the sensor data represent at least one of: an orientation of the device, a change of an orientation of the device, a position of the device, a change of a position of the device, network conditions of a short-range wireless network associated with the device (e.g., network conditions of a wireless local area network, WLAN, network conditions of a Bluetooth network, network conditions of a near-field communication, NFC, network, and/or network conditions of an ultra-wideband, UWB, network, etc.), and/or network conditions of a medium-range and/or long-range wireless network associated with the device (e.g., network conditions of a cellular network (mobile phone network), such as 2G (GSM), 3G (UMTS), 4G (LTE), and/or 5G).

In Example 10, the subject matter of any one of Examples 1 to 9 can optionally include that the sensor data are acquired by one or more sensors (e.g., one or more sensors of the device).

In Example 11, the subject matter of Example 10 can optionally include that the one or more sensors include at least one sensor of the following list of sensors: a magnetic sensor, a hall sensor, an accelerometer, a gyro sensor (or gyroscope), an acoustic sensor, a tilt sensor, and/or a capacitive sensor.

In Example 12, the subject matter of any one of Examples 1 to 11 can optionally include that the processor is configured to: select the error correction code from the two or more error correction codes using a model which is configured to provide (e.g., output), responsive to inputting the sensor data into the model, the error correction code which is to be selected from the two or more error correction codes.

In Example 13, the subject matter of Example 12 can optionally include that the model includes a first sub-model and a second sub-model; wherein the first sub-model is configured to provide (e.g., output or classify), responsive to inputting the sensor data into the first sub-model, expected channel conditions (e.g., an expected signal-to-noise ratio) of a wireless communication link over which the representation of the channel-coded data is to be transmitted; and wherein the second sub-model is configured to provide, responsive to inputting the expected channel conditions (e.g., the expected signal-to-noise ratio) of the wireless communication link into the second sub-model, the error correction code which is to be selected from the two or more error correction codes.

In Example 14, the subject matter of Example 12 or 13 can optionally include that the model is or includes a trained machine learning model (e.g., wherein the first sub-model is a trained machine learning model and/or the second sub-model is a trained machine learning model).

In Example 15, the subject matter of any one of Examples 1 to 14 can optionally include that at least one (e.g., each) of the two or more error correction codes includes a (two-dimensional) linear (block) code (e.g., a Hamming code; a Bose-Chaudhuri-Hocquenghem, BCH, code; a Golay code; and/or a Hsiao code)

In Example 16, the subject matter of any one of Examples 1 to 15 can optionally include that the two or more error correction codes include a first error correction code and a second error correction code.

In Example 17, the subject matter of Example 16 can optionally include that the first error correction code is capable to correct a first number of bit errors in a data sequence and wherein the second error correction code is capable to correct a second number of bit errors in the data sequence, wherein the second number is greater than the first number (e.g., wherein the first error correction code is a Single-Error-Correction—Double-Error-Detection, SEC-DED, code and wherein the second correction code is a Triple-Error-Correction—Quadruple-Error-Detection, TEC-QED, code; or wherein the first error correction code is a Double-Error-Correction—Triple-Error-Detection, DEC-TED, code and wherein the second correction code is a Triple-Error-Correction—Quadruple-Error-Detection, TEC-QED, code; etc.).

In Example 18, the subject matter of Example 16 or 17 can optionally include that the input data (e.g., an input data packet) include a plurality of codewords; wherein the first error correction code indicates to apply a (e.g., two-dimensional) linear block code (e.g., a Hamming code, such as a (72, 64) Hamming code) on the plurality of codewords; and wherein the second error correction code indicates to determine a parity codeword which represents an orthogonal parity of the plurality of codewords and to apply a or the linear block code (e.g., a Hamming code, such as the (72, 64) Hamming code) on the parity codeword and the plurality of codewords.

In Example 19, the subject matter of any one of Examples 16 to 18 can optionally include that the first error correction code is a linear error correction code (e.g., a Single-Error-Correction—Double-Error-Detection, SEC-DED, Hamming code); and wherein the second correction code includes an addition of an orthogonal parity codeword to a plurality of codewords and the application of the linear error correction code on the plurality of codewords and the parity codeword (e.g., making the Single-Error-Correction—Double-Error-Detection, SEC-DED, Hamming code to a Triple-Error-Correction—Quadruple-Error-Detection, TEC-QED, code).

In Example 20, the subject matter of any one of Examples 16 to 19 can optionally include that the first error correction code is an extended Hamming code (e.g., a (72, 64) Hamming code); and wherein the second correction code indicates to determine a parity codeword which represents an orthogonal parity of a plurality of codewords and to apply the extended Hamming code on the parity codeword and the plurality of codewords.

In Example 21, the subject matter of any one of Examples 1 to 20 can optionally include that the processor is configured to: determine, using the sensor data, expected channel conditions (e.g., an expected signal-to-noise ratio) of a wireless communication link over which the representation of the channel-coded data is to be transmitted; and select the error correction code from the two or more error correction codes using the determined expected channel conditions.

In Example 22, the subject matter of Example 21 in combination with any one of Examples 16 to 20 can optionally include that the processor is configured to: select the first error correction code from the two or more error correction codes in the case that the determined expected channel conditions indicate a signal-to-noise ratio greater than a predefined threshold value, and/or select the second error correction code from the two or more error correction codes in the case that the determined expected channel conditions indicate a signal-to-noise ratio equal to or lower than the predefined threshold value.

In Example 23, the subject matter of any one of Examples 1 to 22 can optionally include that the processor is configured to: determine an expected signal-to-noise ratio of a wireless communication link over which the representation of the channel-coded data is to be transmitted; select a first error correction code from the two or more error correction codes in the case that the determined expected signal-to-noise ratio is greater than a predefined threshold value; and select, from the two or more error correction codes, a second error correction code different from the first error correction code in the case that the determined expected signal-to-noise ratio is equal to or lower than the predefined threshold value.

Example 24 is a device, the device including: a processor configured to: receive input data from a (wireless) receiver, the input data representing channel-coded data wirelessly received by the receiver; select, using sensor data, an error correction code from two or more error correction codes for correcting errors in channel-coded data, the sensor data representing a physical state of the processor and/or the device; and apply the selected error correction code on a representation of the input data.

In Example 25, the device of Example 24 can optionally further include: the receiver configured to wirelessly receive (e.g., from a further processor and/or a further device via a wireless communication link) a signal representing the channel-coded data and to provide a representation of the received signal as input data to the processor.

In Example 26, the subject matter of Example 25 can optionally include that the device includes a chip, the chip including the processor, the receiver coupled to the processor, a further processor, and a transmitter coupled to the further processor; wherein the receiver is configured to wirelessly receive the signal from the transmitter (e.g., On-Chip communication, intra-chip communication).

In Example 27, the subject matter of Example 25 can optionally include that the device (e.g., a Package) includes a first chip and a second chip, wherein the first chip includes the processor and the receiver, and wherein the second chip includes a transmitter and a further processor coupled to the transmitter; wherein the receiver of the first chip is configured to wirelessly receive the signal from the transmitter of the second chip (e.g., Chip-to-Chip communication, inter-chip communication).

In Example 28, the subject matter of any one of Examples 24 to 27 can optionally include that the processor is configured to: generate demodulated data by demodulating the input data and apply the selected error correction code on the demodulated data as the representation of the input data.

In Example 29, the subject matter of any one of Examples 24 to 28 can optionally include that the processor is configured to: determine, using the sensor data, whether to deinterleave the representation of the input data prior to applying the selected error correction code.

In Example 30, the subject matter of Example 29 can optionally include that the processor is configured to: in the case that it is determined that the representation of the input data is to be deinterleaved prior to applying the selected error correction code, generate deinterleaved data by applying a deinterleaving algorithm on the representation of the input data and apply the selected error correction code on the deinterleaved data.

In Example 31, the subject matter of any one of Examples 1 to 30 can optionally include that the sensor data represent at least one of: an orientation of the device, a change of an orientation of the device, a position of the device, a change of a position of the device, network conditions of a wireless local area network, WLAN, associated with the device, and/or network conditions of a Bluetooth network associated with the device.

In Example 32, the subject matter of any one of Examples 1 to 31 can optionally include that the sensor data are acquired by one or more sensors (e.g., one or more sensors of the device).

In Example 33, the subject matter of Example 32 can optionally include that the one or more sensors include at least one sensor of the following list of sensors: a magnetic sensor, a hall sensor, an accelerometer, a gyro sensor (or gyroscope), an acoustic sensor, a tilt sensor, and/or a capacitive sensor.

In Example 34, the subject matter of any one of Examples 1 to 33 can optionally include that the processor is configured to: select the error correction code from the two or more error correction codes using a model which is configured to provide (e.g., output), responsive to inputting the sensor data into the model, the error correction code which is to be selected from the two or more error correction codes.

In Example 35, the subject matter of Example 34 can optionally include that the model includes a first sub-model and a second sub-model; wherein the first sub-model is configured to provide (e.g., output or classify), responsive to inputting the sensor data into the first sub-model, expected channel conditions (e.g., an expected signal-to-noise ratio) of a wireless communication link over which the channel-coded data are wirelessly received by the receiver; and wherein the second sub-model is configured to provide, responsive to inputting the expected channel conditions (e.g., the expected signal-to-noise ratio) of the wireless communication link into the second sub-model, the error correction code which is to be selected from the two or more error correction codes.

In Example 36, the subject matter of Example 34 or 35 can optionally include that the model is or includes a trained machine learning model (e.g., wherein the first sub-model is a trained machine learning model and/or the second sub-model is a trained machine learning model).

In Example 37, the subject matter of any one of Examples 34 to 36 can optionally include that the processor is configured to: determine a bit error rate, BER, associated with the input data; determine, whether the determined bit error rate is equal to or greater than a predefined BER threshold value; in the case that the determined bit error rate is equal to or greater than the predefined BER threshold value, determine that another error correction code is to be selected from the two or more error correction codes; and adapt the model (e.g., further train the machine-learning model) to provide (e.g., output) the other error correction code responsive to inputting the sensor data into the model.

In Example 38, the subject matter of any one of Examples 1 to 37 can optionally include that at least one (e.g., each) of the two or more error correction codes includes a (two-dimensional) linear (block) code (e.g., Hamming code; a Bose-Chaudhuri-Hocquenghem, BCH, code; a Golay code; and/or a Hsiao code).

In Example 39, the subject matter of any one of Examples 1 to 38 can optionally include that the two or more error correction codes include a first error correction code and a second error correction code.

In Example 40, the subject matter of Example 39 can optionally include that the first error correction code is capable to correct a first number of bit errors in a data sequence and wherein the second error correction code is capable to correct a second number of bit errors in the data sequence, wherein the second number is greater than the first number (e.g., wherein the first error correction code is a Single-Error-Correction—Double-Error-Detection, SEC-DED, code and wherein the second correction code is a Triple-Error-Correction—Quadruple-Error-Detection, TEC-QED, code; or wherein the first error correction code is a Double-Error-Correction—Triple-Error-Detection, DEC-TED, code and wherein the second correction code is a Triple-Error-Correction—Quadruple-Error-Detection, TEC-QED, code; etc.).

In Example 40, the subject matter of Example 39 or 40 can optionally include that the input data (e.g., an input data packet) include a plurality of codewords; wherein the first error correction code indicates to apply a (e.g., two-dimensional) linear block code (e.g., Hamming code, such as a (72, 64) Hamming code) on the plurality of codewords; and wherein the second error correction code indicates to determine a parity codeword which represents an orthogonal parity of the plurality of codewords and to apply a or the linear block code (e.g., a Hamming code, such as the (72, 64) Hamming code) on the parity codeword and the plurality of codewords.

In Example 42, the subject matter of any one of Examples 39 to 41 can optionally include that the first error correction code is a linear error correction code (e.g., a Single-Error-Correction—Double-Error-Detection, SEC-DED, Hamming code); and wherein the second correction code includes an addition of an orthogonal parity codeword to a plurality of codewords and the application of the linear error correction code on the plurality of codewords and the parity codeword (e.g., making the Single-Error-Correction—Double-Error-Detection, SEC-DED, Hamming code to a Triple-Error-Correction—Quadruple-Error-Detection, TEC-QED, code).

In Example 43, the subject matter of any one of Examples 39 to 42 can optionally include that the first error correction code is an extended Hamming code (e.g., a (72, 64) Hamming code); and wherein the second correction code indicates to determine a parity codeword which represents an orthogonal parity of a plurality of codewords and to apply the extended Hamming code on the parity codeword and the plurality of codewords.

In Example 44, the subject matter of any one of Examples 24 to 43 can optionally include that the processor is configured to: determine, using the sensor data, expected channel conditions (e.g., an expected signal-to-noise ratio) of a wireless communication link over which the channel-coded data are wirelessly received by the receiver; and select the error correction code from the two or more error correction codes using the determined expected channel conditions.

In Example 44, the subject matter of Example 44 in combination with any one of Examples 39 to 43 can optionally include that the processor is configured to: select the first error correction code from the two or more error correction codes in the case that the determined expected channel conditions indicate a signal-to-noise ratio greater than a predefined threshold value, and/or select the second error correction code from the two or more error correction codes in the case that the determined expected channel conditions indicate a signal-to-noise ratio equal to or lower than the predefined threshold value.

In Example 46, the subject matter of any one of Examples 24 to 45 can optionally include that the processor is configured to: determine an expected signal-to-noise ratio of a wireless communication link over which the channel-coded data are wirelessly received by the receiver; select a first error correction code from the two or more error correction codes in the case that the determined expected signal-to-noise ratio is greater than a predefined threshold value; and select, from the two or more error correction codes, a second error correction code different from the first error correction code in the case that the determined expected signal-to-noise ratio is equal to or lower than the predefined threshold value.

Example 47 is a device, the device including: a processor configured to: select, based on (e.g., using) physical state information (e.g., sensor data), an error correction code from two or more error correction codes for channel coding, the physical state information representing a physical state of the processor and/or the device; generate (channel-coded) first data by channel coding input data using the selected error correction code; and provide (transmit) second data representing the generated (channel-coded) first data to a transmitter for wireless (input/output, I/O) data transmission.

Example 48 is a device, the device including: a processor configured to: (continuously or successively) channel-code input data of an input data stream using a selected error correction code and provide a representation of the channel-coded input data to a transmitter for wireless data transmission; determine, using sensor data, a change of a physical state of the processor and/or the device; and in response to determining the change of the physical state, change the selected error correction code from a first error correction code to a second error correction code different from the first error correction code.

Example 49 is a device, the device including: a processor configured to: (continuously or successively) channel-code input data of an input data stream using a selected error correction code and provide a representation of the channel-coded input data to a transmitter for wireless data transmission; receive sensor data in predefined (e.g., discrete) time steps and/or responsive to one or more predefined events (i.e., event-based); each time respective sensor data are received, determine, using the respectively received sensor data, whether a physical state of the processor and/or the device changed from a first predefined physical state into a second predefined physical state; in the case that it is determined that the physical state changed from the first predefined physical state into the second predefined physical state, change the selected error correction code from a first error correction code to a second error correction code different from the first error correction code; and in the case that it is determined that the physical state did not change from the first predefined physical state into the second predefined physical state, keep the first error correction code as the selected error correction code.

The respective device of any of Examples 47 to 49 may be configured to, where applicable, in accordance with the device of any of the Examples 2 to 23.

Example 50 is a device, the device including: a processor configured to: (continuously or successively) receive input data of an input data stream from a receiver, the input data including channel-coded data wirelessly received by the receiver; apply a selected error correction code on a representation of the input data stream; determine, using sensor data, a change of a physical state of the processor and/or the device; and in response to determining the change of the physical state, change the selected error correction code from a first error correction code to a second error correction code different from the first error correction code.

Example 51 is a device, the device including: a processor configured to: receive first input data from a receiver, the first input data representing first channel-coded data wirelessly received by the receiver; apply a first error correction code on a representation of the first input data; determine, using sensor data, a change of a physical state of the processor and/or the device; and receive second input data from the receiver, the second input data representing second channel-coded data wirelessly received by the receiver; in response to determining the change of the physical state, apply a second error correction code different from the first error correction code on a representation of the second input data.

Example 52 is a device, the device including: a processor configured to: (continuously or successively) receive input data of an input data stream from a receiver and apply a selected error correction code on a representation of the input data, the input data representing channel-coded data wirelessly received by the receiver; receive sensor data in predefined (discrete) time steps and/or responsive to one or more predefined events; each time respective sensor data are received, determine, using the respectively received sensor data, whether a physical state of the processor and/or the device changed from a first predefined physical state into a second predefined physical state; in the case that it is determined that the physical state changed from the first predefined physical state into the second predefined physical state, change the selected error correction code from a first error correction code to a second error correction code different from the first error correction code; and in the case that it is determined that the physical state did not change from the first predefined physical state into the second predefined physical state, keep the first error correction code as the selected error correction code.

Example 53 is a device, the device including: a processor configured to: receive first input data from a receiver and apply a first error correction code on a representation of the first input data, the first input data representing first channel-coded data wirelessly received by the receiver; determine, using sensor data, whether a physical state of the processor and/or the device changed (e.g., from a first predefined physical state into a second predefined physical state); receive second input data from the receiver, the second input data representing second channel-coded data wirelessly received by the receiver; in the case that it is determined that the physical state changed, apply a second error correction code different from the first error correction code on a representation of the second input data; and in the case that it is determined that the physical state did not change, apply the first error correction code on the representation of the second input data.

The respective device of any of Examples 50 to 53 may be configured to, where applicable, in accordance with the device of any of the Examples 25 to 46.

In Example 54, the subject matter of Example 49 or 52 can optionally include that the device is a laptop or a convertible-like device and wherein the one or more predefined events include at least one of the following events: a shutdown of the device, activating a shared display, connecting the device to a docking station, connecting the device to a power supply (e.g., plugging a power cable of the device into a power socket), connecting the device to a wired network, and/or pushing at least one of one or more predefined buttons.

Example 55 is a device, the device including: a processor configured to: select, using sensor data, an error correction code from two or more error correction codes, the sensor data representing a physical state of the processor and/or the device; and generate channel-coded data by channel-coding transmit data using the selected error correction code and provide a representation of the channel-coded data to a transmitter for wireless data transmission; and/or receive receive data from a receiver and apply the selected error correction code on a representation of the receive data, the receive data representing channel-coded data wirelessly received by the receiver.

The device of Example 55 may be configured to, where applicable, in accordance with the device of any of the Examples 1 to 46.

In Example 56, the subject matter of Example 55 can optionally include that the device includes a transceiver, the transceiver including the transmitter and the receiver.

Example 57 is a device, the device including: means for selecting, using sensor data, an error correction code from two or more error correction codes, the sensor data representing a physical state of the processor and/or the device; means for generating channel-coded data by channel-coding input data using the selected error correction code; and means for providing a representation of the channel-coded data to a transmitter for wireless data transmission. Optionally, the device of Example 57 may be configured to, where applicable, in accordance with the device of any of the Examples 2 to 23.

Example 58 is a device, the device including: means for receiving input data from a receiver, the input data representing channel-coded data wirelessly received by the receiver; means for selecting, using sensor data, an error correction code from two or more error correction codes for correcting errors in channel-coded data, the sensor data representing a physical state of the processor and/or the device; and means for applying the selected error correction code on a representation of the input data. Optionally, the device of Example 58 may be configured to, where applicable, in accordance with the device of any of the Examples 25 to 46.

Example 59 is a device, the device including: means for channel-coding input data of an input data stream using a selected error correction code and provide a representation of the channel-coded input data to a transmitter for wireless data transmission; means for determining, using sensor data, a change of a physical state of the processor and/or the device; and means for changing, in response to determining the change of the physical state, the selected error correction code from a first error correction code to a second error correction code different from the first error correction code. Optionally, the device of Example 59 may be configured to, where applicable, in accordance with the device of any of the Examples 2 to 23.

Example 60 is a device, the device including: means for receiving input data of an input data stream from a receiver, the input data representing channel-coded data wirelessly received by the receiver; means for applying a selected error correction code on a representation of the input data; means for determining, using sensor data, a change of a physical state of the processor and/or the device; and means for changing, in response to determining the change of the physical state, the selected error correction code from a first error correction code to a second error correction code different from the first error correction code. Optionally, the device of Example 60 may be configured to, where applicable, in accordance with the device of any of the Examples 25 to 46.

In Example 61, the subject matter of Example 1 or 60 can optionally include that the device is a Laptop or a convertible-like device.

Example 62 is a wireless network system including: a first device (e.g., a first chip), the first device including: a first processor configured to: select, using sensor data, an error correction code from two or more error correction codes, generate channel-coded data by channel-coding input data using the selected error correction code, and provide a representation of the channel-coded data to the transmitter for wireless data transmission; and the transmitter configured to wirelessly transmit a signal representing the representation of the channel-coded data; and a second device (e.g., a second chip), the device including: a receiver configured to wirelessly receive the signal from the transmitter; and a second processor configured to: receive input data from a receiver, the input data representing a representation of the received signal, select, using the sensor data, the error correction code from two or more error correction codes, the sensor data representing a physical state of the first processor, the first device, the second processor, the second device, and/or a further device of the wireless network system, and apply the selected error correction code on a representation of the input data.

Example 63 is a wireless network system including: a first device in accordance with any one of Examples 1 to 23; and a second device in accordance with any one of Examples 24 to 46.

Example 64 is a method of computer-implemented training a (e.g., machine-learning) model, the method including: generating a wireless communication link between a device (e.g., a processor or a chip) and a further device (e.g., a further processor or a further chip); bringing the device into a plurality of physical states one after another; for each physical state of the plurality of physical states: at least one sensor acquiring sensor data associated with the physical state, determining (e.g., measuring or simulating) expected channel conditions of the wireless communication link, and train the model to output the determined expected channel conditions responsive to inputting the sensor data associated with the physical state into the model.

Example 65 is a method of computer-implemented training a (e.g., machine-learning) model, the method including: generating a wireless communication link between a device (e.g., a processor or a chip) and a further device (e.g., a further processor or a further chip); bringing the device into a plurality of physical states one after another; for each physical state of the plurality of physical states: at least one sensor acquiring sensor data associated with the physical state, determining (e.g., measuring or simulating) expected channel conditions of the wireless communication link, and selecting an error correction code from two or more error correction codes depending on the determined expected channel conditions; and train the model to output the selected error correction code responsive to inputting the sensor data associated with the physical state into the model.

Example 66 is a method including: selecting (e.g., by a processor), using sensor data, an error correction code from two or more error correction codes, the sensor data representing a physical state of a processor and/or a device associated with the processor; channel-coding input data using the selected error correction code; and providing a representation of the channel-coded input data to a transmitter for wireless data transmission.

Example 67, the method according to Example 66 can optionally further include: generating modulated data by modulating (e.g., using quadrature amplitude modulation, QAM, such as 16QAM, 64QAM, 256QAM, etc.) the channel-coded data; and providing a representation of the modulated data as the representation of the channel-coded data to the transmitter for wireless transmission.

In Example 68, the method of Example 66 or 67 can optionally further include: determining, using the sensor data, whether to interleave the channel-coded data or not.

In Example 69, the method of Example 68 can optionally further include: in the case that it is determined that the channel-coded data are to be interleaved, generating interleaved data by applying an interleaving algorithm on the channel-coded data and providing a representation of the interleaved data as the representation of the channel-coded data to the transmitter.

Example 70, the method according to Example 69 can optionally further include: generating modulated data by modulating (e.g., using quadrature amplitude modulation, QAM, such as 16QAM, 64QAM, 256QAM, etc.) the interleaved data and providing a representation of the modulated data as the representation of the interleaved data to the transmitter for wireless transmission.

In Example 71, the subject matter of any one of Examples 66 to 70 can optionally include that the sensor data represent at least one of: an orientation of the device associated with the processor, a change of an orientation of the device, a position of the device, a change of a position of the device, network conditions of a wireless local area network, WLAN, associated with the device, and/or network conditions of a Bluetooth network associated with the device.

In Example 72, the method of any one of Examples 66 to 71 can optionally further include: acquiring the sensor data by one or more sensors (e.g., one or more sensors of a device associated with the transmitter).

In Example 73, the subject matter of Example 72 can optionally include that the one or more sensors include at least one sensor of the following list of sensors: a magnetic sensor, a hall sensor, an accelerometer, a gyro sensor (or gyroscope), an acoustic sensor, a tilt sensor, and/or a capacitive sensor.

In Example 74, the method of any one of Examples 66 to 73 can optionally further include: selecting the error correction code from the two or more error correction codes using a model which is configured to provide (e.g., output), responsive to inputting the sensor data into the model, the error correction code which is to be selected from the two or more error correction codes.

In Example 75, the subject matter of Example 74 can optionally include that the model includes a first sub-model and a second sub-model; wherein the first sub-model is configured to provide (e.g., output or classify), responsive to inputting the sensor data into the first sub-model, expected channel conditions (e.g., an expected signal-to-noise ratio) of a wireless communication link over which the representation of the channel-coded data is to be transmitted; and wherein the second sub-model is configured to provide, responsive to inputting the expected channel conditions (e.g., the expected signal-to-noise ratio) of the wireless communication link into the second sub-model, the error correction code which is to be selected from the two or more error correction codes.

In Example 76, the subject matter of Example 74 or 75 can optionally include that the model is or includes a trained machine learning model (e.g., wherein the first sub-model is a trained machine learning model and/or the second sub-model is a trained machine learning model).

In Example 77, the subject matter of any one of Examples 66 to 76 can optionally include that at least one (e.g., each) of the two or more error correction codes includes a (two-dimensional) linear (block) code (e.g., a Hamming code; a Bose-Chaudhuri-Hocquenghem, BCH, code; a Golay code; and/or a Hsiao code)

In Example 78, the subject matter of any one of Examples 66 to 77 can optionally include that the two or more error correction codes include a first error correction code and a second error correction code.

In Example 79, the subject matter of Example 78 can optionally include that the first error correction code is capable to correct a first number of bit errors in a data sequence and wherein the second error correction code is capable to correct a second number of bit errors in the data sequence, wherein the second number is greater than the first number (e.g., wherein the first error correction code is a Single-Error-Correction—Double-Error-Detection, SEC-DED, code and wherein the second correction code is a Triple-Error-Correction—Quadruple-Error-Detection, TEC-QED, code; or wherein the first error correction code is a Double-Error-Correction—Triple-Error-Detection, DEC-TED, code and wherein the second correction code is a Triple-Error-Correction—Quadruple-Error-Detection, TEC-QED, code; etc.).

Example 80, the subject matter of Example 78 or 79 can optionally include that the input data (e.g., an input data packet) include a plurality of codewords; wherein the first error correction code indicates to apply a (e.g., two-dimensional) linear block code (e.g., a Hamming code, such as a (72, 64) Hamming code) on the plurality of codewords; and wherein the second error correction code indicates to determine a parity codeword which represents an orthogonal parity of the plurality of codewords and to apply a or the linear block code (e.g., a Hamming code, such as the (72, 64) Hamming code) on the parity codeword and the plurality of codewords.

In Example 81, the subject matter of any one of Examples 78 to 80 can optionally include that the first error correction code is a linear error correction code (e.g., a Single-Error-Correction—Double-Error-Detection, SEC-DED, Hamming code); and wherein the second correction code includes an addition of an orthogonal parity codeword to a plurality of codewords and the application of the linear error correction code on the plurality of codewords and the parity codeword (e.g., making the Single-Error-Correction—Double-Error-Detection, SEC-DED, Hamming code to a Triple-Error-Correction—Quadruple-Error-Detection, TEC-QED, code).

In Example 82, the subject matter of any one of Examples 78 to 81 can optionally include that the first error correction code is an extended Hamming code (e.g., a (72, 64) Hamming code); and wherein the second correction code indicates to determine a parity codeword which represents an orthogonal parity of a plurality of codewords and to apply the extended Hamming code on the parity codeword and the plurality of codewords.

In Example 83, the method of any one of Examples 66 to 82 can optionally further include: determining, using the sensor data, expected channel conditions (e.g., an expected signal-to-noise ratio) of a wireless communication link over which the representation of the channel-coded data is to be transmitted; and selecting the error correction code from the two or more error correction codes using the determined expected channel conditions.

In Example 84, the method of Example 83 optionally in combination with any one of Examples 78 to 82 can optionally further include: selecting the first error correction code from the two or more error correction codes in the case that the determined expected channel conditions indicate a signal-to-noise ratio greater than a predefined threshold value, and/or selecting the second error correction code from the two or more error correction codes in the case that the determined expected channel conditions indicate a signal-to-noise ratio equal to or lower than the predefined threshold value.

In Example 85, the method of any one of Examples 66 to 84 can optionally further include: determining an expected signal-to-noise ratio of a wireless communication link over which the representation of the channel-coded data is to be transmitted; selecting a first error correction code from the two or more error correction codes in the case that the determined expected signal-to-noise ratio is greater than a predefined threshold value; and selecting, from the two or more error correction codes, a second error correction code different from the first error correction code in the case that the determined expected signal-to-noise ratio is equal to or lower than the predefined threshold value.

Example 86 is a method including: receiving (e.g., by a processor) input data from a receiver, the input data representing channel-coded data wirelessly received by the receiver; selecting, using sensor data, an error correction code from two or more error correction codes for correcting errors in channel-coded data, the sensor data representing a physical state of a processor and/or a device associated with the receiver; and applying the selected error correction code on a representation of the input data.

In Example 87, the method of Example 86 can optionally further include: generating demodulated data by demodulating the input data and applying the selected error correction code on the demodulated data as the representation of the input data.

In Example 88, the method of Example 86 or 87 can optionally further include: determining, using the sensor data, whether to deinterleave the representation of the input data prior to applying the selected error correction code.

In Example 89, the method of Example 88 can optionally further include: in the case that it is determined that the representation of the input data is to be deinterleaved prior to applying the selected error correction code, generating deinterleaved data by applying a deinterleaving algorithm on the representation of the input data and applying the selected error correction code on the deinterleaved data.

In Example 90, the subject matter of any one of Examples 86 to 89 can optionally include that the sensor data represent at least one of: an orientation of a device associated with the processor, a change of an orientation of the device, a position of the device, a change of a position of the device, network conditions of a wireless local area network, WLAN, associated with the device, and/or network conditions of a Bluetooth network associated with the device.

In Example 91, the method of any one of Examples 86 to 90 can optionally further include: acquiring the sensor data by one or more sensors (e.g., one or more sensors of a device associated with the receiver).

In Example 92, the subject matter of Example 91 can optionally include that the one or more sensors include at least one sensor of the following list of sensors: a magnetic sensor, a hall sensor, an accelerometer, a gyro sensor (or gyroscope), an acoustic sensor, a tilt sensor, and/or a capacitive sensor.

In Example 93, the method of any one of Examples 86 to 92 can optionally further include: selecting the error correction code from the two or more error correction codes using a model which is configured to provide (e.g., output), responsive to inputting the sensor data into the model, the error correction code which is to be selected from the two or more error correction codes.

In Example 94, the subject matter of Example 93 can optionally include that the model includes a first sub-model and a second sub-model; wherein the first sub-model is configured to provide (e.g., output or classify), responsive to inputting the sensor data into the first sub-model, expected channel conditions (e.g., an expected signal-to-noise ratio) of a wireless communication link over which the channel-coded data are wirelessly received by the receiver; and wherein the second sub-model is configured to provide, responsive to inputting the expected channel conditions (e.g., the expected signal-to-noise ratio) of the wireless communication link into the second sub-model, the error correction code which is to be selected from the two or more error correction codes.

In Example 95, the subject matter of Example 93 or 94 can optionally include that the model is or includes a trained machine learning model (e.g., wherein the first sub-model is a trained machine learning model and/or the second sub-model is a trained machine learning model).

In Example 96, the method of any one of Examples 93 to 95 can optionally further include: determining a bit error rate, BER, associated with the input data; determining, whether the determined bit error rate is equal to or greater than a predefined BER threshold value; in the case that the determined bit error rate is equal to or greater than the predefined BER threshold value, determining that another error correction code is to be selected from the two or more error correction codes; and adapting the model (e.g., further train the machine-learning model) to provide (e.g., output) the other error correction code responsive to inputting the sensor data into the model.

In Example 97, the subject matter of any one of Examples 86 to 96 can optionally include that at least one (e.g., each) of the two or more error correction codes includes a (two-dimensional) linear (block) code (e.g., Hamming code; a Bose-Chaudhuri-Hocquenghem, BCH, code; a Golay code; and/or a Hsiao code).

In Example 98, the subject matter of any one of Examples 86 to 97 can optionally include that the two or more error correction codes include a first error correction code and a second error correction code.

In Example 99, the subject matter of Example 98 can optionally include that the first error correction code is capable to correct a first number of bit errors in a data sequence and wherein the second error correction code is capable to correct a second number of bit errors in the data sequence, wherein the second number is greater than the first number (e.g., wherein the first error correction code is a Single-Error-Correction—Double-Error-Detection, SEC-DED, code and wherein the second correction code is a Triple-Error-Correction—Quadruple-Error-Detection, TEC-QED, code; or wherein the first error correction code is a Double-Error-Correction—Triple-Error-Detection, DEC-TED, code and wherein the second correction code is a Triple-Error-Correction—Quadruple-Error-Detection, TEC-QED, code; etc.).

In Example 100, the subject matter of Example 98 or 99 can optionally include that the input data (e.g., an input data packet) include a plurality of codewords; wherein the first error correction code indicates to apply a (e.g., two-dimensional) linear block code (e.g., Hamming code, such as a (72, 64) Hamming code) on the plurality of codewords; and wherein the second error correction code indicates to determine a parity codeword which represents an orthogonal parity of the plurality of codewords and to apply a or the linear block code (e.g., a Hamming code, such as the (72, 64) Hamming code) on the parity codeword and the plurality of codewords.

In Example 101, the subject matter of anyone of Examples 98 to 100 can optionally include that the first error correction code is a linear error correction code (e.g., a Single-Error-Correction—Double-Error-Detection, SEC-DED, Hamming code); and wherein the second correction code includes an addition of an orthogonal parity codeword to a plurality of codewords and the application of the linear error correction code on the plurality of codewords and the parity codeword (e.g., making the Single-Error-Correction—Double-Error-Detection, SEC-DED, Hamming code to a Triple-Error-Correction—Quadruple-Error-Detection, TEC-QED, code).

In Example 102, the subject matter of anyone of Examples 98 to 102 can optionally include that the first error correction code is an extended Hamming code (e.g., a (72, 64) Hamming code); and wherein the second correction code indicates to determine a parity codeword which represents an orthogonal parity of a plurality of codewords and to apply the extended Hamming code on the parity codeword and the plurality of codewords.

In Example 103, the method of any one of Examples 86 to 102 can optionally further include: determining, using the sensor data, expected channel conditions (e.g., an expected signal-to-noise ratio) of a wireless communication link over which the channel-coded data are wirelessly received by the receiver; and selecting the error correction code from the two or more error correction codes using the determined expected channel conditions.

In Example 104, the method of Example 44, optionally in combination with any one of Examples 98 to 102, can optionally further include: selecting the first error correction code from the two or more error correction codes in the case that the determined expected channel conditions indicate a signal-to-noise ratio greater than a predefined threshold value, and/or selecting the second error correction code from the two or more error correction codes in the case that the determined expected channel conditions indicate a signal-to-noise ratio equal to or lower than the predefined threshold value.

In Example 105, the method of any one of Examples 86 to 104 can optionally further include: determining an expected signal-to-noise ratio of a wireless communication link over which the channel-coded data are wirelessly received by the receiver; selecting a first error correction code from the two or more error correction codes in the case that the determined expected signal-to-noise ratio is greater than a predefined threshold value; and selecting, from the two or more error correction codes, a second error correction code different from the first error correction code in the case that the determined expected signal-to-noise ratio is equal to or lower than the predefined threshold value.

Example 106 is a method including: (continuously or successively) channel-coding input data of an input data stream using a selected error correction code and provide a representation of the channel-coded input data to a transmitter for wireless data transmission; determining, using sensor data, a change of a physical state of a processor and/or a device associated with the processor; and changing, in response to determining the change of the physical state, the selected error correction code from a first error correction code to a second error correction code different from the first error correction code.

Example 107 is a method including: (continuously or successively) receiving input data of an input data stream from a receiver and applying a selected error correction code on a representation of the input data, the input data representing channel-coded data wirelessly received by the receiver; determining, using sensor data, a change of a physical state of a processor and/or a device associated with the processor; and changing, in response to determining the change of the physical state, the selected error correction code from a first error correction code to a second error correction code different from the first error correction code.

Example 108 is a non-transitory computer-readable medium having instructions recorded thereon which, when executed by a processor, cause the processor to carry out the method of any one of Examples 64 to 107.

The term "data" as used herein, for example in relation to "input data" or "output data", may be understood to include digital information in any suitable form, e.g., provided as a file, a portion of a file, a set of files, a signal or stream, a portion of a signal or stream, a set of signals or streams, and the like.

The term "processor" as used herein may be understood as any kind of technological entity that allows handling of data. The data may be handled according to one or more specific functions that the processor may execute. Further, a processor as used herein may be understood as any kind of circuit, e.g., any kind of analog or digital circuit. A processor may thus be or include an analog circuit, digital circuit, mixed-signal circuit, logic circuit (e.g., a hard-wired logic circuit or a programmable logic circuit), microprocessor (for example a Complex Instruction Set Computer (CISC) processor or a Reduced Instruction Set Computer (RISC) processor), Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. A "processor" may also be a logic-implementing entity executing software, for example any kind of computer program, for example a computer program using a virtual machine code such as for example Java. A "processor" as used herein may also include any kind of cloud-based processing system that allows handling of data in a distributed manner, e.g. with a plurality of logic-implementing entities communicatively coupled with one another (e.g. over the internet) and each assigned to handling the data or part of the data. By way of illustration, an application running on a server and the server can also be a "processor". Any other kind of implementation of the respective functions, which will be described below in further detail, may also be understood as a processor. It is understood that any two (or more) of the processors detailed herein may be realized as a single entity with equivalent functionality or the like, and conversely that any single processor detailed herein may be realized as two (or more) separate entities with equivalent functionality or the like.

The term "system" detailed herein may be understood as a set of interacting elements, the elements may be, by way of example and not of limitation, one or more physical components (e.g., processors, transmitters and/or receivers) and/or one or more digital components (e.g., code segments, instructions, protocols). Generally, the system may include one or more functions to be operated (also referred to as "operating functions") of which each may be controlled for operating the whole system.

The term "memory" as used herein may be understood as a computer-readable medium (e.g., a non-transitory computer-readable medium), in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Furthermore, it is appreciated that registers, shift registers, processor registers, data buffers, among others, are also embraced herein by the term memory. It is also appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The present disclosure may utilize or be related to radio communication technologies. Even though various aspects relate to latency-critical applications, the dynamic and adaptive selection of the error correction scheme for channel coding according to the present disclosure may be used for any wireless communicating application.

The term "wireless network" or "wireless communication network" as used herein, may use any suitable radio frequency range and may be or may include a communication network in which the final communication link (e.g., to a wireless communication device) is wireless, e.g. over an air interface. A "wireless network" or "wireless communication network" may also be referred to herein as "radio communication network" or "wireless system".

The term "wireless communication device" as used herein may refer to any device which is capable to communicate wirelessly (e.g., to generate a wireless communication link). A "wireless communication device" may be configured to communicate wirelessly with other wireless communication devices and/or with a network access node of a wireless network. A wireless communication device may communicate with a network access node via downlink and uplink. "Downlink" may describe the communication link from the network access node to the wireless communication device, and "uplink" may describe the communication link from the wireless communication device to the network access node.

A "wireless communication device" may be or may include a chip (e.g., a chip in a multi-chip-package) or a portion of a chip. A "wireless communication device" may be or may include any mobile or immobile wireless communication device, including User Equipment (UEs), Mobile Stations (MSs), Stations (STAs), cellular phones, gaming consoles, tablets, laptops, personal computers, wearables, multimedia playback and other handheld or body-mounted electronic devices, consumer/home/office/commercial appliances (e.g., a smart television, a smart refrigerator, etc., in an Internet of Things implementation), vehicles (e.g., a car, or a drone), a robot, and any other electronic device capable of user-side wireless communications. Furthermore, wireless communication devices may include vehicular communication devices that function as wireless communication devices.

The term "network environment" as used herein may describe a state of a wireless network, e.g. at a given time point, for example in relation to communication occurring over the wireless network.

In the context of the present disclosure, the terms "energy", "power", "energy consumption", and "power consumption" may be used as known in the art, e.g. to describe the electrical energy transferred during operation of a wireless network (e.g., during communication) and the rate at which energy is transferred. In the context of communications in a wireless network, an energy consumption may be expressed in energy per unit of data (e.g., bits-per-Joule), and a power consumption may be expressed in power per unit of data (e.g., Watt/bit). In the context of the present disclosure a reduced (or increased) energy or energy consumption may correspond to a reduced (or increased) power or power consumption, and vice versa. In the context of the present disclosure a "power saving(s)" may be also understood as an "energy saving(s)", and vice versa, and a "power saving mechanism" may also be understood as an "energy saving mechanism", and vice versa. A power (or energy) saving mechanism may also be referred to herein as power saving technique, or power saving strategy.

The term "model" used herein may be understood as any kind of algorithm, which provides output data based on input data provided to the model (e.g., any kind of algorithm generating or calculating output data based on input data). A computing system may execute a model to progressively improve performance of a specific task. A "model" may be, for example, a "machine learning model". A machine learning model may be a model trained to recognize patterns in data (illustratively, in observations). Parameters of a machine learning model may be adjusted during a training phase based on training data. A trained machine learning model may be used during an inference phase to make estimations or decisions based on input data. In some aspects, the trained machine learning model may be used to generate additional training data. An additional machine learning model may be adjusted during a second training phase based on the generated additional training data. A trained additional machine learning model may be used during an inference phase to make estimations or decisions based on input data. A "machine learning" model may provide an "artificial intelligence" for carrying out a task modelled using the machine learning model.

The machine learning models described herein may take any suitable form or utilize any suitable technique (e.g., for training purposes). For example, any of the machine learning models may utilize supervised learning, semi-supervised learning, unsupervised learning, or reinforcement learning techniques.

In supervised learning, the model may be built using a training set of data including both the inputs and the corresponding desired outputs (illustratively, each input may be associated with a desired or expected output for that input). Each training instance may include one or more inputs and a desired output. Training may include iterating through training instances and using an objective function to teach the model to estimate the output for new inputs (illustratively, for inputs not included in the training set). In semi-supervised learning, a portion of the inputs in the training set may be missing the respective desired outputs (e.g., one or more inputs may not be associated with any desired or expected output).

In unsupervised learning, the model may be built from a training set of data including only inputs and no desired outputs. The unsupervised model may be used to find structure in the data (e.g., grouping or clustering of data points), illustratively, by discovering patterns in the data. Techniques that may be implemented in an unsupervised learning model may include, e.g., self-organizing maps, nearest-neighbor mapping, k-means clustering, and singular value decomposition.

Reinforcement learning models may include positive feedback (also referred to as reward) or negative feedback to improve accuracy. A reinforcement learning model may attempt to maximize one or more objectives/rewards. Techniques that may be implemented in a reinforcement learning model may include, e.g., Q-learning, temporal difference (TD), and deep adversarial networks.

A machine learning model described herein may be or may include a neural network. The neural network may be any kind of neural network, such as a convolutional neural network, an auto-encoder network, a variational auto-encoder network, a sparse auto-encoder network, a recurrent neural network, a de-convolutional network, a generative adversarial network, a forward thinking neural network, a sum-product neural network, and the like. The neural network may include any number of layers. The training of the neural network (e.g., adapting the layers of the neural network) may use or may be based on any kind of training principle, such as backpropagation (e.g., using the backpropagation algorithm).

A cellular network, as used herein, may be a communication network according to any radio communication technology, such as Long Term Evolution (LTE), Long Term Evolution-Advanced (LTE-A), 5th Generation (5G) communication systems, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g. UMTS (Universal Mobile Telecommunications System), FOMA (Freedom of Multimedia Access), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSDPA Plus (HSDPA+), HSUPA (High-Speed Uplink Packet Access), HSUPA Plus (HSUPA+), HSPA+(High Speed Packet Access Plus), UMTS-TDD (Universal Mobile Telecommunications System—Time-Division Duplex), TD-CDMA (Time Division—Code Division Multiple Access), TD-CDMA (Time Division—Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 12), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access (LAA), MuLTEfire, UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)), Zigbee, Bluetooth®, Wireless Gigabit Alliance (WiGig) standard, Worldwide Interoperability for Microwave Access (WiMax) (e.g., according to an IEEE 802.16 radio communication standard, e.g., WiMax fixed or WiMax mobile), mmWave standards in general (wireless systems operating at 10-90 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication arrangements such as Intelligent-Transport-Systems, etc.

While some examples may refer to specific radio communication technologies, the examples provided herein may be similarly applied to various other radio communication technologies, both existing and not yet formulated, particularly in cases where such radio communication technologies share similar features as disclosed regarding the examples described herein. For purposes of this disclosure, radio communication technologies may be classified as one of a Short Range radio communication technology or Cellular Wide Area radio communication technology. Short Range radio communication technologies may include Bluetooth, WLAN (e.g., according to any IEEE 802.11 standard), and other similar radio communication technologies. Exemplary Cellular Wide Area radio communication technologies that the present disclosure may utilize include, but are not limited to: The present disclosure may use such radio communication technologies according to various spectrum management schemes, including, but not limited to, dedicated licensed spectrum, unlicensed spectrum, (licensed) shared spectrum (such as LSA, "Licensed Shared Access," in 2.3-2.4 GHz, 3.4-3.6 GHz, 3.6-3.8 GHz and further frequencies and SAS, "Spectrum Access System," in 3.55-3.7 GHz and further frequencies), and may use various spectrum bands including, but not limited to, IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc., where some bands may be limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's, "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 64-71 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above. Furthermore, aspects described herein can also employ radio communication technologies on a secondary basis on bands such as the TV White Space bands (typically below 790 MHz) where in particular the 400 MHz and 700 MHz bands are prospective candidates. Besides cellular applications, specific applications for vertical markets may be addressed such as PMSE (Program Making and Special Events), medical, health, surgery, automotive, low-latency, drones, etc. applications. Furthermore, aspects described herein may also use radio communication technologies with a hierarchical application, such as by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc. Aspects described herein can also use radio communication technologies with different Single Carrier or OFDM flavors (CP-OFDM, SC-FDMA, SC-OFDM, filter bank-based multicarrier (FBMC), OFDMA, etc.) and in particular 3GPP NR (New Radio), which can include allocating the OFDM carrier data bit vectors to the corresponding symbol resources.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor may transmit or receive data over a software-level connection with another processor in the form of radio signals, where radio-layer components carry out the physical transmission and reception, such as radio frequency (RF) transceivers and antennas, and the processors perform the logical transmission and reception over the software-level connection.

The term "communicate" encompasses one or both of transmitting and receiving, i.e., unidirectional or bidirectional communication in one or both of the incoming and outgoing directions. In general, the term "communicate" may include the exchange of data, e.g., unidirectional or bidirectional exchange in one or both of the incoming and outgoing directions.

As utilized herein, the term "derived from" designates being obtained directly or indirectly from a specific source. Accordingly, data derived from a source includes data obtained directly from the source or indirectly from the source, i.e. through one or more secondary agents.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims, if any, are used to expressly refer to a quantity greater than one. Accordingly, any phrases explicitly invoking the aforementioned words (e.g. "a plurality of [objects]", "multiple [objects]") referring to a quantity of objects is intended to expressly refer more than one of the said objects. For instance, the phrase "a plurality" may be understood to include a numerical quantity greater than or equal to two (e.g., two, three, four, five, [ . . . ], etc.). The terms "group", "set", "collection", "series", "sequence", "grouping", "selection", etc., and the like in the description and in the claims, if any, are used to refer to a quantity equal to or greater than one, i.e. one or more. Accordingly, the phrases "a group of [objects]", "a set of [objects]", "a collection of [objects]", "a series of [objects]", "a sequence of [objects]", "a grouping of [objects]", "a selection of [objects]", "[object] group", "[object] set", "[object] collection", "[object] series", "[object] sequence", "[object] grouping", "[object] selection", etc., used herein in relation to a quantity of objects is intended to refer to a quantity of one or more of said objects. It is appreciated that unless directly referred to with an explicitly stated plural quantity (e.g. "two [objects]", "three of the [objects]", "ten or more [objects]", "at least four [objects]", etc.) or express use of the words "plural", "multiple", or similar phrases, references to quantities of objects are intended to refer to one or more of said objects.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

As used herein, a signal that is or data that are "representative of" or a "representation of" another signal or another data, may include information also included in the other signal or other data. As an example, data which are generated by digitizing an analog signal may still include information also included in the analog signal and may, thus, be a representation of the analog signal. As another example, (digital) data which are generated by channel coding other (digital) data may still include information also included in the initial data and may, thus, be a representation of the initial data.

Any vector and/or matrix notation utilized herein is exemplary in nature and is employed solely for purposes of explanation. Accordingly, aspects of this disclosure accompanied by vector and/or matrix notation are not limited to being implemented solely using vectors and/or matrices, and that the associated processes and computations may be equivalently performed with respect to sets, sequences, groups, etc., of data, observations, information, signals, samples, symbols, elements, etc.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

While the invention has been particularly shown and described with reference to specific aspects, it should be understood by those skilled in the art that various changes in form and detail may be made therein without departing from the spirit and scope of the invention as defined by the appended claims. The scope of the invention is thus indicated by the appended claims and all changes, which come within the meaning and range of equivalency of the claims, are therefore intended to be embraced.

What is claimed is:

1. A device, the device comprising:

a processor configured to:

select, using sensor data, an error correction code from two or more error correction codes, the sensor data representing a physical state of the processor and/or the device, wherein the physical state of the processor and/or the device indicates expected channel conditions;

generate channel-coded data by channel-coding input data using the selected error correction code; and provide a representation of the channel-coded data to a transmitter for wireless data transmission.

2. The device according to claim 1, further comprising:

the transmitter configured to wirelessly transmit a signal representing the representation of the channel-coded data.

3. The device according to claim 1, wherein the processor is configured to generate modulated data by modulating the channel-coded data and to provide a representation of the modulated data as the representation of the channel-coded data to the transmitter for wireless transmission.

4. The device according to claim 1, wherein the processor is configured to determine, using the sensor data, whether to interleave the channel-coded data or not; and in the case that it is determined that the channel-coded data are to be interleaved, generate interleaved data by applying an interleaving algorithm on the channel-coded data and provide a representation of the interleaved data as the representation of the channel-coded data to the transmitter.

5. The device according to claim 1, wherein the sensor data represent at least one of: an orientation of the device, a change of an orientation of the device, a position of the device, a change of a position of the device, network conditions of a short-range wireless network associated with the device, and/or network conditions of a medium-range and/or long-range wireless network associated with the device.

6. The device according to claim 1, wherein at least one error correction code of the two or more error correction codes is a linear code.

7. The device according to claim 6, wherein the at least one error correction code is a linear code selected from the following list of linear codes: a Hamming code, a Bose-Chaudhuri-Hocquenghem code, a Golay code, or a Hsiao code.

8. The device according to claim 1, wherein the two or more error correction codes comprise a first error correction code and a second error correction code; and wherein the first error correction code is capable to correct a first number of bit errors in a data sequence and wherein the second error correction code is capable to correct a second number of bit errors in the data sequence, wherein the second number is greater than the first number.

9. The device according to claim 1,
wherein the input data comprise a plurality of codewords; and
wherein the two or more error correction codes comprise a first error correction code and a second error correction code, wherein the first error correction code indicates to apply a linear code on the plurality of codewords, and wherein the second error correction code indicates to determine a parity codeword which represents an orthogonal parity of the plurality of codewords and to apply a or the linear code on the parity codeword and the plurality of codewords.

10. The device according to claim 1,
wherein the processor is configured to:
determine, using the sensor data, the expected channel conditions of a wireless communication link over which the representation of the channel-coded data is to be transmitted; and
select the error correction code from the two or more error correction codes using the determined expected channel conditions.

11. The device according to claim 10,
wherein the processor is configured to:
select the first error correction code from the two or more error correction codes in the case that the determined expected channel conditions indicate a signal-to-noise ratio greater than a predefined threshold value, and/or
select the second error correction code from the two or more error correction codes in the case that the determined expected channel conditions indicate a signal-to-noise ratio equal to or lower than the predefined threshold value.

12. A device, the device comprising:
a processor configured to:
receive input data from a receiver, the input data representing channel-coded data wirelessly received by the receiver;
select, using sensor data, an error correction code from two or more error correction codes for correcting errors in channel-coded data, the sensor data representing a physical state of the processor and/or the device, wherein the physical state of the processor and/or the device indicates expected channel conditions; and
apply the selected error correction code on a representation of the input data.

13. The device according to claim 12, further comprising:
the receiver configured to wirelessly receive a signal representing the channel-coded data and to provide a representation of the received signal as input data to the processor.

14. A non-transitory computer-readable medium having instructions recorded thereon which, when executed by a processor, cause the processor to:
select, using sensor data, an error correction code from two or more error correction codes, the sensor data representing a physical state of the processor and/or a device associated with the processor, wherein the physical state of the processor and/or the device indicates expected channel conditions;
channel-code input data using the selected error correction code; and
provide a representation of the channel-coded input data to a transmitter for wireless data transmission.

15. The non-transitory computer-readable medium according to claim 14, wherein the instructions are further configured to cause the processor to control a transmitter to wirelessly transmit a signal representing the representation of the channel-coded data.

16. The non-transitory computer-readable medium according to claim 14, wherein the instructions are further configured to cause the processor to generate modulated data by modulating the channel-coded data and to provide a representation of the modulated data as the representation of the channel-coded data to the transmitter for wireless transmission.

17. The non-transitory computer-readable medium according to claim 14, wherein the instructions are further configured to cause the processor to determine, using the sensor data, whether to interleave the channel-coded data or not; and in the case that it is determined that the channel-coded data are to be interleaved, generate interleaved data by applying an interleaving algorithm on the channel-coded data and provide a representation of the interleaved data as the representation of the channel-coded data to the transmitter.

18. The non-transitory computer-readable medium according to claim 14, wherein the sensor data represent at least one of: an orientation of the device, a change of an orientation of the device, a position of the device, a change of a position of the device, network conditions of a short-range wireless network associated with the device, and/or network conditions of a medium-range and/or long-range wireless network associated with the device.

19. The non-transitory computer-readable medium according to claim 14, wherein at least one error correction code of the two or more error correction codes is a linear code.

20. The device according to claim 19, wherein the at least one error correction code is a linear code selected from the following list of linear codes: a Hamming code, a Bose-Chaudhuri-Hocquenghem code, a Golay code, or a Hsiao code.

* * * * *